United States Patent
Maru

(10) Patent No.: US 9,071,312 B2
(45) Date of Patent: Jun. 30, 2015

(54) WIRELESS COMMUNICATION APPARATUS AND WIRELESS COMMUNICATION METHOD

(75) Inventor: Tsuguo Maru, Tokyo (JP)

(73) Assignee: NEC CORPORATION, Tokyo (JP)

(*) Notice: Subject to any disclaimer, the term of this patent is extended or adjusted under 35 U.S.C. 154(b) by 0 days.

(21) Appl. No.: 13/990,108

(22) PCT Filed: Nov. 24, 2011

(86) PCT No.: PCT/JP2011/077058
§ 371 (c)(1),
(2), (4) Date: May 29, 2013

(87) PCT Pub. No.: WO2012/073788
PCT Pub. Date: Jun. 7, 2012

(65) Prior Publication Data
US 2013/0251021 A1  Sep. 26, 2013

(30) Foreign Application Priority Data
Dec. 3, 2010 (JP) ................. 2010-270899

(51) Int. Cl.
*H03H 7/40* (2006.01)
*H03H 7/30* (2006.01)
(Continued)

(52) U.S. Cl.
CPC . *H04B 7/08* (2013.01); *H04B 7/084* (2013.01)

(58) Field of Classification Search
USPC .......................................... 375/232
See application file for complete search history.

(56) References Cited

U.S. PATENT DOCUMENTS 5,953,383 A  9/1999 Kojima
2002/0106040 A1* 8/2002 Malkemes et al. ............ 375/347
(Continued)

FOREIGN PATENT DOCUMENTS

CN  1156355 A  8/1997
CN  1972172 A  5/2007
(Continued)

OTHER PUBLICATIONS

Touzni, A. et al, "Closed Form Expression of EMSE for Bussgang Equalization with Spatio-Temporal Diversity", Acoustics, Speech, and Signal Processing, 2001, Processing, (ICASSP '01). 2001 IEEE International Conference on, vol. 4, May 11, 2001, pp. 2089-2092.
Sharif, B.S. et al, "A Blind Multichannel Combiner for Long Range Underwater Communications", Acoustics, Speech, and Signal Processing, 1997. ICASSP-97., 1997, IEEE International Conference on, vol. 1, Apr. 24, 1997, pp. 579-582.
(Continued)

*Primary Examiner* — Erin File
(74) *Attorney, Agent, or Firm* — Sughrue Mion, PLLC

(57) ABSTRACT

A wireless communication apparatus of the present invention comprises a plurality of branches, a tap output combining section, an adaptive blind processing section and a diversity combining section. Each of the plurality of branches comprises a tap processing section generates a tap output signal and a received signal vector on a basis of a received signal and a tap coefficient in a space diversity method. The tap output combining section calculates by linking the tap output signal as a tap output combination signal. The adaptive blind processing section generates the tap coefficient by an adaptive blind processing on a basis of the tap output combination signal and the received signal vector. The diversity combining section performs a diversity combination of the tap output signals. The adaptive blind processing section uses an evaluation condition so that the tap output combination signal be minimal.

18 Claims, 25 Drawing Sheets

(51) Int. Cl.
*H03K 5/159* (2006.01)
*H04B 7/08* (2006.01)

(56) References Cited

U.S. PATENT DOCUMENTS

| | | |
|---|---|---|
| 2004/0242173 A1 | 12/2004 | Takeda |
| 2007/0116161 A1 | 5/2007 | Tokoro et al. |
| 2007/0142009 A1 | 6/2007 | Scarpa et al. |
| 2011/0200089 A1* | 8/2011 | Umeda et al. ............... 375/232 |

FOREIGN PATENT DOCUMENTS

| | | |
|---|---|---|
| JP | 9-331281 A | 12/1997 |
| JP | 2004-518331 A | 6/2004 |
| JP | 2005-94500 A | 4/2005 |
| JP | 2008-48139 A | 2/2008 |

OTHER PUBLICATIONS

Papadias, C.B. et al, "Decision-Feedbsck Equalization and Identification of Linear Channels Using Blind Algorithms of the Bussgang Type", Signals, Systems and Computers, 1995, 1995 Conference Record of the Twenty-Ninth Asilomar Conference on, vol. 1, Nov. 2, 1995, pp. 335-340.

International Search Report of PCT Application No. PCT/JP2011/077058 mailed on Feb. 7, 2012.

English Translation of International Preliminary Report of Patentability (IPRP) Form PCT/IB/373 and PCT/IDS/237 for PCT Application No. PCT/2011/077058 issued on Jun. 4, 2013.

Chinese Office Action for CN Application No. 201180058314.1 issued on Apr. 3, 2015 with English Translation.

Japanese Office Action for JP Application No. 2012-546809 mailed on Apr. 14, 2015 with English Translation.

* cited by examiner

WIRELESS COMMUNICATION APPARATUS AND WIRELESS COMMUNICATION METHOD

This application is a National Stage Entry of PCT/JP2011/077058 filed Nov. 24, 2011, which claims priority from Japanese Patent Application 2010-270899 filed Dec. 3, 2010, the contents of all of which are incorporated herein by reference, in their entirety.

TECHNICAL FIELD

The present invention relates to a wireless communication apparatus and a wireless communication method using this wireless communication apparatus, especially to a wireless communication apparatus using a space diversity method and a wireless communication method using this wireless communication apparatus.

BACKGROUND ART

In a wireless communication system, especially in a case in which a wireless communication is performed by using a microwave, it is effective to adopt a SD (Space Diversity) method as a measurement to prevent fading.

SD method is a technology to compensate for degradation of radio wave propagation characteristics due to fading, by using a low possibility in which received waves in a plurality of antennas arranged with appropriated distances be degraded at a same time.

FIG. 1 is a diagram which schematically shows a configuration example of a wireless communication system using SD method. The wireless communication system shown in FIG. 1 includes a first fixed station 2001 and a second fixed station 2002. The first fixed station 2001 includes a first antenna and a second antenna. The second fixed station 2002 includes a third antenna. In the first fixed station 2001, the first antenna and the second antenna are separated with a distance d between their centers from each other. Here, as an example, the first antenna, the second antenna and the third antenna are arranged in a horizontal direction to face each other; the first antenna is disposed at an altitude L at the center from the ground; the second antenna is disposed at an altitude L+d at the center from the ground; and the third antenna is disposed at an altitude L' at the center from the ground.

In the wireless communication system shown in FIG. 1, the second fixed station 2002 transmits a signal from the third antenna and the first fixed station 2001 receives this signal at the first antenna and the second antenna. The first fixed station 2001 performs a receiving process including a diversity treatment over two signals obtained by the first antenna and the second antenna, respectively.

FIG. 2 is a circuit diagram which shows an example of a configuration of a circuit which performs a receiving process in a wireless communication system using SD method. The circuit in FIG. 2 includes a first antenna, a second antenna, a first mixer, a second mixer, a first A/D (Analog to Digital) converter, a second A/D converter, a diversity combination section and a local oscillator. It should be noted that, in the circuit diagram in FIG. 2, quadrature demodulation π/2 component and filter thereof are omitted. Here, the first antenna and the second antenna in FIG. 2 respectively correspond to the first antenna and the second antenna in FIG. 1. A group of the first antenna, the first mixer and the first A/D converter is called the first branch. Similarly, a group of the second antenna, the second mixer and the second A/D converter is called the second branch.

A first signal received by the first antenna is provided to the combining circuit through the first mixer and the first A/D converter. Similarly, a second signal received by the second antenna is provided to the combining circuit through the second mixer and the second A/D converter. Here, the group of the first antenna, the first mixer and the first A/D converter, which are connected in series, is called the first branch. Similarly, the group of the second antenna, the second mixer and the second A/D converter, which are connected in series, is called the second branch. Finally, the combining circuit combines two signal provided from the first branch and the second branch to terminate the diversity process.

Relating to the above, a patent literature 1 (Japanese Laid Open Patent Publication Heisei 9-331281) discloses a description about a transmission and reception apparatus. This transmission and reception apparatus includes an antenna alternatively used for transmissions and receptions by a plurality of branches, a base band demodulating section and a transmission antenna switching section. Here, the base band demodulating section demodulates a received signal of each branch. The transmission antenna switching section switches transmission antennas based on reception power of received signal of each branch. This transmission and reception apparatus performs transmission diversity in a wireless communication system with TDD method. This transmission and reception apparatus is characterized for including a comparing means. Here, the comparing means compares the reception power of the received signal of each branch by use of digital data obtained in the demodulation process of the base band demodulating section and outputs selection information of transmission antenna to the transmission antenna switching section.

Also, a patent literature 2 (Japanese Laid Open Patent Publication 2004-518331) discloses a description about an adaptive antenna system. This adaptive antenna system is characterized for including N antennas, N forward equalizers and N processors. Here, N forward equalizers are respectively connected to N antennas in an operational manner. N processors execute a constant modulus algorithm to respectively generate N control signals to adjust factors associated to each of N forward equalizers.

Also, a patent literature 3 (Japanese Laid Open Patent Publication 2005-94500) discloses a description about a wraparound canceller for diversity reception. This wraparound canceller for diversity reception has a diversity receiving means for OFDM signal and a wraparound cancelling means. Here, the diversity reception means for OFDM signal has a plurality of branches. The wraparound cancelling means is characterized for inputting a received signal after diversity combination outputted from the diversity reception means and outputting after practically cancelling a wraparound wave.

Also, a patent literature 4 (Japanese Laid Open Patent Publication 2008-48139) discloses a description about a microwave wireless transmission and reception apparatus. This microwave wireless transmission and reception apparatus is used as a first fixed station of a wireless communication system which performs a wireless communication by use of a microwave between the first fixed station in which a plurality of antenna is arranged and a second fixed station in which a single antenna is arranged. This microwave wireless transmission and reception apparatus is characterized for including a reception processing means, a transmission processing means, a selecting switch and a selection controlling means. Here, the reception processing means is arranged in correspondence with each of the plurality of antenna and performs a reception process on a microwave signal arrived to the corresponding antenna. The selecting switch transmits a radio frequency signal, obtained from the transmission processing means, to an antenna specified in accordance with a selection controlling signal which specifies one among the plurality of antennas, to provide to a wireless transmission by the antenna. The selection controlling means synchronizes with a selection among the received signals respectively obtained by a plurality of reception processing means, generates the selection controlling signal which specifies the antenna corresponding to the selected received signal to input to the selection switch.

CITATION LIST

Patent Literature

[PTL 1]
Japanese Laid Open Patent Publication Heisei 9-331281
[PLT 2]
Japanese Laid Open Patent Publication 2004-518331
[PLT 3]
Japanese Laid Open Patent Publication 2005-94500
[PLT 4]
Japanese Laid Open Patent Publication 2008-48139

SUMMARY OF INVENTION

Microwave wireless communication system is progressing into larger capacity with the increase in traffic and multilevel modulation signal of high order is transmitted in higher speed. On the other hand, frequency selectivity fading due to multipath propagation, which is one cause of interference wave, occurs in microwave band.

FIG. 3 is a diagram for explaining about fading. In the diagram of FIG. 3, the wireless communication system in FIG. 1 and pathways of signals transmitted and received in this wireless communication system are shown. These pathways, from the third antenna to the first antenna or the second antenna, include a LOS Ray which directly arrives and a Reflected Ray which arrives after reflecting on the ground for example, both of which are roughly classified.

When a multilevel modulation signal is used with high order and higher speed, due to the frequency selectively fading, the error rate characteristic is significantly degraded.

Traditionally, an adaptive equalization process has been performed as a countermeasure against the frequency selectively fading. Generally, in an adapting algorithm, a training signal is transmitted to obtain a convergence characteristic of tap coefficients. This transmission of training signal is essential for a burst transmission such as a TDMA mobile communication.

On the other hand, there is a case in which the training signal can not be entered, in a fixed microwave wireless communication system for example, because of a signal configuration of an existing system. In such a case, a blind processing, which is a method using no known sequential signal as a pilot signal, a reference signal or a training signal, is effective.

The pilot signal, the reference signal or the training signal etc are known sequential signals which do not contribute to actual transmissions of data and so the blind process is preferred in order to increase transmission efficiency.

For example, in a mobile communication etc, about 10% of wireless resource is assigned to the pilot signal or the reference signal. If this percentage is applied as it is to a fixed microwave wireless communication system with 1024 QAM transmission, the transmission speed will be equivalent to 512 QAM. That means that the effective speed of data transmission is lower than a higher speed realized by doubling transmission power.

A method called IP (In-Phase) combination is known as a SD method traditionally realized with a blind process. IP combination method consists in: performing a low frequency phase modulation on signal in one branch; detecting an in-phase state of an AM signal component after combination; and performing a feedback control to a phase shifter by use of the detection result. IP combination method is used to detect amplitude component with low frequency. QAM, which is able to perform a multilevel modulation in a high order, contains a variation of amplitude component due to its modulation method. Therefore, there is a problem in applying IP combination method into multilevel QAM. It should be noted that, as describe below, the error rate characteristic in IP combination method is significantly degraded by frequency selective fading.

A method called MID combination is known as a SD method realized with a blind process by considering the frequency selective fading. For a facility of explanation, an extreme example of a case in which an interference cancelling combination showing the characteristics of the MID method as a different point from IP combination method is performed, will be explained.

FIG. 4 is a diagram showing an example of reception by two antennas when an interference cancelling combination, which shows a characteristic of the MID method, is performed. Two examples with different conditions of radio wave propagation are explained. It should be noted that in this diagram received waves are shown with a vector notation of feather rotation.

In FIG. 4, the first branch (BRANCH 1) shows the signal received by the up-side antenna on the right-side receiving station in FIG. 3. Similarly, the second branch (BRANCH 2) shows the signal received by the down-side antenna on the right-side receiving station in FIG. 3. The received waves are obtained by adding delay reflected wave (shown as "Reflected ray") to direct wave (shown as "LOS ray" in the diagram) as shown in FIG. 3.

The operation of interference cancelling combination is to perform a combination by adjusting the phase shifter in the branches so that the phase of delay reflected wave in each branch, which is an interference wave, be opposite to each other. Therefore, as shown in right column in FIG. 4, delay reflected wave components, which are interference wave components, are cancelled; and remaining direct wave component in branch 1 and direct wave component in branch 2 are combined to complete the diversity process. If this process is ideally performed, delay reflected wave components will completely disappear and interference due to frequency selective fading consequently is resolved. However, this method contains following problem.

Wave propagation environment of a microwave wireless communication system changes widely on a basis of conditions of antennas installation, conditions of reflections by reflection objects which are the ground and sea surface in a case a strait is crossed. The example 1 shown in the up-side line in FIG. 4 shows a lucky case of the wave propagation environment. In this lucky case, phase shifters in branches are adjusted so that delay reflected wave components which are interference wave components be cancelled and consequently, direct wave in each branch is directed in a same direction, so that the power of a desired wave after combination increases and a diversity gain is obtained. On the other hand, the example 2 shown in the down-side line in FIG. 4 shows a case with severe conditions. Phase shifters in branches are adjusted so that delay reflected wave components, which are interference wave components, be cancelled and consequently, direct wave in each branch is directed in a direction nearly opposite to each other, so that the power of the desired wave after combination decreases and the diversity gain decreases in reverse while frequency selectivity is resolved.

MID combination method has been explained above in extreme forms which facilitate the explanation. MID combination method has a problem in a point that diversity effect significantly varies in accordance with the radio environment.

It is an object of the preset invention to provide a microwave wireless communication apparatus giving a constantly good diversity effect with a little affection of radio propagation environment, even under an environment with frequency selective fading in which exists delay interference wave severe to a high capacity microwave wireless communication using a high speed multilevel modulation with high order, by using a blind process which uses no known sequence which decreases transmitting efficiency such as a pilot signal, a reference signal or a training signal with no contribution over transmission of actual information.

A wireless communication apparatus of the present invention comprises a plurality of branches, a tap output combining section, an adaptive blind processing section and a diversity combining section. Each of the plurality of branches comprises a tap processing section generates a tap output signal and a received signal vector on a basis of a received signal and a tap coefficient in a space diversity method. The tap output combining section calculates by linking the tap output signal as a tap output combination signal. The adaptive blind processing section generates the tap coefficient by an adaptive blind processing on a basis of the tap output combination signal and the received signal vector. The diversity combining section performs a diversity combination of the tap output signals. The adaptive blind processing section uses an evaluation condition so that the tap output combination signal be minimal.

A wireless communication method of the present invention comprises a step of generating a tap output signal and a received signal vector on a basis of a received signal and a tap coefficient in a space diversity method, a step of calculating by linking the tap output signal as a tap output combination signal, a step of generating the tap coefficient by an adaptive blind processing on a basis of the tap output combination signal and the received signal vector and a step of performing a diversity combination of the tap output signal. The step of generating the tap coefficient comprises a step of using an evaluation condition so that the tap output combination signal be minimal.

To generate a tap coefficient to be provided to a tap processing section on a basis of a received signal vector inputted from the tap processing section without using a known reference signal, an adaptive blind equalization processing section uses an evaluation condition including suppressing a sum or a difference of each tap output signal to be minimal.

DESCRIPTION OF EXEMPLARY EMBODIMENTS

Figure 1:
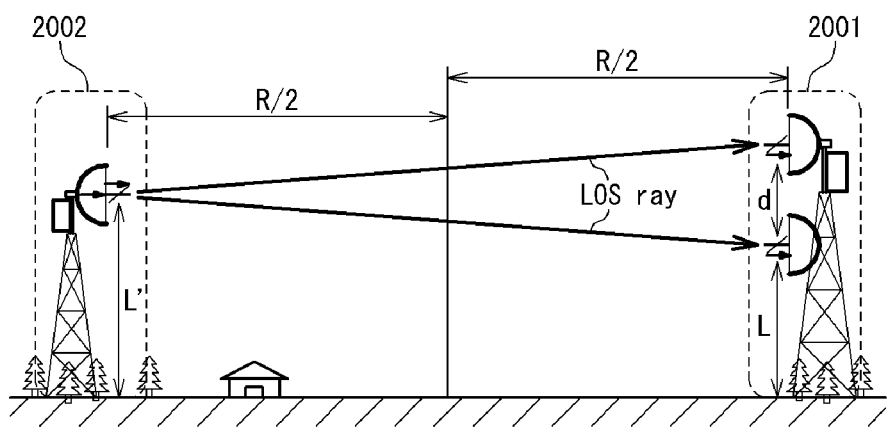
FIG. 1 is a diagram schematically showing a configuration example of a wireless communication system using SD method.
Figure 2:
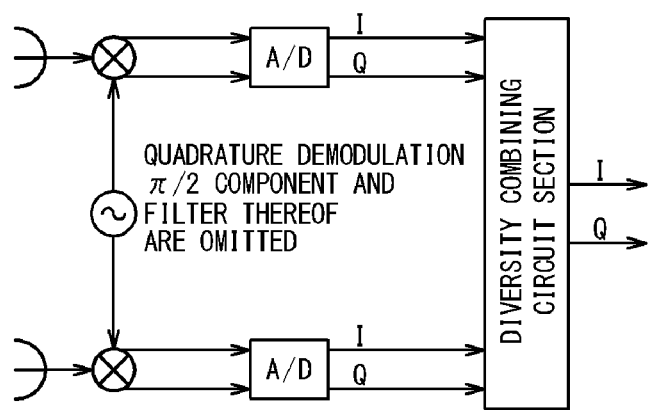
FIG. 2 is a circuit diagram schematically showing a configuration example of a circuit which performs a reception process in a wireless communication system using SD method.
Figure 3:
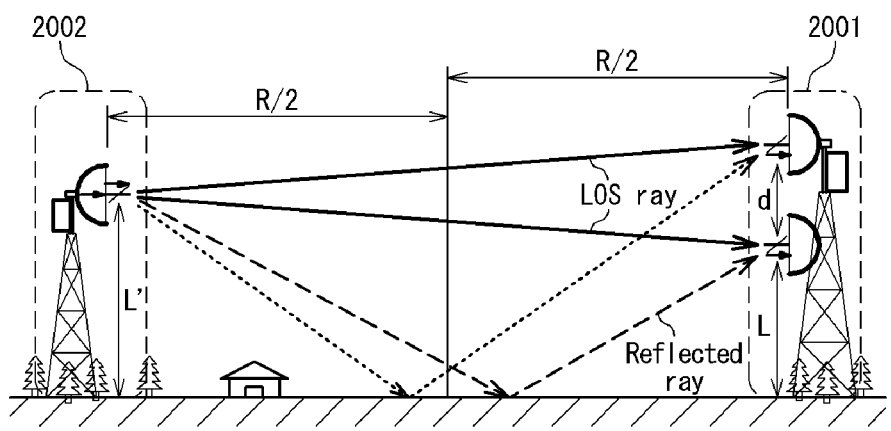
FIG. 3 is a diagram for explaining about fading.
Figure 4:
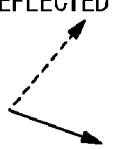
FIG. 4 is a diagram showing an example of an interference cancelling combination operation, which shows a characteristic of MID combination method, with reception by two antennas.

Hereinafter, several exemplary embodiments of wireless communication apparatus and wireless communication method according to the present invention will be described in details with reference to attached drawings. But, it would be well understood that this description should not be viewed as narrowing the appended claims.

To explain quantitatively about a principle aspect of the present invention, a quantitative analysis of an ordinary adaptive equalization processing will be shown at first, a general notion of a blind processing and then a quantitative analysis of the present invention will be shown by use of statistics of high order, and an effect of the present invention will be quantitatively shown by a numeral calculation by using a simple example and a quantitative analysis result thereof.

First, an ordinary adaptive equalization processing will be explained by use of a root-mean-square error surface on a basis of MMSE criterion. It should be noted that the ideal analysis result is the optimal solution called Wiener solution. This numerical value will be used as a reference of numeral analysis of following blind processing etc.

(Evaluation Conditions on a Basis of MMSE Criterion (Root-Mean-Square Error Surface) and its Optimal Solution)

A transmission signal vector S is defined as below.

$$S = \begin{bmatrix} s_1 \\ s_2 \\ \vdots \\ s_m \end{bmatrix}$$ (Equation 1)

An impulse response vector $H_r$ of a transmission path in a multipath transmission is defined as below.

$$H_r = [H_1 H_2 \ldots H_L]$$ (Equation 2)

Then, a combined channel matrix (Convolution Matrix) H can be obtained as below.

$$H = \begin{bmatrix} H_1 & H_2 & \cdots & H_L & 0 & \cdots & 0 \\ 0 & H_1 & H_2 & \cdots & H_L & \cdots & 0 \\ \vdots & & \ddots & \ddots & \ddots & \ddots & \vdots \\ 0 & 0 & \cdots & H_1 & H_2 & \cdots & H_L \end{bmatrix}$$ (Equation 3)

A received signal vector r is defined and can be obtained as below.

$$r = \begin{bmatrix} r_1 \\ r_2 \\ \vdots \\ r_n \end{bmatrix} = H \cdot S + n$$ (Equation 4)

Here, n is a noise vector.

A tap coefficient to be multiplied to the received signal is called weight vector and a vector to be actually multiplied is shown by:

$$w^H$$ (Equation 5)

The optimal solution of MMSE criterion for the transmitted signal is obtained as below.

$$w_i \in C^{1 \times n}; \operatorname*{argmin}_{w_i} E\left[|s_i - w_i^H r|^2\right] \quad \text{(Equation 6)}$$

This solution is called Wiener solution.

This Wiener solution uses a root-mean-square error $J=E[|e|^2]$ as an evaluation condition J. Now, an equation is obtained as below.

$$J = E(s_i - w_i^H \cdot r)(s_i^* - r^H \cdot w_i) = |s_i|^2 + w_i^H \cdot E[r \cdot r^H] \cdot w_i - w_i^H \cdot E[r \cdot s_i^*] - E[s_i \cdot r^H] \cdot w_i \quad \text{(Equation 7)}$$

By transforming the above equation, an equation can be obtained as below.

$$\nabla J = 2 \cdot \frac{\partial J}{\partial w_i^H} = 2 \cdot E[r \cdot r^H] \cdot w_i - 2 \cdot E[r \cdot s_i^*] = 0 \quad \text{(Equation 8)}$$

Thus, an equation can be obtained as below.

$$w_i = R^{-1} \cdot p_i \text{ where } R = E[r \cdot r^H], p_i = E[r \cdot s_i^*] \quad \text{(Equation 9)}$$

Here, R shows a covariance matrix and is defined as below.

$$\begin{aligned}
R &= E[r \cdot r^H] \quad \text{(Equation 10)} \\
&= E[(H \cdot S + n) \cdot (H \cdot S + n)^H] \\
&= E[H \cdot S \cdot S^H \cdot H^H] + E[H \cdot S \cdot n^H] + \\
&\quad E[n \cdot S^H \cdot H^H] + E[n \cdot n^H] \\
&= E[H \cdot S \cdot S^H \cdot H^H] + E[n \cdot n^H] \\
&= H \cdot E[S \cdot S^H] \cdot H^H + E[n \cdot n^H] \\
&= \sigma_s^2 \cdot H \cdot H^H + \\
&\quad \sigma_n^2 \cdot I \text{ where } E[S \cdot S^H] = \sigma_s^2 \cdot I, E[n \cdot n^H] \\
&= \sigma_n^2 \cdot I \\
&= \sigma_s^2 \cdot \left(H \cdot H^H + \frac{1}{SNR} \cdot I\right) \text{ where } SNR = \frac{\sigma_s^2}{\sigma_n^2}
\end{aligned}$$

On the other and, $p_i$ shows a cross-correlation vector and is defined as below.

$$\begin{aligned}
p_i &= E[r \cdot s_i^*] \quad \text{(Equation 11)} \\
&= E[(H \cdot S + n) \cdot s_i^*] \\
&= H \cdot E[r \cdot s_i^2] \\
&= \sigma_s^2 \cdot H_i
\end{aligned}$$

where $$E[r \cdot s_i^*] = \begin{bmatrix} 0 \\ \vdots \\ \sigma_s^2 \\ \vdots \\ 0 \end{bmatrix},$$

$$H = [H_1^c \quad \cdots \quad H_i^c \quad \cdots \quad H_m^c]$$

A MSE (Means Square Error) $J_i$ for a transmitted signal $s_i$ with this optimal weight can be obtained as below.

$$\begin{aligned}
J_i &= E(s_i - w_i^H \cdot r) \cdot (s_i^* - r^H \cdot w_i) \quad \text{(Equation 12)} \\
&= |s_i|^2 + w_i^H \cdot E[r \cdot r^H] \cdot w_i - w_i^H \cdot \\
&\quad E[r \cdot s_i^*] - E[s_i \cdot r^H] \cdot w_i \\
&= \sigma_s^2 + w_i^H \cdot R \cdot w_i - w_i^H \cdot p_i - p_i^H \cdot w_i \\
&= \sigma_s^2 + w_i^H \cdot R \cdot R^{-1} \cdot p_i - w_i^H \cdot p_i - p_i^H \cdot w_i \\
&\quad (\because w_i = R^{-1} \cdot p_i) \\
&= \sigma_s^2 - p_i^H \cdot w_i \\
&= \sigma_s^2 - p_i^H \cdot R^{-1} \cdot p_i \\
&= \sigma_s^2(1 - H_i^H \cdot R^{-1} \cdot H_i) \\
&\quad (\because p_i = \sigma_s^2 \cdot H_i)
\end{aligned}$$

Thus, by defining MSE vector J for all transmitted signals as below and combining them, an equation can be obtained as below.

$$\begin{aligned}
J &= \begin{bmatrix} J_1 \\ J_2 \\ \vdots \\ J_m \end{bmatrix} \quad \text{(Equation 13)} \\
&= \begin{bmatrix} E|s_1 - w_1^H \cdot r|^2 \\ E|s_2 - w_2^H \cdot r|^2 \\ \vdots \\ E|s_m - w_m^H \cdot r|^2 \end{bmatrix} \\
&= \begin{bmatrix} \sigma_s^2(1 - H_1^{cH} \cdot R^{-1} \cdot H_1^c) \\ \sigma_s^2(1 - H_2^{cH} \cdot R^{-1} \cdot H_2^c) \\ \vdots \\ \sigma_s^2(1 - H_m^c \cdot R^{-1} \cdot H_m^c) \end{bmatrix} \\
&= \sigma_s^2 \left( \begin{bmatrix} 1 \\ 1 \\ \vdots \\ 1 \end{bmatrix} - \begin{bmatrix} H_1^{cH} R^{-1} H_1^c \\ H_2^{cH} R^{-1} H_2^c \\ \vdots \\ H_m^{cH} R^{-1} H_m^c \end{bmatrix} \right) \\
&= \sigma_s^2 (\mathbf{1} - \operatorname{diag}(H^H R^{-1} H))
\end{aligned}$$

where $\mathbf{1} = \begin{bmatrix} 1 \\ 1 \\ \vdots \\ 1 \end{bmatrix}$, $\operatorname{diag}(A) = \begin{bmatrix} a_{11} \\ a_{22} \\ \vdots \\ a_{mm} \end{bmatrix}$ The above equation shows the root-mean-square error surface which is the evaluation condition.

It should be noted that, to obtain the above equation, the below equation is used.

$$H^H R^{-1} H = \begin{bmatrix} H_1^{cH} \\ H_2^{cH} \\ \vdots \\ H_m^{cH} \end{bmatrix} \cdot R^{-1} \cdot [H_1^c \quad H_2^c \quad \cdots \quad H_m^c] = \quad \text{(Equation 14)}$$

-continued $$\begin{bmatrix} H_1^{cH} R^{-1} H_1^c & & & * \\ & H_2^{cH} R^{-1} H_2^c & & \\ & & \ddots & \\ * & & & H_m^{cH} R^{-1} H_m^c \end{bmatrix}$$

Consequently, a weight vector wiH to be actually multiplied to the received signal vector is obtained as below.

$$w_i^H = H_i^H \cdot \left( H \cdot H^H + \frac{\sigma_n^2}{\sigma_s^2} \cdot I \right)^{-1}$$ (Equation 15)

$$= \begin{bmatrix} \overset{ith}{1} & 0 & 0 & \dots \end{bmatrix} \cdot \begin{bmatrix} H_i^{cH} \\ \vdots \\ H_m^{cH} \end{bmatrix} \cdot$$

$$\left( H \cdot H^H + \frac{\sigma_n^2}{\sigma_s^2} \cdot I \right)$$

$$= \begin{bmatrix} \overset{ith}{1} & 0 & 0 & \dots \end{bmatrix} \cdot H^H \cdot \left( H \cdot H^H + \frac{\sigma_n^2}{\sigma_s^2} \cdot I \right)^{-1}$$

The optimal solution called Wiener solution is, as explained later, is obtained by numeral calculations on a basis of above equations. This numeral value will be used as a numeral analysis reference of blind processing etc.

By the way, by performing an adaptive equalization processing with the root-mean-square error as the evaluation condition by use of a stochastic gradient method, an equation can be obtained as below.

$$w[k+1]=w[k]-\tfrac{1}{2}\mu\cdot\nabla J$$ (Equation 16)

For example, in a case of LMS (Least-Mean-Square), by approximating $J=E[|e|^2]$ by a mean value of $J$ ($=|e|^2$) in this stochastic gradient, an equation can be obtained as below.

$$\nabla \hat{J} = 2 \cdot \frac{\partial J}{\partial w_i^H}$$ (Equation 17)

$$= -2e^* \cdot r$$

$$= -2 \cdot (s_i - w_i^H \cdot r)^* \cdot r$$

$$\because e = s_i - w_i^H \cdot r$$

It should be noted that $s_i$ used here is called reference signal. Specifically, a pilot signal or a training signal etc can be used as the reference signal. That is, an ordinary adaptive equalization processing needs to use a known sequence such as a training signal in some form, necessarily.

(Analysis of CMA Evaluation Condition)

Next, an adaptive equalization processing in a case of CMA (Constant Modulus Algorithm) used in adaptive antenna etc will be explained with analysis by evaluation conditional equation.

CMA is a kind of a blind equalization processing used in an adaptive antenna. An evaluation conditional equation $J_{CM}$ thereof is defined as below.

$$J_{CM}=E\{(\gamma-|y_n|^2)^2\}=E\{|y_n|^4\}-2\gamma\cdot E\{|y_n|^2\}+\gamma^2=E\{|y_n|^4\}-2\cdot\sigma_s^4\cdot\kappa_s\cdot E\{|y_n|^2\}+\sigma_s^4\cdot\kappa_s^2$$ (Equation 18)

Here, y shows a signal after a weight, that is, a tap output; and $\kappa_s$ shows a kurtosis related to signal component.

The kurtosis $\kappa_s$ is defined as below.

$$\kappa_s = \frac{E\{|s_n|^4\}}{\sigma_s^4}$$ (Equation 19)

The tap coefficient will be as below.

$$y_n = h^T \cdot s(n) + W^T \cdot n(n)$$ (Equation 20)

Here, h shows a convolution vector of weight and impulse response, s shows a transmitted signal vector, W shows a weight vector and n shows a noise vector.

Here, intermediate variables $A_n$ and $B_n$ defined as below are to be introduced.

$$\begin{cases} A_n = h^T \cdot s(n) \\ B_n = W^T \cdot n(n) \end{cases}$$ (Equation 21)

Then, an equation can be obtained as below.

$$E[|y_n|^2]=E[(A_n+B_n)\cdot(A_n^*+B_n^*)]=E[|A_n|^2]+E[|B_n|^2]$$ (Equation 22)

Convolution vector h and transmitted signal vector are defined as below.

$$h = [\, h_0 \; \dots \; h_{P-1} \,],$$ (Equation 23)

$$s(n) = \begin{bmatrix} s_0 \\ \vdots \\ s_{P-1} \end{bmatrix}$$

Then, an equation can be obtained as below.

$$E[|A_n|^2] =$$ (Equation 24)

$$E[(h^T \cdot s(n)) \cdot (s^H(n) \cdot h^*)] == \sigma_s^2 \cdot \sum_{n=0}^{P-1} |h_n|^2 = \sigma_s^2 \cdot \|h\|_2^2$$

Similarly, the weight vector W and the noise vector n are defined as below.

$$W = [\, W_0 \; \dots \; W_{2N-1} \,],$$ (Equation 25)

$$n(n) = \begin{bmatrix} n_0 \\ \vdots \\ n_{2N-1} \end{bmatrix}$$

Then, an equation can be obtained as below.

$$E[|B_n|^2] =$$ (Equation 26)

$$E[(W^T \cdot n(n)) \cdot (n^H(n) \cdot W^*)] = \sigma_n^2 \cdot \sum_{n=0}^{2N-1} |W_n|^2 = \sigma_n^2 \cdot \|W\|_2^2$$

Thus, an equation can be obtained as below.

$$E[|y_n|^2]=E[(A_n+B_n)\cdot(A_n^*+B_n^*)]=E[|A_n|^2]+E[|B_n|^2]=\sigma_s^2\cdot\|h\|_2^2+\sigma_n^2\cdot\|W\|_2^2$$ (Equation 27)

Similarly, by calculating $E[|y_n|^4]$, an equation can be obtained as below.

$$E[|y_n|^4] = E[(A_n + B_n)^2 \cdot (A_n^* + B_n^*)^2] \quad \text{(Equation 28)}$$
$$= E[(A_n^2 + B_n^2 + 2A_nB_n) \cdot (A_n^{*2} + B_n^{*2} + 2A_n^*B_n^*)]$$
$$= E[|A_n|^4] + E[A_n^2]E[B_n^{*2}] + 4 \cdot E[|A_n|^2]E[|B_n|^2] +$$
$$E[B_n^2]E[A_n^{*2}] + E[|B_n|^4]$$

Here, by calculating $E[|A_n|^4]$, the first term in the most right-hand side, an equation can be obtained as below.

$$E[|A_n|^4] = \quad \text{(Equation 29)}$$
$$E\left[\sum_{i=0}^{P-1}|h_i|^4 \cdot |s_i|^4\right] + E\left[\sum_{i=0}^{P-1}\sum_{\substack{k=0\\k\neq i}}^{P-1}h_i^2 \cdot s_i^2 \cdot h_k^{*2} \cdot s_k^{*2}\right] +$$
$$E\left[\sum_{i=0}^{P-1}\sum_{\substack{k=0\\k\neq i}}^{P-1}h_i \cdot h_i^* \cdot s_i \cdot s_i^* \cdot h_k \cdot h_k^* \cdot s_k \cdot s_k^*\right] +$$
$$E\left[\sum_{i=0}^{P-1}\sum_{\substack{k=0\\k\neq i}}^{P-1}h_i \cdot h_i^* \cdot s_i \cdot s_i^* \cdot h_k \cdot h_k^* \cdot s_k \cdot s_k^*\right]$$

Similarly, by calculating $E[|Bn|4]$, the last term in the most right-hand side, an equation can be obtained as below.

$$E[|B_n|^4] = \quad \text{(Equation 30)}$$
$$E\left[\sum_{i=0}^{2N-1}|W_i|^4 \cdot |n_i|^4\right] + E\left[\sum_{i=0}^{2N-1}\sum_{\substack{k=0\\k\neq i}}^{2N-1}W_i^2 \cdot n_i^2 \cdot W_k^{*2} \cdot n_k^{*2}\right] +$$
$$E\left[\sum_{i=0}^{2N-1}\sum_{\substack{k=0\\k\neq i}}^{2N-1}W_i \cdot W_i^* \cdot n_i \cdot n_i^* \cdot W_k \cdot W_k^* \cdot n_k \cdot n_k^*\right] +$$
$$E\left[\sum_{i=0}^{2N-1}\sum_{\substack{k=0\\k\neq i}}^{2N-1}W_i \cdot W_i^* \cdot n_i \cdot n_i^* \cdot W_k \cdot W_k^* \cdot n_k \cdot n_k^*\right]$$

By summarizing the above calculation results, an equation can be obtained as below.

$$E[|y_n|^4] = E[|A_n|^4] + E[|B_n|^4] + E[A_n^2]E[B_n^{*2}] + \quad \text{(Equation 31)}$$
$$4 \cdot E[|A_n|^2]E[|B_n|^2] + E[B_n^2]E[A_n^{*2}] =$$
$$\kappa_s\sigma_s^4\left(\sum_{i=0}^{P-1}|h_i|^4\right) + |E[\{s^2\}]|^2\sum_{i=0}^{P-1}\sum_{\substack{k=0\\k\neq i}}^{P-1}h_i^2h_k^{*2} +$$
$$2 \cdot \sigma_s^4\sum_{i=0}^{P-1}\sum_{\substack{k=0\\k\neq i}}^{P-1}|h_i|^2 \cdot |h_k|^2 + \kappa_n\sigma_n^4\left(\sum_{i=0}^{2N-1}|W_i|^4\right) +$$
$$|E[\{n\}^2]|^2\sum_{i=0}^{2N-1}\sum_{\substack{k=0\\k\neq i}}^{2N-1}W_i^2W_k^{*2} +$$
$$2 \cdot \sigma_n^4\sum_{i=0}^{2N-1}\sum_{\substack{k=0\\k\neq i}}^{2N-1}|W_i|^2 \cdot |W_k|^2 +$$
$$\left(E[s^2] \cdot \sum_{i=0}^{P-1}h_i^2\right)\left(E[n^2] \cdot \sum_{i=0}^{2N-1}W_i^2\right)^* +$$
$$4 \cdot \sigma_s^2\|h\|_2^2\sigma_n^2\|W\|_2^2 + \left(E[n^2] \cdot \sum_{i=0}^{2N-1}W_i^2\right)\left(E[s^2] \cdot \sum_{i=0}^{P-1}h_i^2\right)^*$$

By substituting the above results in the equation of the evaluation condition $J_{CM}$, an equation can be obtained as below.

$$J_{CM} = E[|y_n|^4] - 2 \cdot \sigma_s^2 \cdot \kappa_s \cdot E[|y_n|^2] + \sigma_s^4 \cdot \kappa_s^2 = \quad \text{(Equation 32)}$$
$$\kappa_s\sigma_s^4\left(\sum_{i=0}^{P-1}|h_i|^4\right) + |E[\{s^2\}]|^2 \cdot \sum_{i=0}^{P-1}\sum_{\substack{k=0\\k\neq i}}^{P-1}h_i^2h_k^{*2} +$$
$$2 \cdot \sigma_s^4 \cdot \sum_{i=0}^{P-1}\sum_{\substack{k=0\\k\neq i}}^{P-1}|h_i|^2 \cdot |h_k|^2 + \kappa_n\sigma_n^4\left(\sum_{i=0}^{2N-1}|W_i|^4\right) +$$
$$|E[\{n\}^2]|^2 \cdot \sum_{i=0}^{2N-1}\sum_{\substack{k=0\\k\neq i}}^{2N-1}W_i^2W_k^{*2} +$$
$$2 \cdot \sigma_n^4 \cdot \sum_{i=0}^{2N-1}\sum_{\substack{k=0\\k\neq i}}^{2N-1}|W_i|^2 \cdot |W_k|^2 +$$
$$\left(E[s^2] \cdot \sum_{i=0}^{P-1}h_i^2\right)\left(E[n^2] \cdot \sum_{i=0}^{2N-1}W_i^2\right) + 4 \cdot \sigma_s^2\|h\|_2^2\sigma_n^2$$
$$\|W\|_2^2 + \left(E[n^2] \cdot \sum_{i=0}^{2N-1}W_i^2\right)\left(E[s^2] \cdot \sum_{i=0}^{P-1}h_i^2\right)^* -$$
$$2 \cdot \sigma_s^2 \cdot \kappa_s \cdot (\sigma_s^2 \cdot \|h\|_2^2 + \sigma_n^2 \cdot \|W\|_2^2) + \sigma_s^4 \cdot \kappa_s^2$$

By the way, an adaptive equalization processing can be performed with the stochastic gradient method on a basis of the evaluation condition shown by the above equation. By using the first equation of the evaluation condition JCM and by approximating the mean value of JCM to $(y-|y_n|^2)^2$, the gradient can be approximated as below.

$$\hat{\nabla}J = 2 \cdot \frac{\partial \hat{J}_{CM}}{\partial w_i^H} = -2 \cdot 4 \cdot (\gamma - |y_n|^2) \cdot y_n^* \cdot r \quad \text{(Equation 33)}$$
$$\because J_{CM} = (\gamma - |y_n|^2)^2$$
and
$$y_n = w_i^T \cdot r = w_i^H \cdot r$$

Thus, a recursive equation of the tap coefficient can be obtained as below.

$$w[k+1] = w[k] - \tfrac{1}{2}\mu \cdot \nabla J = w[k] - 4 \cdot \mu \cdot r \cdot y_n^* \cdot (|y_n|^2 - \gamma) \quad \text{(Equation 34)}$$

With the above recursive equation of the tap coefficient, an adaptive equalization processing can be performed by use of the stochastic gradient method. In this case, the processing can be understood to be realized by a blind processing in which a reference signal such as a pilot signal or a training signal is not used.

Figure 5A:
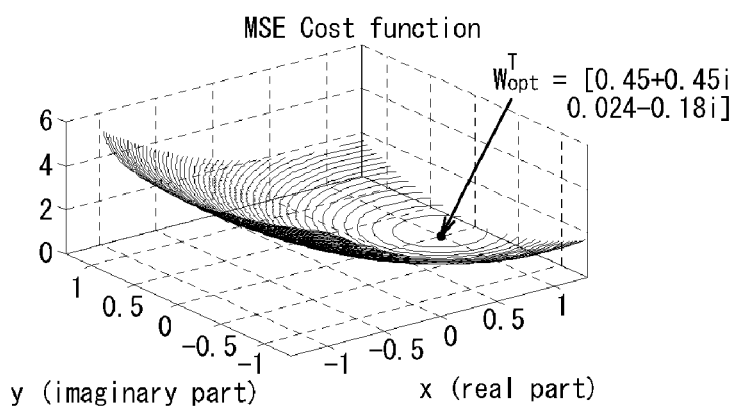
FIG. 5A is an overhead view of a 3-dimensional graph obtained by calculating conditional expression for evaluation on a basis of MMSE criterion, about tap coefficient.
Figure 5B:
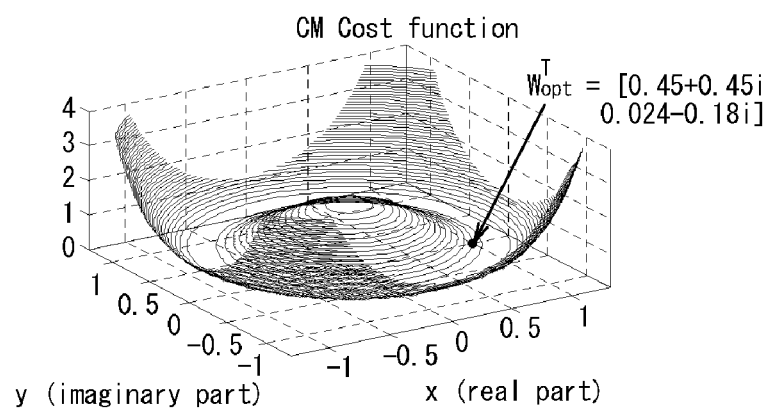
FIG. 5B is an overhead view of a 3-dimensional graph obtained by calculating conditional expression for evaluation on a basis of CMA, about tap coefficient.
Figure 6A:
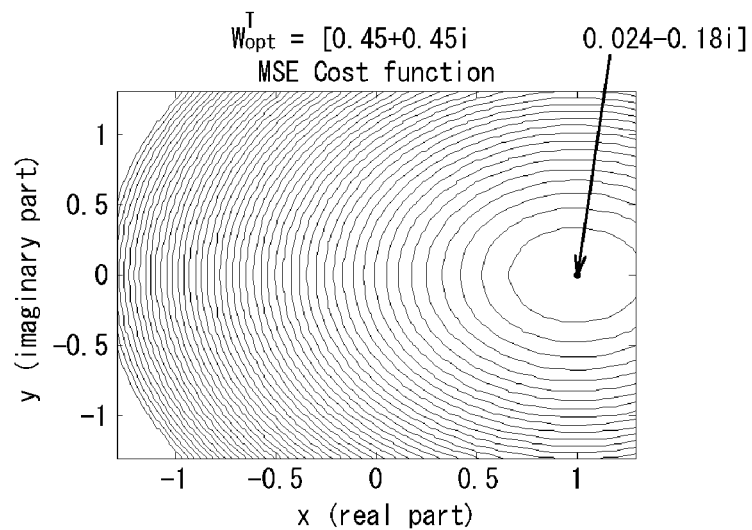
FIG. 6A is a top view of a 3-dimensional graph obtained by calculating conditional expression for evaluation on a basis of MMSE criterion, about tap coefficient.
Figure 6B:
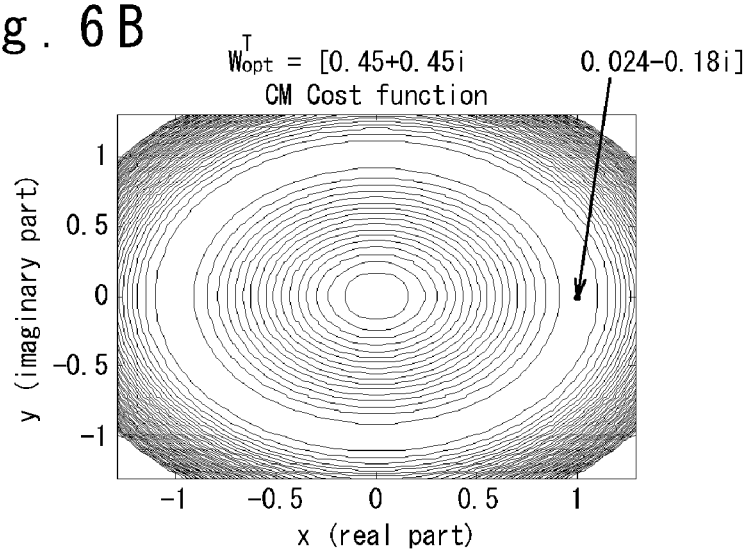
FIG. 6B is a top view of a 3-dimensional graph obtained by calculating conditional expression for evaluation on a basis of CMA, about tap coefficient.

FIG. 5A is an overhead view of a 3-dimensional graph obtained by calculating conditional expression for evaluation on a basis of MMSE criterion, about tap coefficient. FIG. 5B is an overhead view of a 3-dimensional graph obtained by calculating conditional expression for evaluation on a basis of CMA, about tap coefficient. FIG. 6A is a top view of a 3-dimensional graph obtained by calculating conditional expression for evaluation on a basis of MMSE criterion, about tap coefficient. FIG. 6B is a top view of a 3-dimensional graph obtained by calculating conditional expression for evaluation on a basis of CMA, about tap coefficient. It should be noted that same conditions are used in propagation environment etc for those four 3-dimensional graphs.

From FIGS. 5A and 6A, it can be understood that in a case of performing an adaptive control of tap by use of stochastic gradient method on a basis of MMSE criterion evaluation condition with a reference signal, there is a convergence into an optimal point. On the other hand, it can be understood that, on a basis of CMA evaluation condition of an adaptive blind processing used in an adaptive antenna, the value of the evaluation conditional equation becomes minimal in any phase and an ambiguity of phase occurs, from FIGS. 5B and 6B. In a case of performing this adaptive blind equalization processing on each branch of a wireless communication apparatus, a phase of tap output is different in each branch; therefore, by performing a diversity combination, not only a diversity gain can not obtained, the gain might decrease contrarily.

(Case of Evaluation Condition with BUSSGANG Algorithm)

Next, an adaptive blind equalization processing using a BUSSGANG algorithm will be explained with an analysis by evaluation conditional equation.

BUSSGANG algorithm is a non linear problem which implicitly treats a higher-order statistics to minimize the value of an evaluation conditional equation. The evaluation condition $J_{BUSS}$ is defined by an equation as below.

$$J_{BUSS} = E\{(y_{iI}^2 - R)^2\} + E\{(y_{iQ}^2 - R)^2\} \quad \text{(Equation 35)}$$
$$= E\{y_{iI}^4\} - 2 \cdot R \cdot E\{y_{iI}^2\} + R^2 + E\{y_{iQ}^4\} -$$
$$2 \cdot R \cdot E\{y_{iQ}^2\} + R^2$$
$$= E\{|y_{iI}|^4 + |y_{iQ}|^4\} - 2 \cdot R \cdot E\{|y_{iI}|^2 + |y_{iQ}|^2\} +$$
$$2R^2$$

Here, $y_{iI}$ shows an in-phase component of a tap output, $y_k$ shows an quadrature-phase component and R shows a constant.

The content of the parenthesis in second term in the most right-handed side of the above equation can be shown as an equation below.

$$E[|y_{iI}|^2 + y_{iQ}|^2] = E[y_{iI}^2 + y_{iQ}^2] = \sigma_s^2 \cdot \|h_i\|_2^2 + \sigma_n^2 \cdot \|w_i\|_2^2 \quad \text{(Equation 36)}$$

where i=1,2

Also, the content of the parenthesis in the first term in the most right-handed side of the above equation can be shown as an equation below.

$$E[|y_{iI}|^4 + |y_{iQ}|^4] = \quad \text{(Equation 37)}$$
$$\frac{1}{4} \cdot \left\{ 3 \cdot \kappa_s \sigma_s^4 \sum_{k=0}^{P-1} |h_{ik}|^4 + \text{Re}\left\{ E[s^4] \sum_{k=0}^{P-1} h_{ik}^4 \right\} + \right.$$
$$3 \cdot |E[s^2]|^2 \cdot \sum_{k=0}^{P-1} \sum_{\substack{m=0 \\ m \neq k}}^{P-1} h_{ik}^2 \cdot h_{im}^{*2} +$$
$$3 \cdot \text{Re}\left\{ (E[s^2])^2 \cdot \sum_{k=0}^{P-1} \sum_{\substack{m=0 \\ m \neq k}}^{P-1} h_{ik}^2 \cdot h_{im}^2 \right\} +$$
$$6 \cdot \sigma_s^4 \sum_{k=0}^{P-1} \sum_{\substack{m=0 \\ m \neq k}}^{P-1} |h_{ik}|^2 |h_{im}|^2 +$$
$$3 \cdot \kappa_n |E[n^2]|^2 \cdot \sum_{k=0}^{2N-1} |W_{ik}|^4 + \text{Re}\left\{ E[n^4] \sum_{k=0}^{2N-1} W_{ik}^4 \right\} +$$

-continued
$$3 \cdot \sigma_n^4 \cdot \sum_{k=0}^{2N-1} \sum_{\substack{m=0 \\ m \neq k}}^{2N-1} W_{ik}^2 W_{im}^{*2} +$$
$$3 \cdot \text{Re}\left\{ (E[n^2])^2 \cdot \sum_{k=0}^{2N-1} \sum_{\substack{m=0 \\ m \neq k}}^{2N-1} W_{ik}^2 W_{im}^2 \right\} +$$
$$6 \cdot \sigma_n^4 \sum_{k=0}^{2N-1} \sum_{\substack{m=0 \\ m \neq k}}^{2N-1} |W_{ik}|^2 |W_{im}|^2 +$$
$$3 \cdot \left( E[s^2] \cdot \sum_{m=0}^{P-1} h_{im}^2 \right) \left( E[n^2] \cdot \sum_{n=0}^{2N-1} W_{in}^2 \right)^* +$$
$$12 \cdot \sigma_s^2 \cdot \|h_i\|_2^2 \cdot \sigma_n^2 \cdot \|W_i\|_2^2 +$$
$$3 \cdot \left( E[n^2] \cdot \sum_{n=0}^{2N-1} W_{in}^2 \right) \left( E[s^2] \cdot \sum_{m=0}^{P-1} h_{im}^2 \right)^* +$$
$$6 \cdot \text{Re}\left\{ \left( E[s^2] \sum_{m=0}^{P-1} h_{im}^2 \right) \left( E[n^2] \sum_{n=0}^{2N-1} W_{in}^2 \right) \right\} \right\}$$

Here, relationships can be established as below for high-order QAM signal.

$$\begin{cases} E[s^2] = 0 \\ E[s^2 \cdot |s^2|] = 0 \end{cases} \quad \text{(Equation 38)}$$

Also, relationships can be established as below for complex Gaussian noise.

$$E[n^2] = E[(n_1 + jn_2)(n_1 + jn_2)] = E[n_1^2] - E[n_1^2] = 0 \quad \text{(Equation 39)}$$
$$E[n^4] = E[(n_1 - n_2^2 + 2jn_1n_2)(n_1 - n_2^2 + 2jn_1n_2)] =$$
$$E[n_1^4 - n_1^2 n_2^2 + 2jn_1^3 n_2 - n_2^2 n_1^2 + n_2^4 -$$
$$2jn_1 n_2^3 + 2jn_1^3 n_2 - 2jn_1 n_2^3 - 4n_1^2 n_2^2] =$$
$$E[n_1^4] - 6E[n_1^2 n_2^2] + E[n_2^4] = 3\sigma_1^4 - 6\sigma_1^2 \sigma_2^2 + 3\sigma_2^4 = 0$$
$$\sigma_n^2 = E[|n|^2] = E[(n_1 + jn_2)(n_1 - jn_2)] =$$
$$E[n_1^2] + E[n_2^2] = 2\sigma_1^2 = 2\sigma_2^2$$
$$E[|n|^4] = E[(n_1 + jn_2)(n_1 - jn_2)(n_1 + jn_2)(n_1 - jn_2)] =$$
$$E[(n_1^2 + n_2^2)(n_1^2 + n_2^2)] = E[n_1^4] + 2E[n_1^2 n_2^2] + E[n_2^4] =$$
$$3\sigma_1^4 + 2\sigma_1^2 \sigma_2^2 + 3\sigma_2^4 = 8\sigma_1^4 = 8\sigma_2^4$$

Thus, an equation can be obtained as below.

$$E[|y_{iI}|^4 + |y_{iQ}|^4] = \quad \text{(Equation 40)}$$
$$\frac{3}{4} \cdot \left\{ \begin{array}{l} \kappa_s \sigma_s^4 \sum_{k=0}^{P-1} |h_{ik}|^4 + \frac{1}{3}\text{Re}\left\{ E[s^4] \sum_{k=0}^{P-1} h_{ik}^4 \right\} + 2 \cdot \\ \sigma_s^4 \sum_{k=0}^{P-1} \sum_{\substack{m=0 \\ m \neq k}}^{P-1} |h_{ik}|^2 |h_{im}|^2 + \\ \kappa_n \sigma_n^4 \sum_{k=0}^{2N-1} |W_{ik}|^4 + 2 \cdot \sigma_n^4 \sum_{k=0}^{2N-1} \sum_{\substack{m=0 \\ m \neq k}}^{2N-1} |W_{ik}|^2 |W_{im}|^2 + \\ 4 \cdot \sigma_s^2 \cdot \|h_i\|_2^2 \cdot \sigma_n^2 \cdot \|W_i\|_2^2 \end{array} \right\}$$

By substituting above results, the equation of the evaluation condition $J_{BUSS}$ becomes as below.

$$J_{BUSS} = E\{(y_{iI}^2 - R)^2\} + E\{(y_{iQ}^2 - R)^2\} \quad \text{(Equation 41)}$$

$$= E\{|y_{iI}|^4 + |y_{iQ}|^4\} - 2 \cdot R \cdot E\{|y_{iI}|^2 + |y_{iQ}|^2\} + 2 \cdot R^2$$

$$= \frac{3}{4} \cdot \left\{ \begin{array}{l} \kappa_s \sigma_s^4 \sum_{k=0}^{P-1} |h_{ik}|^4 + \frac{1}{3} Re\left\{E[s^4]\sum_{k=0}^{P-1} h_{ik}^4\right\} + \\ 2 \cdot \sigma_s^4 \sum_{k=0}^{P-1} \sum_{m=0, m \neq k}^{P-1} |h_{ik}|^2 |h_{im}|^2 + \\ \kappa_n \sigma_n^4 \sum_{k=0}^{2N-1} |W_{ik}|^4 + \\ 2 \cdot \sigma_n^4 \sum_{k=0}^{2N-1} \sum_{m=0, m \neq k}^{2N-1} |W_{ik}|^2 |W_{im}|^2 + \\ 4 \cdot \sigma_s^2 \cdot \|h_i\|_2^2 \cdot \sigma_n^2 \cdot \|W_i\|_2^2 \end{array} \right\} -$$

$$2 \cdot R \cdot \{\sigma_s^2 \cdot \|h_i\|_2^2 + \sigma_n^2 \cdot \|W_i\|_2^2\} + 2 \cdot R^2$$

It should be noticed that, to obtain an adaptive equalization processing by the stochastic gradient method on a basis of the first equation of the evaluation condition $J_{BUSS}$, a stochastic gradient vector with an approximation below can be used.

$$\hat{\nabla} J_{BUSS}(n) = 2 \cdot \frac{\partial \{(y_I^2(n) - R)^2 + (y_Q^2(n) - R)^2\}}{\partial W^*} \quad \text{(Equation 42)}$$

Here, n in parenthesis shows a discrete time.

Also, when r is a received signal vector to be inputted to the tap, an equation can be obtained as below.

$$y_I(n) = \frac{y(n) + y^*(n)}{2} \quad \text{(Equation 43)}$$

$$= \frac{r^T(n) \cdot W(n) + (r^T(n) \cdot W(n))^*}{2}$$

$$= \frac{r^T(n) \cdot W(n) + W^H(n) \cdot r^*(n)}{2}$$

This is due to the relational expression below.

$$\therefore \frac{\partial y_I(n)}{\partial W^*} = \frac{r^*(n)}{2} \quad \text{(Equation 44)}$$

Similarly, an equation can be obtained as below.

$$y_Q(n) = \frac{y(n) - y^*(n)}{2j} \quad \text{(Equation 45)}$$

$$= \frac{r^T(n) \cdot W(n) - (r^T(n) \cdot W(n))^*}{2j}$$

$$= \frac{r^T(n) \cdot W(n) + W^H(n) \cdot r^*(n)}{2j}$$

This is due to the relational expression below.

$$\therefore \frac{\partial y_Q(n)}{\partial W^*} = \frac{-r^*(n)}{2j} = j\frac{r^*(n)}{2} \quad \text{(Equation 46)}$$

By substituting the above, an equation can be obtained as below.

$$\hat{\nabla} J_{BUSS}(n) = 2 \cdot \frac{\partial \{(y_I^2(n) - R)^2 + (y_Q^2(n) - R)^2\}}{\partial W^*} \quad \text{(Equation 47)}$$

$$= 4 \cdot (y_I^2(n) - R) \cdot 2 \cdot y_I(n) \cdot \frac{r^*(n)}{2} +$$

$$4 \cdot (y_Q^2(n) - R) \cdot 2 \cdot y_Q(n) \cdot j\frac{r^*(n)}{2}$$

$$= 4 \cdot y_I(n) \cdot (y_I^2(n) - R) \cdot r^*(n) +$$

$$4j \cdot y_Q(n) \cdot (y_Q^2(n) - R) \cdot r^*(n)$$

Since updated tap coefficient is in an opposite direction of an instantaneous gradient vector, an equation can be finally obtained as below.

$$W(n+1) = W(n) - \mu \cdot \hat{\nabla} J_{BUSS}(n) \quad \text{(Equation 48)}$$

$$= W(n) - 4 \cdot \mu \cdot$$

$$\{y_I(n) \cdot (y_I^2(n) - R) + j \cdot y_Q(n) \cdot (y_Q^2(n) - R)\} \cdot$$

$$r^*(n)$$

By a recursive processing of this tap coefficient, an adaptive equalization processing can be realized by a stochastic gradient method. As it can be understood by the above equation, the processing is realized by a blind processing using no training signal such as a reference signal.

Figure 7A:
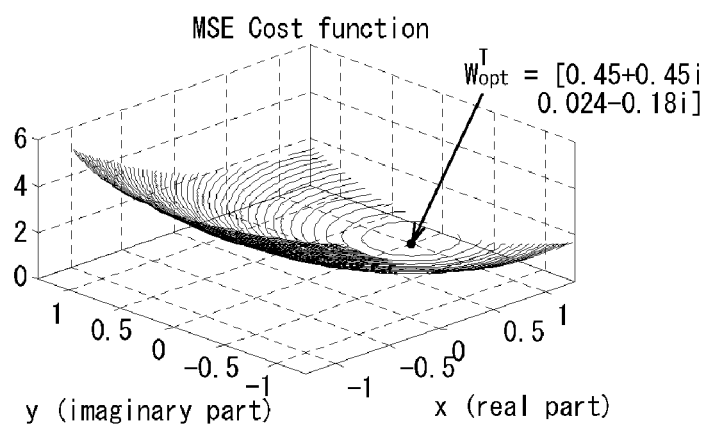
FIG. 7A is an overhead view of a 3-dimensional graph obtained by calculating conditional expression for evaluation on a basis of MMSE criterion, about tap coefficient.
Figure 7B:
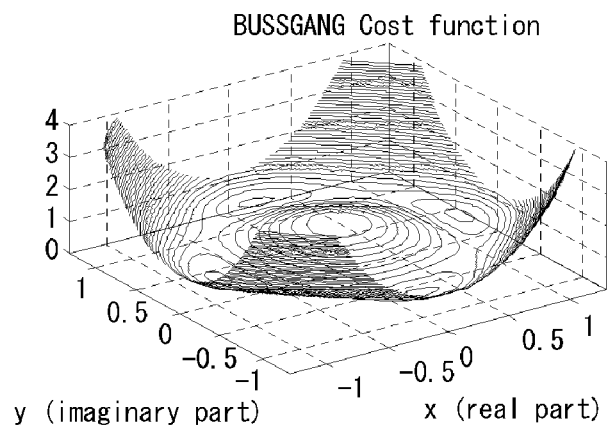
FIG. 7B is an overhead view of a 3-dimensional graph obtained by calculating conditional expression for evaluation on a basis of BUSSGANG algorithm, about tap coefficient.
Figure 8A:
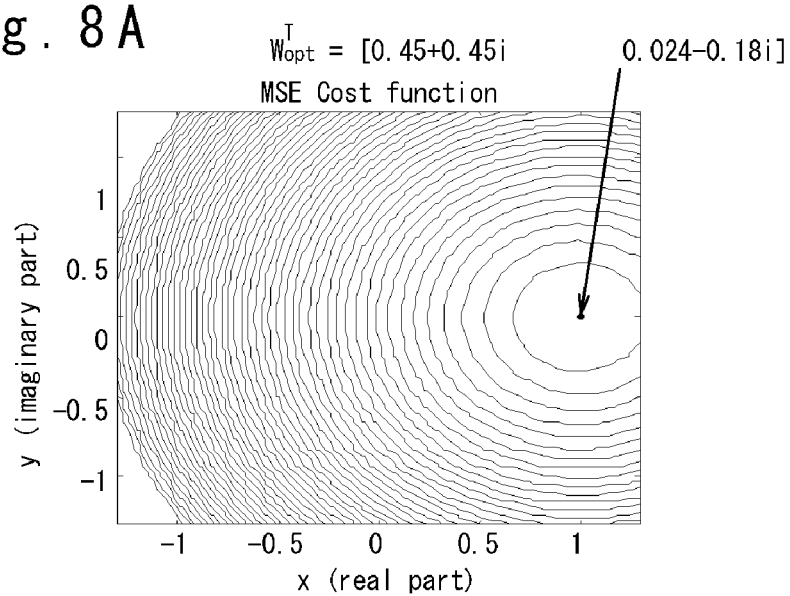
FIG. 8A is a top view of a 3-dimensional graph obtained by calculating conditional expression for evaluation on a basis of MMSE criterion, about tap coefficient.
Figure 8B:
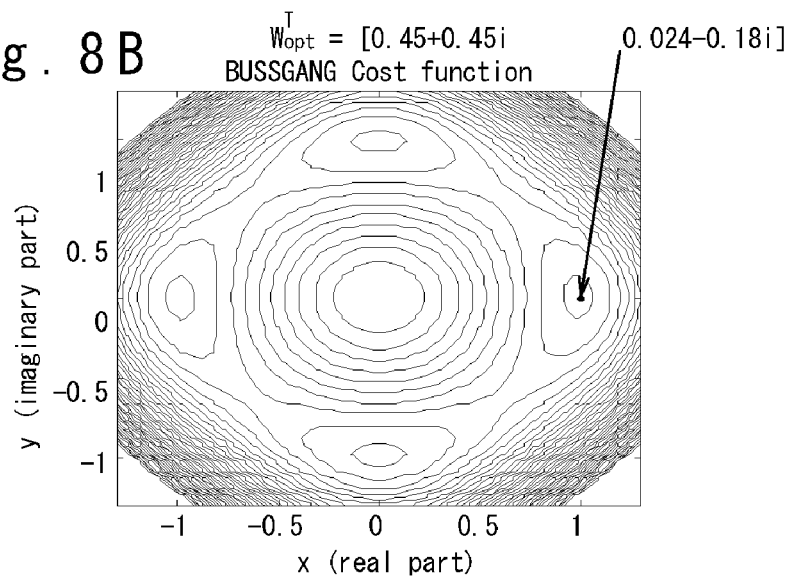
FIG. 8B is a top view of a 3-dimensional graph obtained by calculating conditional expression for evaluation on a basis of BUSSGANG algorithm, about tap coefficient.

FIG. 7A is an overhead view of a 3-dimensional graph obtained by calculating conditional expression for evaluation on a basis of MMSE criterion, about tap coefficient. FIG. 7B is an overhead view of a 3-dimensional graph obtained by calculating conditional expression for evaluation on a basis of BUSSGANG algorithm, about tap coefficient. FIG. 8A is a top view of a 3-dimensional graph obtained by calculating conditional expression for evaluation on a basis of MMSE criterion, about tap coefficient. FIG. 8B is a top view of a 3-dimensional graph obtained by calculating conditional expression for evaluation on a basis of BUSSGANG algorithm, about tap coefficient. It should be noted that same conditions are used in propagation environment etc for those four 3-dimensional graphs.

From FIGS. 7A and 8A, it can be understood that in a case of performing an adaptive control of tap by use of stochastic gradient method on a basis of MMSE criterion evaluation condition with a reference signal, there is a convergence into an optimal point. On the other hand, it can be understood that, in a case where the evaluation condition is an in-phase component and an quadrature-phase component of the transmitted signal, there is no more state in which the value of the evaluation conditional equation is minimal in any phase similarly to the above CMA case, though four minimal points, that is, local optimal points exist and four phase uncertainties occur, from FIGS. 7B and 8B. In a case of performing this adaptive blind equalization processing by applying evaluation condition based on the BUSSGANG algorithm on each branch of a wireless communication apparatus, the phase in four states of tap output is different in each branch; therefore, by performing a diversity combination, not only a diversity gain can not obtained, the gain might decrease contrarily. Or, processes and time will be needed to select the best combination detected by trying every combination of four states in each branch output.

Figure 9A:
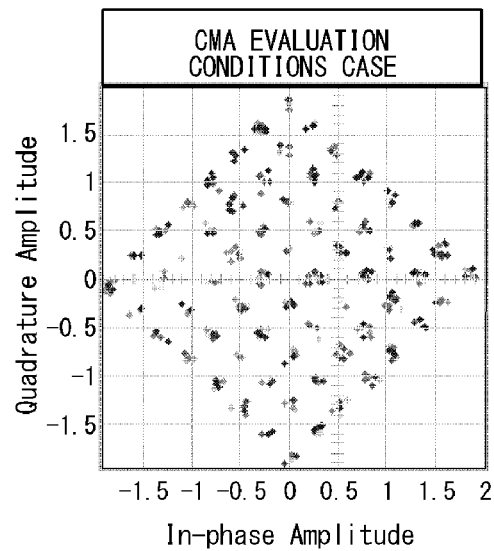
FIG. 9A is a tap output constellation in a case of performing an adaptive blind equalization process over 64 QAM by use of CMA used in adaptive antenna.
Figure 9B:
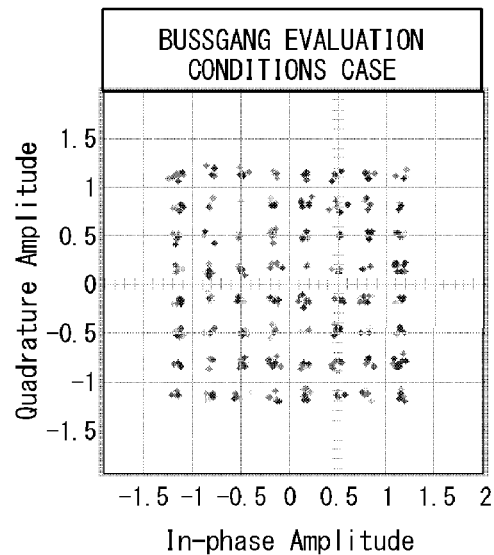
FIG. 9B is a tap output constellation in a case of performing an adaptive blind equalization process over 64 QAM by use of BUSSGANG algorithm.

FIG. 9A is a tap output constellation in a case of performing an adaptive blind equalization process over 64 QAM by use of CMA used in adaptive antenna. FIG. 9B is a tap output constellation in a case of performing an adaptive blind equalization process over 64 QAM by use of BUSSGANG algorithm.

As shown in FIG. 9A, the phase is unpredictable in a case of using CMA used in adaptive antenna. Also, as shown in FIG. 9B, in a case of a configuration by use of BUSSGANG algorithm, it seems to be good at first glance, but as explained above with the numerically calculated result of the evaluation conditional equation, there is an uncertainty of phase due to four local optimal points and the diversity combination in unrealizable.

(Case of BUSSGANG Evaluation Condition Applied to Tap Output Combination Signal in Each Branch)

Next, a case of evaluation conditional equation with BUSSGANG algorithm applied to tap output combined signal of each branch will be analyzed.

To show the tap output combined signal, an extended received signal vector r and an extended weight vector W are introduced and defined as below.

$$r = \begin{bmatrix} r_1 \\ r_2 \end{bmatrix} \quad \text{(Equation 49)}$$

$$W = \begin{bmatrix} W_1 \\ W_2 \end{bmatrix}$$

Here, vectors $r_1$ and $r_2$ show received signal vectors to be inputted to adaptive blind equalization processing in branch 1 and branch 2, respectively. Similarly, $W_1$ and $W_2$ show tap coefficients (weight vectors) of equalization filter in branch 1 and branch 2, respectively.

Thus, tap output combined signal y in each branch and each tap output y1 and y2 will be as shown below.

$$\begin{cases} y(n) = y_I(n) + jy_Q(n) = r^T(n) \cdot W(n) \\ y_1(n) = y_{1I}(n) + jy_{1Q}(n) = \begin{bmatrix} r_1(n) \\ 0 \end{bmatrix}^T \cdot W(n) \\ y_2(n) = y_{2I}(n) + jy_{2Q}(n) = \begin{bmatrix} 0 \\ r_2(n) \end{bmatrix}^T \cdot W(n) \end{cases} \quad \text{(Equation 50)}$$

Here, suffixes 1 and 2 respectively show a number of the corresponding branch.

On a basis of those extended vectors, an association of equalization processing and adaptive combination of branches 1 and 2 and updating of tap coefficients are performed as the equation below.

$$W(n+1) = W(n) - 4\mu \cdot \{y_I(n) \cdot (y_I^2(n) - AR) + j \cdot y_Q(n) \cdot (y_Q^2(n) - AR)\} \cdot r^*(n) \quad \text{(Equation 51)}$$

The optimal point of the tap coefficient in this update progress is non linear and therefore can not be shown as positively in closed form. Then, the analysis is performed on a basis of evaluation conditional equation. The evaluation conditional equation corresponding to the above equation is as below.

$$\begin{aligned}
J_{comb\_BUSS} &= E\{(y_I^2 - AR)^2\} + E\{(y_Q^2 - AR)^2\} \quad \text{(Equation 52)} \\
&= E\{|y_I|^4 + |y_Q|^4\} - 2 \cdot AR \cdot \\
&\quad E\{|y_I|^2 + |y_Q|^2\} + 2 \cdot AR^2 \\
&= E(y_{1I}^4 + y_{1Q}^4) + E(y_{2I}^4 + y_{2Q}^4) + 6 \cdot \\
&\quad E(y_{1I}^2 y_{2I}^2 + y_{1Q}^2 y_{2Q}^2) + 4 \cdot \\
&\quad E(y_{1I}^3 y_{2I} + y_{1Q}^3 y_{2Q}) + 4 \cdot \\
&\quad E(y_{1I} \cdot y_{2I}^3 + y_{1Q} \cdot y_{2Q}^3) - 2 \cdot AR \cdot \\
&\quad E\{|y_I|^2 + |y_Q|^2\} + 2 \cdot AR^2
\end{aligned}$$

Here, $y_I$ shows an in-phase component of a tap output combined signal, $y_Q$ shows an quadrature-phase component of a tap output combined signal and AR show a predetermined constant.

In the most right-hand side of the above equation, the content in the parenthesis of the first and the second terms can be transformed into below expressions, by use of above-mentioned equation (Equation 40).

$$E[|y_{iI}|^4 + |y_{iQ}|^4] = \quad \text{(Equation 53)}$$

$$\frac{3}{4} \cdot \left\{ \kappa_s \sigma_s^4 \sum_{k=0}^{P-1} |h_{ik}|^4 + \frac{1}{3} Re\left\{ E[s^4] \sum_{k=0}^{P-1} h_{ik}^4 \right\} + \right.$$

$$2 \cdot \sigma_s^4 \sum_{k=0}^{P-1} \sum_{m=0, m \neq k}^{P-1} |h_{ik}|^2 |h_{im}|^2 + \kappa_n \sigma_n^4 \sum_{k=0}^{2N-1} |W_{ik}|^4 +$$

$$2 \cdot \sigma_n^4 \sum_{k=0}^{2N-1} \sum_{m=0, m \neq k}^{2N-1} |W_{ik}|^2 |W_{im}|^2 +$$

$$\left. 4 \cdot \sigma_s^2 \cdot \|h_i\|_2^2 \cdot \sigma_n^2 \cdot \|W_i\|_2^2 \right\}$$

Similarly, the content of the parenthesis in the third term can be transformed as below.

$$\begin{aligned}
E[y_{1I}^2 y_{2I}^2] &= E[(a_1 + b_1)^2 (a_2 + b_2)^2] \quad \text{(Equation 54)} \\
&= E[(a_1^2 + b_1^2 + 2a_1 b_1) \cdot (a_2^2 + b_2^2 + 2a_2 b_2)] \\
&= E[a_1^2 a_2^2] + E[a_1^2] \cdot E[b_2^2] + \\
&\quad E[b_1^2] \cdot E[a_2^2] + E[b_1^2] \cdot E[b_2^2]
\end{aligned}$$

It should be noted that $a_i$ and $b_i$ are independent, $a_j$ and $b_j$ are independent and $b_i$ and $b_j$ are independent, respectively from each other. However, $a_i$ and $a_j$ have a correlation because their source is the same in diversity. In addition, relational equations below have been used.

$$\begin{cases} E[a_i] = \frac{1}{2} \cdot E[A_i + A_i^*] = \frac{1}{2} \cdot (E[A_i] + E[A_i^*]) = 0 & \because E[A_n] = h^T \cdot E[s(n)] = 0 \\ E[b_i] = \frac{1}{2} \cdot E[B_i + B_i^*] = \frac{1}{2} \cdot (E[B_i] + E[B_i^*]) = 0 & \because E[B_n] = W^T \cdot E[n(n)] = 0 \end{cases}$$ (Equation 55)

Each term in the most right-hand side in the above equation (Equation 54) will be calculated below. At first, the first term will be calculated as below.

$$E[a_1^2 a_2^2] = \frac{1}{4^2} E[(A_1 + A_1^*)^2 (A_2 + A_2^*)^2]$$ (Equation 56)
$$= \frac{1}{4^2} E[(A_1^2 + A_1^{*2} + 2|A_1|^2)(A_2^2 + A_2^{*2} + 2|A_2|^2)]$$
$$= \frac{1}{4^2} \begin{pmatrix} 2Re\{E[A_1^2 A_2^2]\} + 2Re\{E[A_1^2 A_2^{*2}]\} + \\ 4Re\{E[A_1^2 |A_2|^2]\} + 4Re\{E[|A_1|^2 A_2^2]\} + \\ 4E[|A_1|^2 |A_2|^2] \end{pmatrix}$$

Here, five terms in the parenthesis of the most right-hand side of the above equation (Equation 56) will be calculated in advance. A calculated result is obtained for the first term as below.

$$E[A_1^2 A_2^2] =$$ (Equation 57)
$$E\left[\sum_{k=0}^{P-1} h_{1k}^2 h_{2k}^2 \cdot s_k^4\right] + E\left[\sum_{k=0}^{P-1} \sum_{\substack{m=0 \\ m\neq k}}^{P-1} h_{1k}^2 \cdot s_k^2 \cdot h_{2m}^2 \cdot s_m^2\right] +$$
$$E\left[\sum_{k=0}^{P-1} \sum_{\substack{m=0 \\ m\neq k}}^{P-1} h_{1k} \cdot h_{1m} \cdot s_k \cdot s_m \cdot h_{2k} \cdot h_{2m} \cdot s_k \cdot s_m\right] +$$
$$E\left[\sum_{k=0}^{P-1} \sum_{\substack{m=0 \\ m\neq k}}^{P-1} h_{1k} \cdot h_{1m} \cdot s_k \cdot s_m \cdot h_{2k} \cdot h_{2m} \cdot s_m \cdot s_k\right]$$

The calculated result is obtained for the second term as below.

$$E[A_1^2 A_2^{*2}] =$$ (Equation 58)
$$E\left[\sum_{k=0}^{P-1} h_{1k}^2 h_{2k}^{*2} \cdot |s_k|^4\right] + E\left[\sum_{k=0}^{P-1} \sum_{\substack{m=0 \\ m\neq k}}^{P-1} h_{1k}^2 \cdot s_k^2 \cdot h_{2m}^{*2} \cdot s_m^{*2}\right] +$$
$$2E\left[\sum_{k=0}^{P-1} \sum_{\substack{m=0 \\ m\neq k}}^{P-1} h_{1k} h_{2k}^* |s_k|^2 \cdot h_{1m} h_{2m}^* |s_m|^2\right]$$

The calculated result is obtained for the third term as below.

[Equation 59]
$$E[A_1^2 |A_2|^2] = E\left[\sum_{k=0}^{P-1} h_{1k}^2 \cdot s_k^2 \cdot |h_{2k}|^2 \cdot |s_k|^2\right] +$$
$$E\left[\sum_{k=0}^{P-1} \sum_{\substack{m=0 \\ m\neq k}}^{P-1} h_{2k}^* \cdot h_{2k} \cdot s_k^* \cdot s_k \cdot h_{1m} \cdot h_{1m} \cdot s_m \cdot s_m\right] +$$
$$E\left[\sum_{k=0}^{P-1} \sum_{\substack{m=0 \\ m\neq k}}^{P-1} h_{2k}^* \cdot h_{2m} \cdot s_k^* \cdot s_m \cdot h_{1k} \cdot h_{1m} \cdot s_k \cdot s_m\right] +$$

-continued
$$E\left[\sum_{k=0}^{P-1} \sum_{\substack{m=0 \\ m\neq k}}^{P-1} h_{2k}^* \cdot h_{2m} \cdot s_k^* \cdot s_m \cdot h_{1m} \cdot h_{1k} \cdot s_m \cdot s_k\right]$$

The calculated result is obtained for the fourth term as below.

$$E[|A_1|^2 A_2^2] = E\left[\sum_{k=0}^{P-1} |h_{1k}|^2 \cdot |s_k|^2 \cdot h_{2k}^2 \cdot s_k^2\right] +$$ (Equation 60)
$$E\left[\sum_{k=0}^{P-1} \sum_{\substack{m=0 \\ m\neq k}}^{P-1} |h_{1k}|^2 \cdot |s_k|^2 \cdot h_{2m}^2 \cdot s_m^2\right] +$$
$$2 \cdot E\left[\sum_{k=0}^{P-1} \sum_{\substack{m=0 \\ m\neq k}}^{P-1} h_{1k}^* h_{1m} \cdot |s_k|^2 \cdot h_{2k} h_{2m} \cdot s_m^2\right]$$

The calculated result is obtained for the fifth term as below.

$$E[|A_1|^2 |A_2|^2] = E\left[\sum_{k=0}^{P-1} |h_{1k}|^2 |h_{2k}|^2 \cdot |s_k|^4\right] +$$ (Equation 61)
$$E\left[\sum_{k=0}^{P-1} \sum_{\substack{m=0 \\ m\neq k}}^{P-1} |h_{1k}|^2 \cdot |s_k|^2 \cdot |h_{2m}|^2 \cdot |s_m|^2\right] +$$
$$E\left[\sum_{k=0}^{P-1} \sum_{\substack{m=0 \\ m\neq k}}^{P-1} h_{1k} \cdot h_{1m}^* \cdot s_k \cdot s_m^* \cdot h_{2k} \cdot h_{2m}^* \cdot s_k \cdot s_m^*\right] +$$
$$E\left[\sum_{k=0}^{P-1} \sum_{\substack{m=0 \\ m\neq k}}^{P-1} h_{1k} \cdot h_{1m}^* \cdot s_k \cdot s_m^* \cdot h_{2m} \cdot h_{2k}^* \cdot s_m \cdot s_k^*\right]$$

By substituting those calculated results in the first term of the most right-hand side of the above equation (Equation 54) corresponding to the third term of the most right-hand side of the evaluation conditional equation (Equation 52), an equation can be obtained as below.

(Equation 62)

$$E[a_1^2 a_2^2] = \frac{1}{4^2}\begin{pmatrix} 2\text{Re}\{E[A_1^2 A_2^2]\} + 2\text{Re}\{E[A_1^2 A_2^{*2}]\} + \\ 4\text{Re}\{E[A_1^2 |A_2|^2]\} + 4\text{Re}\{E[|A_1|^2 A_2^2]\} + 4E[|A_1|^2 |A_2|^2] \end{pmatrix}$$

$$= \frac{1}{4^2} \cdot \begin{bmatrix} 2\text{Re}\left\{E\left[\sum_{k=0}^{P-1} h_{1k}^2 h_{2k}^2 \cdot s_k^4\right] + E\left[\sum_{k=0}^{P-1}\sum_{\substack{m=0\\m\neq k}}^{P-1} h_{1k}^2 \cdot s_k^2 \cdot h_{2m}^2 \cdot s_m^2\right] + 2E\left[\sum_{k=0}^{P-1}\sum_{\substack{m=0\\m\neq k}}^{P-1} h_{1k} h_{1m} h_{2k} h_{2m} \cdot s_k^2 s_m^2\right]\right\} + \\ 2\text{Re}\left\{E\left[\sum_{k=0}^{P-1} h_{1k}^2 h_{2k}^{*2} \cdot |s_k|^4\right] + E\left[\sum_{k=0}^{P-1}\sum_{\substack{m=0\\m\neq k}}^{P-1} h_{1k}^2 \cdot s_k^2 \cdot h_{2m}^{*2} \cdot s_m^{*2}\right] + 2E\left[\sum_{k=0}^{P-1}\sum_{\substack{m=0\\m\neq k}}^{P-1} h_{1k} h_{1m} h_{2k}^* h_{2m}^* \cdot |s_k|^2 |s_m|^2\right]\right\} + \\ 4\text{Re}\left\{E\left[\sum_{k=0}^{P-1} h_{1k}^2 s_k^2 \cdot |h_{2k}|^2 |s_k|^2\right] + E\left[\sum_{k=0}^{P-1}\sum_{\substack{m=0\\m\neq k}}^{P-1} h_{1m}^2 s_m^2 \cdot |h_{2k}|^2 |s_k|^2\right] + 2E\left[\sum_{k=0}^{P-1}\sum_{\substack{m=0\\m\neq k}}^{P-1} h_{1k} h_{1m} \cdot |s_k|^2 \cdot h_{2k}^* h_{2m} \cdot s_m^2\right]\right\} + \\ 4\text{Re}\left\{E\left[\sum_{k=0}^{P-1} |h_{1k}|^2 |s_k|^2 \cdot h_{2k}^2 s_k^2\right] + E\left[\sum_{k=0}^{P-1}\sum_{\substack{m=0\\m\neq k}}^{P-1} |h_{1k}|^2 |s_k|^2 \cdot h_{2m}^2 s_m^2\right] + 2E\left[\sum_{k=0}^{P-1}\sum_{\substack{m=0\\m\neq k}}^{P-1} h_{1k}^* h_{1m} \cdot |s_k|^2 \cdot h_{2k} h_{2m} \cdot s_m^2\right]\right\} + \\ 4\left\{E\left[\sum_{k=0}^{P-1} |h_{1k}|^2 |h_{2k}|^2 |s_k|^4\right] + E\left[\sum_{k=0}^{P-1}\sum_{\substack{m=0\\m\neq k}}^{P-1} |h_{1k}|^2 |s_k|^2 \cdot |h_{2m}|^2 |s_m|^2\right] + E\left[\sum_{k=0}^{P-1}\sum_{\substack{m=0\\m\neq k}}^{P-1} h_{1k} h_{2k}^* h_{1m}^* h_{2m} \cdot |s_k|^2 \cdot |s_m|^2\right]\right\} \end{bmatrix}$$

Next, the second, the third and the fourth terms in the most right-hand side of the above equation (Equation 54) related to the third term in the most right-hand side of the evaluation conditional equation (Equation 52) will be considered. Those three terms has a same form, each of which has a form of a product of two equations below.

(Equation 63)

$$\begin{cases} E[a_i^2] = \frac{1}{4} \cdot E[(A_i + A_i^*)^2] = \frac{1}{4} \cdot (E[A_i^2] + E[A_i^{*2}] + 2 \cdot E[|A_i|^2]) \\ E[b_i^2] = \frac{1}{4} \cdot E[(B_i + B_i^*)^2] = \frac{1}{4} \cdot (E[B_i^2] + E[B_i^{*2}] + 2 \cdot E[|B_i|^2]) \end{cases}$$

By calculating six terms in total of the most right-hand side of the two equations above, six equations can be obtained as below.

By substituting the above six equations in the above two equations (Equation 63), two equations can be obtained as below.

(Equation 65)

$$\begin{cases} E[a_i^2] = \frac{1}{2} \cdot \left\{\text{Re}\left(E[s^2] \cdot \sum_{m=0}^{P-1} h_{im}^2\right) + \sigma_s^2 \cdot \|h_i\|_2^2\right\} \\ E[b_i^2] = \frac{1}{2} \cdot \left\{\text{Re}\left(E[n^2] \cdot \sum_{n=0}^{2N-1} W_{in}^2\right) + \sigma_n^2 \cdot \|W_i\|_2^2\right\} \end{cases}$$

Thus, the above equation (Equation 54) related to the third term in the most right-hand side of the evaluation conditional equation (Equation 52) can be transformed as below.

(Equation 64)

$$\begin{cases} E[A_n^2] = E[(h^T \cdot s(n)) \cdot (h^T \cdot s(n))] = E\left[\left(\sum_{i=0}^{P-1} h_i \cdot s_i\right) \cdot \left(\sum_{i=0}^{P-1} h_i \cdot s_i\right)\right] = E[s^2] \cdot \sum_{i=0}^{P-1} h_i^2 \\ E[A_n^{*2}] = E[(h^T \cdot s(n))^* (h^T \cdot s(n))^*] = E\left[\left(\sum_{i=0}^{P-1} h_i \cdot s_i\right)^* \left(\sum_{i=0}^{P-1} h_i \cdot s_i\right)^*\right] = \left(E[s^2] \cdot \sum_{i=0}^{P-1} h_i^2\right)^* \\ E[|A_n|^2] = h^T \cdot E[s(n) \cdot s^H(n)] \cdot h^* = \sigma_s^2 \cdot \sum_{n=0}^{P-1} |h_n|^2 = \sigma_s^2 \cdot \|h\|_2^2 \\ E[B_n^2] = E[(W^T \cdot n(n)) \cdot (W^T \cdot n(n))] = E\left[\left(\sum_{i=0}^{2N-1} W_i \cdot n_i\right) \cdot \left(\sum_{i=0}^{2N-1} W_i \cdot n_i\right)\right] = E[n^2] \cdot \sum_{i=0}^{2N-1} W_i^2 \\ E[B_n^{*2}] = E[(W^T n(n))^* (W^T n(n))^*] = E\left[\left(\sum_{i=0}^{2N-1} W_i n_i\right)^* \left(\sum_{i=0}^{2N-1} W_i n_i\right)^*\right] = \left(E[n^2] \cdot \sum_{i=0}^{2N-1} W_i^2\right)^* \\ E[|B_n|^2] = W^T \cdot E[n(n) \cdot n^H(n)] \cdot W^* = \sigma_n^2 \cdot \sum_{n=0}^{2N-1} |W_n|^2 = \sigma_n^2 \cdot \|W\|_2^2 \end{cases}$$

$$E[y_{1l}^2 y_{2l}^2] = E[a_1^2 a_2^2] + E[a_1^2] \cdot E[b_2^2] + E[b_1^2] \cdot E[a_2^2] + E[b_1^2] \cdot E[b_2^2] \quad \text{(Equation 66)}$$

$$= \frac{1}{4^2} \cdot \begin{bmatrix} 2 \cdot \text{Re}\left\{ E[s^4] \cdot \sum_{k=0}^{P-1} h_{1k}^2 h_{2k}^2 + (E[s^2])^2 \cdot \sum_{k=0}^{P-1} \sum_{\substack{m=0\\m\neq k}}^{P-1} h_{1k}^2 h_{2m}^2 + 2 \cdot (E[s^2])^2 \cdot \sum_{k=0}^{P-1} \sum_{\substack{m=0\\m\neq k}}^{P-1} h_{1k} h_{1m} h_{2k} h_{2m} \right\} + \\ 2 \cdot \text{Re}\left\{ \kappa_s \cdot \sigma_s^4 \cdot \sum_{k=0}^{P-1} h_{1k}^2 h_{2k}^{*2} + E[s^2] \cdot E[s^2]^* \sum_{k=0}^{P-1} \sum_{\substack{m=0\\m\neq k}}^{P-1} h_{1k}^2 \cdot h_{2m}^{*2} + 2 \cdot \sigma_s^4 \cdot \sum_{k=0}^{P-1} \sum_{\substack{m=0\\m\neq k}}^{P-1} h_{1k} h_{1m} h_{2k}^* h_{2m}^* \right\} + \\ 4 \cdot \text{Re}\left\{ E[s^2|s|^2] \cdot \sum_{k=0}^{P-1} h_{1k}^2 |h_{2k}|^2 + E[s^2] \cdot \sigma_s^2 \cdot \sum_{k=0}^{P-1} \sum_{\substack{m=0\\m\neq k}}^{P-1} h_{1m}^2 |h_{2k}|^2 + 2 \cdot E[s^2] \cdot \sigma_s^2 \cdot \sum_{k=0}^{P-1} \sum_{\substack{m=0\\m\neq k}}^{P-1} h_{1k} h_{1m} h_{2k}^* h_{2m} \right\} + \\ 4 \cdot \text{Re}\left\{ E[s^2|s|^2] \cdot \sum_{k=0}^{P-1} |h_{1k}|^2 h_{2k}^2 + E[s^2] \cdot \sigma_s^2 \cdot \sum_{k=0}^{P-1} \sum_{\substack{m=0\\m\neq k}}^{P-1} |h_{1k}|^2 h_{2m}^2 + 2 \cdot E[s^2] \cdot \sigma_s^2 \cdot \sum_{k=0}^{P-1} \sum_{\substack{m=0\\m\neq k}}^{P-1} h_{1k}^* h_{1m} h_{2k} h_{2m} \right\} + \\ 4 \cdot \left\{ \kappa_s \cdot \sigma_s^4 \cdot \sum_{k=0}^{P-1} |h_{1k}|^2 |h_{2k}|^2 + \sigma_s^4 \cdot \sum_{k=0}^{P-1} \sum_{\substack{m=0\\m\neq k}}^{P-1} |h_{1k}|^2 |h_{2m}|^2 + \sigma_s^4 \cdot \sum_{k=0}^{P-1} \sum_{\substack{m=0\\m\neq k}}^{P-1} h_{1k} h_{2K}^* h_{1m}^* h_{2m} \right\} \end{bmatrix}$$

$$\frac{1}{4} \cdot \left\{ \text{Re}\left( E[s^2] \cdot \sum_{m=0}^{P-1} h_{1m}^2 \right) + \sigma_s^2 \cdot \|h_1\|_2^2 \right\} \left\{ \text{Re}\left( E[n^2] \cdot \sum_{n=0}^{2N-1} W_{2n}^2 \right) + \sigma_n^2 \cdot \|W_2\|_2^2 \right\} +$$

$$\frac{1}{4} \cdot \left\{ \text{Re}\left( E[s^2] \cdot \sum_{m=0}^{P-1} h_{2m}^2 \right) + \sigma_s^2 \cdot \|h_2\|_2^2 \right\} \left\{ \text{Re}\left( E[n^2] \cdot \sum_{n=0}^{2N-1} W_{1n}^2 \right) + \sigma_n^2 \cdot \|W_1\|_2^2 \right\} +$$

$$\frac{1}{4} \cdot \left\{ \text{Re}\left( E[n^2] \cdot \sum_{m=0}^{2N-1} W_{1n}^2 \right) + \sigma_u^2 \cdot \|w_1\|_2^2 \right\} \left\{ \text{Re}\left( E[n^2] \cdot \sum_{n=0}^{2N-1} W_{2n}^2 \right) + \sigma_n^2 \cdot \|W_2\|_2^2 \right\}$$

Next, the fourth and the fifth terms in the most right-hand side of the above evaluation conditional equation (Equation 52) will be considered. Then, an equation can be obtained with a form below.

$$E[y_{il}^3 y_{jl}] = E[(a_i + b_i)^3 (a_j + b_j)] \quad \text{(Equation 67)}$$
$$= E[(a_i^2 + b_i^2 + 2a_i b_i)(a_i + b_i) \cdot (a_j + b_j)]$$
$$= E[a_i^3 a_j] + 3 \cdot E[b_i^2 a_i a_j]$$
$$= E[a_i^3 a_j] + 3 \cdot E[b_i^2] \cdot E[a_i a_j]$$

Here, in relation with the first term in the most right-hand side of the above equation (Equation 67), the calculation can be performed as below.

$$E[a_i^3 a_j] = \frac{1}{4^2} E[(A_i + A_i^*)^3 (A_j + A_j^*)] \quad \text{(Equation 68)}$$
$$= \frac{1}{4^2} E[(A_i^3 + A_i^{*3} + 3A_i|A_i|^2 + 3A_i^*|A_i|^2)(A_j + A_j^*)]$$
$$= \frac{1}{4^2} \begin{pmatrix} 2Re\{E[A_i^3 A_j]\} + 2Re\{E[A_i^{*3} A_j]\} + \\ 6Re\{E[A_i|A_i|^2 A_j]\} + 6Re\{E[A_i^*|A_i|^2 A_j]\} \end{pmatrix}$$

The first, the second, the third and the fourth terms in the parenthesis of the most right-hand side of the above equation (Equation 68) will be calculated in advance. By calculating the first term, an equation can be obtained as below.

$$E[A_i^3 A_j] = E[A_j A_i^3] \quad \text{(Equation 69)}$$
$$= E[(h_j^T \cdot s(n)) \cdot (h_i^T \cdot s(n)) \cdot (h_i^T \cdot s(n)) \cdot (h_i^T \cdot s(n))]$$

$$= E\left[\sum_{k=0}^{P-1} h_{jk} h_{ik}^3 s_k^4\right] + 3E\left[\sum_{k=0}^{P-1} \sum_{\substack{m=0\\m\neq k}}^{P-1} h_{jk} h_{ik} h_{im}^2 \cdot s_k^2 s_m^2\right]$$

By calculating the second term, an equation can be obtained as below.

$$E[A_i^{*3} A_j] = E[A_j A_i^{*3}] \quad \text{(Equation 70)}$$
$$= E[(h_j^T \cdot s(n)) \cdot (h_i^T \cdot s(n))^* \cdot (h_i^T \cdot s(n))^* \cdot (h_i^T \cdot s(n))^*]$$

$$= E\left[\sum_{k=0}^{P-1} h_{jk} h_{ik}^{*3} |s_k|^2 s_k^{*2}\right] + 3 \cdot E\left[\sum_{k=0}^{P-1} \sum_{\substack{m=0\\m\neq k}}^{P-1} h_{jk} h_{ik}^* \cdot |s_k|^2 \cdot h_{im}^{*2} \cdot s_m^{*2}\right]$$

By calculating the third term, an equation can be obtained as below.

$$E[A_i|A_i|^2 A_j] = E[A_j A_i|A_i|^2] \quad \text{(Equation 71)}$$
$$= E\begin{bmatrix} (h_j^T \cdot s(n)) \cdot (h_i^T \cdot s(n)) \cdot \\ (h_i^T \cdot s(n)) \cdot (h_i^T \cdot s(n))^* \end{bmatrix}$$

$$= \begin{array}{l} E\left[\sum_{k=0}^{P-1} h_{jk} h_{ik} s_k^2 |h_{ik}|^2 |s_k|^2\right] + \\ 2E\left[\sum_{k=0}^{P-1} \sum_{\substack{m=0 \\ m \neq k}}^{P-1} h_{jk} h_{ik} s_k^2 |h_{im}|^2 |s_m|^2\right] + \\ E\left[\sum_{k=0}^{P-1} \sum_{\substack{m=0 \\ m \neq k}}^{P-1} h_{jk} h_{ik}^* |s_k|^2 h_{im}^{*2} s_m^2\right] \end{array}$$

By calculating the fourth term, an equation can be obtained as below.

$$E[A_i^* |A_i|^2 A_j] = E[A_j A_i^* |A_i|^2] \quad \text{(Equation 72)}$$

$$= E\left[\begin{array}{l}(h_j^T \cdot s(n)) \cdot (h_i^T \cdot s(n))^* \cdot \\ (h_i^T \cdot s(n)) \cdot (h_i^T \cdot s(n))^*\end{array}\right]$$

$$= \begin{array}{l} E\left[\sum_{k=0}^{P-1} h_{jk} h_{ik}^* \cdot |s_k|^4 |h_{ik}|^2\right] + \\ 2E\left[\sum_{k=0}^{P-1} \sum_{\substack{m=0 \\ m \neq k}}^{P-1} h_{jk} h_{ik}^* |s_k|^2 |h_{im}|^2 |s_m|^2\right] + \\ E\left[\sum_{k=0}^{P-1} \sum_{\substack{m=0 \\ m \neq k}}^{P-1} h_{jk} h_{ik} s_k^2 h_{im}^{*2} s_m^{*2}\right] \end{array}$$

By substituting those four equations in the original equation (Equation 68), an equation can be obtained as below.

$$E[a_i^3 a_j] = \frac{1}{4^2}(2\text{Re}\{E[A_i^3 A_j]\} + 2\text{Re}\{E[A_i^{*3} A_j]\} + \quad \text{(Equation 73)}$$
$$6\text{Re}\{E[A_i |A_i|^2 A_j]\} + 6\text{Re}\{E[A_i^* |A_i|^2 A_j]\}) =$$

$$\frac{1}{4^2} \cdot \left[ 2 \cdot \text{Re}\left\{ E\left[\sum_{k=0}^{P-1} h_{jk} h_{ik}^3 s_k^4\right] + \right.\right.$$
$$3E\left[\sum_{k=0}^{P-1} \sum_{\substack{m=0 \\ m \neq k}}^{P-1} h_{jk} h_{ik} h_{im}^2 \cdot s_k^2 s_m^2\right]\right\} +$$
$$2 \cdot \text{Re}\left\{ E\left[\sum_{k=0}^{P-1} h_{jk} h_{ik}^{*3} |s_k|^2 s_k^{*2}\right] + \right.$$
$$3 \cdot E\left[\sum_{k=0}^{P-1} \sum_{\substack{m=0 \\ m \neq k}}^{P-1} h_{jk} h_{ik}^* \cdot |s_k|^2 \cdot h_{im}^{*2} \cdot s_m^{*2}\right]\right\} +$$
$$2 \cdot \text{Re}\left\{ E\left[\sum_{k=0}^{P-1} h_{jk} h_{ik} s_k^2 |h_{ik}|^2 |s_k|^2\right] + \right.$$
$$2E\left[\sum_{k=0}^{P-1} \sum_{\substack{m=0 \\ m \neq k}}^{P-1} h_{jk} h_{ik} s_k^2 |h_{im}|^2 |s_m|^2\right] +$$
$$E\left[\sum_{k=0}^{P-1} \sum_{\substack{m=0 \\ m \neq k}}^{P-1} h_{jk} h_{ik}^* |s_k|^2 h_{im}^2 s_m^2\right]\right\} +$$
$$2 \cdot \text{Re}\left\{ E\left[\sum_{k=0}^{P-1} h_{jk} h_{ik}^* \cdot |s_k|^4 |h_{ik}|^2\right] + \right.$$
$$2E\left[\sum_{k=0}^{P-1} \sum_{\substack{m=0 \\ m \neq k}}^{P-1} h_{jk} h_{ik}^* |s_k|^2 |h_{im}|^2 |s_m|^2\right] +$$

$$E\left[\sum_{k=0}^{P-1} \sum_{\substack{m=0 \\ m \neq k}}^{P-1} h_{jk} h_{ik} s_k^2 h_{im}^{*2} s_m^{*2}\right]\right\}\right]$$

Next, a calculation as below is performed in relation with the second term in the most right-hand side of the above equation (Equation 67) related to the fourth and the fifth terms in the most right-hand side of the evaluation conditional equation (Equation 52).

$$E[a_i a_j] = \frac{1}{4} E[(A_i + A_i^*)(A_j + A_j^*)] \quad \text{(Equation 74)}$$

$$= \frac{1}{4}\left(\begin{array}{l} E[A_i A_j] + E[A_i A_j^*] + \\ E[A_i^* A_j] + E[A_i^* A_j^*] \end{array}\right)$$

By calculating the first, the second, the third and the fourth terms in the parenthesis of the most right-hand side of the above equation (Equation 74), four equations can be obtained as below, respectively.

$$\left\{\begin{array}{l} E[A_i A_j] = E\left[\left(\sum_{k=0}^{P-1} h_{ik} \cdot s_k\right) \cdot \left(\sum_{k=0}^{P-1} h_{jk} \cdot s_k\right)\right] \\ \quad = E\left[\sum_{k=0}^{P-1} \sum_{m=0}^{P-1} h_{ik} \cdot s_k \cdot h_{jm} \cdot s_m\right] \\ \quad = E[s^2] \cdot \sum_{k=0}^{P-1} h_{ik} h_{jk} \\ E[A_i A_j^*] = E\left[\left(\sum_{k=0}^{P-1} h_{ik} \cdot s_k\right) \cdot \left(\sum_{k=0}^{P-1} h_{jk} \cdot s_k\right)^*\right] \\ \quad = E\left[\sum_{k=0}^{P-1} \sum_{m=0}^{P-1} h_{ik} \cdot s_k \cdot h_{jm}^* \cdot s_m^*\right] \\ \quad = \sigma_s^2 \cdot \sum_{k=0}^{P-1} h_{ik} h_{jk}^* \\ E[A_i^* A_j] = E\left[\left(\sum_{k=0}^{P-1} h_{ik} \cdot s_k\right)^* \cdot \left(\sum_{k=0}^{P-1} h_{jk} \cdot s_k\right)\right] \\ \quad = E\left[\sum_{k=0}^{P-1} \sum_{m=0}^{P-1} h_{ik}^* \cdot s_k^* \cdot h_{jm} \cdot s_m\right] \\ \quad = \sigma_s^2 \cdot \sum_{k=0}^{P-1} h_{ik}^* h_{jk} \\ E[A_i^* A_j^*] = E\left[\left(\sum_{k=0}^{P-1} h_{ik} \cdot s_k\right)^* \cdot \left(\sum_{k=0}^{P-1} h_{jk} \cdot s_k\right)^*\right] \\ \quad = E\left[\sum_{k=0}^{P-1} \sum_{m=0}^{P-1} h_{ik}^* \cdot s_k^* \cdot h_{jm}^* \cdot s_m^*\right] \\ \quad = E[s^{*2}] \cdot \sum_{k=0}^{P-1} h_{ik}^* h_{jk}^* \end{array}\right. \quad \text{(Equation 75)}$$

From those equations, the second term in the most right-hand side of the above equation (Equation 67) related to the fourth and the fifth terms in the most right-hand side of the evaluation conditional equation (Equation 52) can be obtained as below.

$$E[b_i^2 a_i a_j] = E[b_i^2] E[a_i a_j] \quad \text{(Equation 76)}$$

$$= \frac{1}{2} \cdot \left\{ \text{Re}\left( E[n^2] \cdot \sum_{n=0}^{2N-1} W_{in}^2 \right) + \sigma_n^2 \cdot \|W_i\|_2^2 \right\} \cdot$$

$$\frac{1}{2} \text{Re}\left\{ E[s^2] \cdot \sum_{k=0}^{P-1} h_{ik} h_{jk} + \sigma_s^2 \cdot \sum_{k=0}^{P-1} h_{ik} h_{jk}^* \right\}$$

$$= \frac{1}{4} \cdot \left\{ \text{Re}\left( E[n^2] \cdot \sum_{n=0}^{2N-1} W_{in}^2 \right) + \sigma_n^2 \cdot \|W_i\|_2^2 \right\} \cdot$$

$$\text{Re}\left\{ E[s^2] \cdot \sum_{k=0}^{P-1} h_{ik} h_{jk} + \sigma_s^2 \cdot \sum_{k=0}^{P-1} h_{ik} h_{jk}^* \right\}$$

In summary, the above equation (Equation 67) related to the fourth and the fifth terms in the most right-hand side of the evaluation conditional equation (Equation 52) can be obtained as below.

$$E[y_{iI}^3 y_{jI}] = \quad \text{(Equation 77)}$$

$$E[a_i^3 a_j] + 3 \cdot E[b_i^2 a_i a_j] = \frac{1}{4^2} \cdot \left[ 2 \cdot \text{Re}\left\{ E[s^4] \cdot \sum_{k=0}^{P-1} h_{jk} h_{ik}^3 \right\} + \right.$$

$$3 \cdot E[s^2] E[s^2] \cdot \sum_{k=0}^{P-1} \sum_{m=0, m \neq k}^{P-1} h_{jk} h_{ik} h_{im}^2 \right\} +$$

$$2 \cdot \text{Re}\left\{ E[|s|^2 s^{*2}] \sum_{k=0}^{P-1} h_{jk} h_{ik}^{*3} \right\} +$$

$$3 \cdot \sigma_s^2 \cdot E[s^{*2}] \sum_{k=0}^{P-1} \sum_{m=0, m \neq k}^{P-1} h_{jk} h_{ik}^* h_{im}^{*2} \right\} +$$

$$6 \cdot \text{Re}\left\{ E[s^2 |s|^2] \sum_{k=0}^{P-1} h_{jk} h_{ik} |h_{ik}|^2 \right\} +$$

$$2 \cdot E[s^2] \sigma_s^2 \sum_{k=0}^{P-1} \sum_{m=0, m \neq k}^{P-1} h_{jk} h_{ik} |h_{im}|^2 +$$

$$\sigma_s^2 E[s^2] \sum_{k=0}^{P-1} \sum_{m=0, m \neq k}^{P-1} h_{jk} h_{ik}^* h_{im}^2 \right\} +$$

$$6 \cdot \text{Re}\left\{ E[|s|^4] \sum_{k=0}^{P-1} h_{jk} h_{ik}^* \cdot |h_{ik}|^2 \right\} +$$

$$2 \cdot \sigma_s^4 \sum_{k=0}^{P-1} \sum_{m=0, m \neq k}^{P-1} h_{jk} h_{ik}^* |h_{im}|^2 +$$

$$E[s^2] E[s^{*2}] \sum_{k=0}^{P-1} \sum_{m=0, m \neq k}^{P-1} h_{jk} h_{ik} h_{im}^{*2} \right] +$$

$$\frac{3}{4} \cdot \left\{ \text{Re}\left( E[n^2] \cdot \sum_{n=0}^{2N-1} W_{in}^2 \right) + \sigma_n^2 \cdot \|W_i\|_2^2 \right\} \cdot \text{Re}$$

$$\left\{ E[s^2] \cdot \sum_{k=0}^{P-1} h_{ik} h_{jk} + \sigma_s^2 \cdot \sum_{k=0}^{P-1} h_{ik} h_{jk}^* \right\}$$

Here, in a case where the transmitted signal is in 64 QAM, the evaluation conditional equation (Equation 52) is as below.

$$J_{comb\_BUSS} = E\{(y_I^2 - AR)^2\} + E\{(y_Q^2 - AR)^2\} \quad \text{(Equation 78)}$$

$$= E\{|y_I|^4 + |y_Q|^4\} - 2 \cdot AR \cdot$$

$$E\{|y_I|^2 + |y_Q|^2\} + 2 \cdot AR^2$$

$$= (y_{1I}^4 + y_{1Q}^4) + (y_{2I}^4 + y_{2Q}^4) + 6 \cdot$$

$$(y_{1I}^2 y_{2I}^2 + y_{1Q}^2 y_{2Q}^2) + 4 \cdot$$

$$(y_{1I}^3 y_{2I} + y_{1Q}^3 y_{2Q}) + 4 \cdot$$

$$(y_{1I} \cdot y_{2I}^3 + y_{1Q} \cdot y_{2Q}^3) - 2 \cdot AR \cdot$$

$$E\{|y_I|^2 + |y_Q|^2\} + 2 \cdot AR^2$$

$$= \frac{3}{4} \left\{ \begin{array}{l} -(2 - 1.381) \sum_{k=0}^{P-1} |h_{1k}|^4 - \\ \frac{0.61905}{3} \text{Re}\left\{ \sum_{k=0}^{P-1} h_{1k}^4 \right\} + \\ 2 \cdot \|h_1\|_2^4 + 2\sigma_n^4 \cdot \|W_1\|_2^4 + \\ 4\sigma_n^2 \cdot \|h_1\|_2^2 \|W_1\|_2^2 \end{array} \right\} +$$

$$\frac{3}{4} \left\{ \begin{array}{l} -(2 - 1.381) \sum_{k=0}^{P-1} |h_{2k}|^4 - \\ \frac{0.61905}{3} \text{Re}\left\{ \sum_{k=0}^{P-1} h_{2k}^4 \right\} + \\ 2 \cdot \|h_2\|_2^4 + 2\sigma_n^4 \cdot \|W_2\|_2^4 + \\ 4\sigma_n^2 \cdot \|h_2\|_2^2 \|W_2\|_2^2 \end{array} \right\} +$$

$$3 \cdot \left[ \begin{array}{l} \frac{-0.61905}{2} \cdot \text{Re}\left\{ \sum_{k=0}^{P-1} h_{1k}^2 h_{2k}^2 \right\} + \frac{1}{2} \cdot \\ \text{Re}\left\{ \begin{array}{l} -(2 - 1.381) \cdot \sum_{k=0}^{P-1} h_{1k}^2 h_{2k}^{*2} + \\ 2 \cdot \left( \sum_{k=0}^{P-1} h_{1k} h_{2k}^* \right)^2 \end{array} \right\} - \\ (2 - 1.381) \cdot \sum_{k=0}^{P-1} |h_{1k}|^2 |h_{2k}|^2 + \\ 1 \cdot \left( \sum_{k=0}^{P-1} |h_{1k}|^2 \right) \left( \sum_{k=0}^{P-1} |h_{2k}|^2 \right) + \\ \left| \sum_{k=0}^{P-1} h_{1k} h_{2k}^* \right|^2 + \sigma_n^2 \cdot \|h_1\|_2^2 \cdot \|W_2\|_2^2 + \\ \sigma_n^2 \cdot \|h_2\|_2^2 \cdot \|W_1\|_2^2 + \sigma_n^4 \cdot \|W_1\|_2^2 \cdot \|W_2\|_2^2 \end{array} \right] +$$

$$\left[ \begin{array}{l} -0.61905 \cdot \text{Re}\left\{ \sum_{k=0}^{P-1} h_{2k} h_{1k}^3 \right\} + 3 \cdot \\ \text{Re}\left\{ \begin{array}{l} -(2 - 1.381) \cdot \sum_{k=0}^{P-1} h_{2k} h_{1k}^* |h_{1k}|^2 + \\ 2 \cdot \left( \sum_{k=0}^{P-1} h_{2k} h_{1k}^* \right) \left( \sum_{k=0}^{P-1} |h_{1k}|^2 \right) \end{array} \right\} + \\ 6 \cdot \sigma_n^2 \cdot \|W_1\|_2^2 \cdot \text{Re}\left\{ \sum_{k=0}^{P-1} h_{1k} h_{2k}^* \right\} + \end{array} \right.$$

-continued
$$\begin{bmatrix} -0.61905 \cdot \text{Re}\left\{\sum_{k=0}^{P-1} h_{1k} h_{2k}^3\right\} + 3 \cdot \\ \text{Re}\left\{\begin{array}{l} -(2-1.381) \cdot \sum_{k=0}^{P-1} h_{1k} h_{2k}^* |h_{2k}|^2 + \\ 2 \cdot \left(\sum_{k=0}^{P-1} h_{1k} h_{2k}^*\right)\left(\sum_{k=0}^{P-1} |h_{2k}|^2\right) \end{array}\right\} \end{bmatrix} +$$

$$6 \cdot \sigma_n^2 \cdot \|W_2\|_2^2 \cdot \text{Re}\left\{\sum_{k=0}^{P-1} h_{2k} h_{1k}^*\right\} - 2 \cdot AR \cdot$$

$$\left\{ \begin{array}{l} \sigma_s^2 \cdot (\|h_1\|_2^2 + \|h_2\|_2^2) + 2 \cdot \sigma_s^2 \cdot \\ \text{Re}\left\{E\left[\sum_{k=0}^{P-1} h_{1k} \cdot h_{2k}^*\right]\right\} + \sigma_n^2 \cdot \\ (\|W_1\|_2^2 + \|W_2\|_2^2) \end{array} \right\} +$$

$$2 \cdot AR^2$$

To obtain the above equation (Equation 78), nine equations below were used.

$$\begin{cases} E[n^2] = E[(n_1 + jn_2)(n_1 + jn_2)] \\ \quad = E[n_1^2] - E[n_1^2] \\ \quad = 0 \\ E[n^4] = E\begin{bmatrix} (n_1 - n_2^2 + 2jn_1 n_2) \\ (n_1 - n_2^2 + 2jn_1 n_2) \end{bmatrix} \\ \quad = 0 \\ \sigma_n^2 = E[|n|^2] \\ \quad = E[(n_1 + jn_2)(n_1 - jn_2)] \\ \quad = E[n_1^2] + E[n_2^2] \\ \quad = 2\sigma_1^2 = 2\sigma_2^2 \\ E[|n|^4] = E[(n_1^2 + n_2^2)(n_1^2 + n_2^2)] \\ \quad = 8\sigma_1^4 = 8\sigma_2^4 \\ \therefore \kappa_n = E[|n|^4]/\sigma_n^4 = 2 \\ E[s^2] = 0 \\ E[s^4] = -0.61905 \\ E[s^2 \cdot |s^2|] = 0 \\ E[|s^4|] = 1.381 \\ \therefore \kappa_s = E[|s|^4]/\sigma_s^4 = 1.381 \end{cases}$$ (Equation 79)

A calculation of an optimal point in the evaluation conditional equation (Equation 78) obtained above can be realized by a stochastic gradient method of an adaptive equalization using the recursive processing equation (Equation 51) of tap coefficient. As it can be understood with this equation, this calculation is realized by a blind processing using no training signal such as a reference signal etc.

Figure 10A:
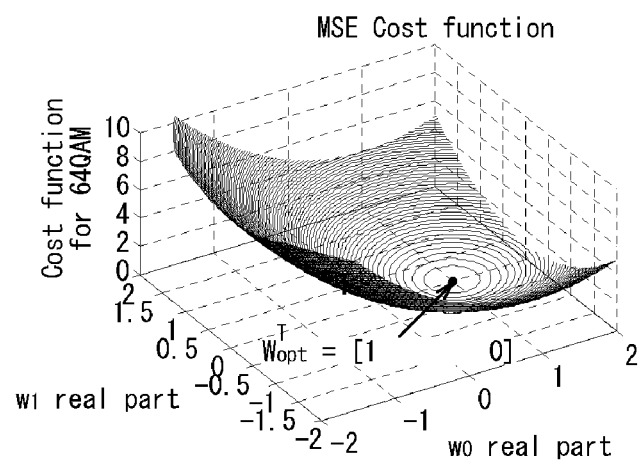
FIG. 10A is an overhead view of a 3-dimensional graph showing an optimal solution obtained by calculating conditional expression for evaluation on a basis of MMSE criterion, about tap coefficient.
Figure 10B:
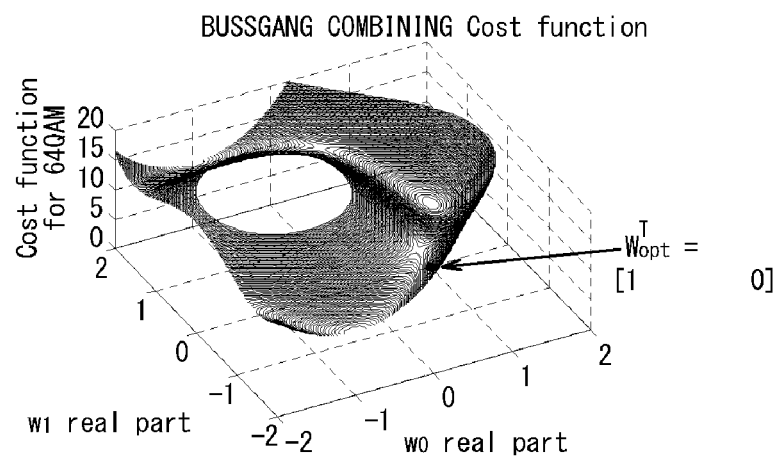
FIG. 10B is an overhead view of a 3-dimensional graph showing an optimal solution obtained by calculating conditional expression for evaluation on a basis of BUSSGANG algorithm, about tap coefficient.

FIG. 10A is an overhead view of a 3-dimensional graph showing an optimal solution obtained by calculating conditional expression for evaluation on a basis of MMSE criterion, about tap coefficient. FIG. 10B is an overhead view of a 3-dimensional graph showing an optimal solution obtained by calculating conditional expression for evaluation on a basis of BUSSGANG algorithm, about tap coefficient. It should be noted that calculated results shown in FIGS. 10A and 10B are obtained under same conditions of propagation environment etc.

From FIGS. 10A and 10B, it can be understood that there is a convergence into an optimal point in a case of performing a tap adaptive equalization control by use of stochastic gradient method on a basis of evaluation condition with MMSE criterion using a reference signal. On the other hand, it can be understood that, there are a plurality of local optimal points in a case of performing an adaptive control of tap coefficient with the in-phase component and the quadrature-phase component of the tap output combined signal.

Figure 11:
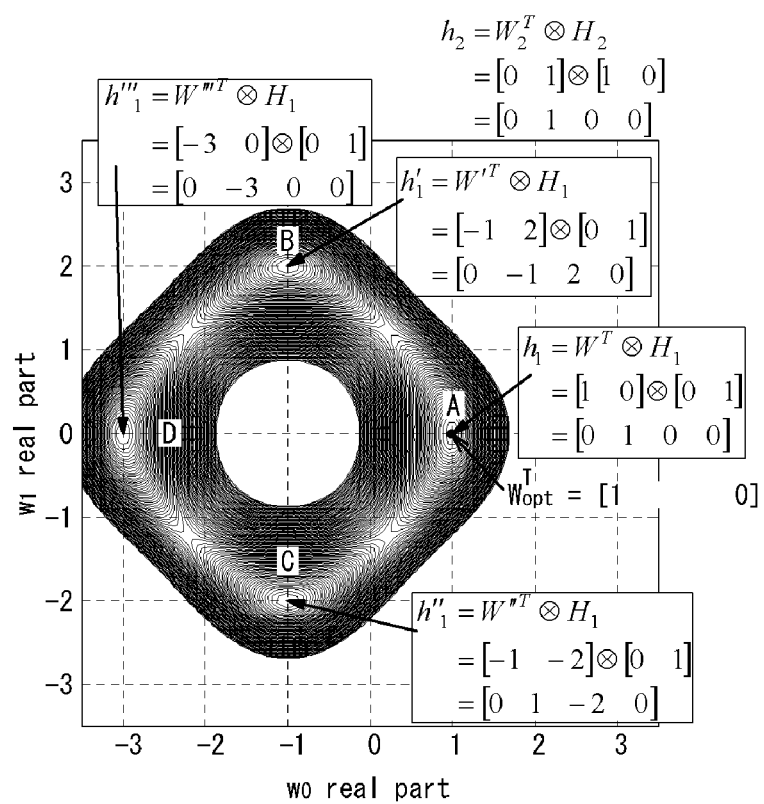
FIG. 11 is a top view of the 3-dimensional graph shown in FIG. 10B.

FIG. 11 is a top view of the 3-dimensional graph shown in FIG. 10B. From FIG. 11, it can be understood that four local optimal solutions exist. Below will be explained how those four local optimal points have occurred in an example easy for convenience of description.

First, an impulse response $H_2$ of a transmission path related to branch 2 is defined as below.

$$H_2=[10]$$ (Equation 80)

Next, a weight vector $W^T_2$ related to the impulse response $H_2$ is defined as below.

$$W^T_2=[01]$$ (Equation 81)

Then, a convolution vector of the weight vector $W^T_2$ and the impulse response $H_2$ will be as below.

$$W^T_2 \otimes H_2=[01] \otimes [10]=[0100]$$ (Equation 82)

On the other hand, the case of FIG. 11, that is, the case where an evaluation condition with tap output combine signal in each branch to which BUSSBANG algorithm is applied will be considered. In such case, an optimal point in branch 1 is called A. An impulse response $H_1$ in branch 1 is defined as below.

$$H_1=[01]$$ (Equation 83)

Also, a weight vector $W^T_1$ related to the impulse response $H_1$ is defined as below.

$$W^T_1=[10]$$ (Equation 84)

Then, a convolution vector of the weight vector $W^T_1$ and the impulse response $H_2$ will be as below.

$$W^T_1 \otimes H_1=[10] \otimes [01]=[0100]$$ (Equation 85)

In this case, in branch 1 and branch 2, a signal is generated in a same phase and at a same place and it can be understood that, therefore, a signal level after tap output combination will be double and a diversity gain can be obtained.

In addition, the point B, which is an optimal point in FIG. 11, will be considered. Here, a weight vector $W'^T_1$ is defined as below.

$$W'^T_1=[-12]$$ (Equation 86)

Thus, a convolution vector of the weight vector and the impulse response will be as below.

$$W'^T_1 \otimes H_1=[-12] \otimes [01]=[0-120]$$ (Equation 87)

Then, the second element "−1" is generated in the same place than "1" and tap output from branch 2 will be completely cancelled. Here, the third element "2" remains; however, it can be understood that no diversity effect can be obtained with only one signal in branch 1. Therefore, a diversity configuration can not be obtained if there is a convergence into this local optimal point.

Next, the point C, which is another optimal point, will be considered. Here, a weight vector $W'''^T_1$ is defined as below.

$$W'''^T_1=[-1-2]$$ (Equation 88)

Thus, a convolution vector of the weight and the impulse response of a transmission path will be as below.

$$W'''^T_1 \otimes H_1=[-12] \otimes [01]=[0-1-20]$$ (Equation 89)

Then, the second element "−1" is generated at a same position as the element "1" in the equation (Equation 82) of branch 2; therefore, the tap output of the branch 2 is completely cancelled. Here, the third element "−2" remains; however, it can be understood that no diversity effect can be obtained with only one signal of branch 1. Therefore, there is no diversity configuration in a case of convergence into this local optimal point.

Next, last optimal point D will be considered. Here, a weight vector $W'''^T_1$ is defined as below.

$$W'''^T_1 = [-30] \quad \text{(Equation 90)}$$

Thus, a convolution vector of the weight and the impulse response of the transmission path will be as below.

$$W'''^T_1 \otimes H_1 = [-30] \otimes [01] = [0 - 300] \quad \text{(Equation 91)}$$

Then, the second element "−3" is generated at the same position as the element "1" in the equation (Equation 82) of branch 2, the tap output of branch 2 is partially cancelled and "−2" remains. Then it can be understood that no diversity effect can be obtained with only one signal in branch 1 remaining. Therefore, there is no diversity configuration if there is convergence into this local optimal point.

As explained above, in a case where evaluation condition is based on BUSSGANG applied to tap output combined signal of each branch, a plurality of local optimal points are generated and no correct diversity effect can be obtained.

Figure 12A:
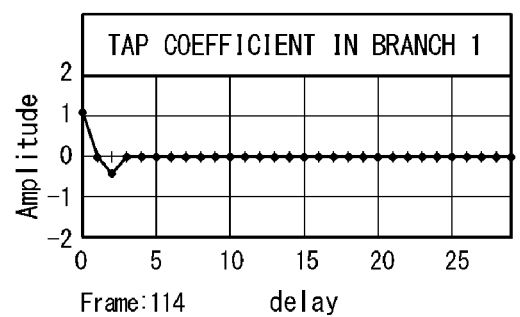
FIG. 12A is a graph showing a convergence state of the tap coefficient in the first branch when a conditional expression (Equation 78) on a basis of BUSSGANG algorithm actually applied to a tap output combination signal.
Figure 12B:
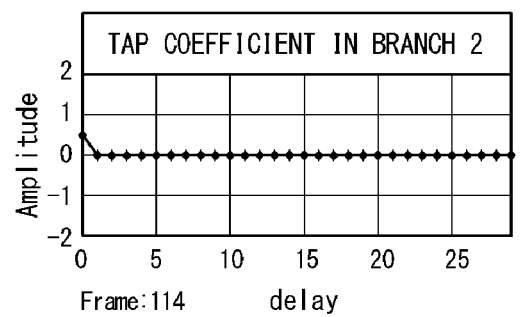
FIG. 12B is a graph showing a convergence state of the tap coefficient in the second branch when a conditional expression (Equation 78) on a basis of BUSSGANG algorithm actually applied to a tap output combination signal.

FIG. 12A is a graph showing a convergence state of the tap coefficient in the first branch when a conditional expression (Equation 78) on a basis of BUSSGANG algorithm actually applied to a tap output combination signal. FIG. 12B is a graph showing a convergence state of the tap coefficient in the second branch when a conditional expression (Equation 78) on a basis of BUSSGANG algorithm actually applied to a tap output combination signal.

FIG. 12A and FIG. 12B are drawn in a state of transmission path in which a signal is inputted to the branch 2 with a delay of 2 taps. Therefore, the third element of tap coefficient of the branch 1 affects to cancel the first element of the tap 2; it can be understood that no correct diversity combination can be performed since only first tap coefficient of the branch 1 remains.

(Case of Evaluation Condition of BUSSGANG Applied to Tap Output Combined Signal Using a NULL Space)

Next, evaluation conditional equation, in which BUSSGANG algorithm is applied to a tap output combination using a NULL space in the present invention, will be analyzed.

To deal with the above described problems, an adaptive combination is performed by referring to a method based on a NULL space of a MUSIC (Multiple Signal Classification) algorithm used in direction of arrival estimation of adaptive antenna. Originally, MUSIC is a complex processing on a specific space using a matrix; however, here, a greatly simplified method will be used. That is, the present invention is characteristic on a point of simultaneously performing equalization and adaptive combination as scalar processes.

Specifically, taps provided at input of each branch are linked and, when updating tap coefficients by an adaptive blind processing, an element of performing a control over those taps so that a difference between tap output of each branch be minimal is included in evaluation conditions of the adaptive processing.

Similarly to the above descriptions, an extended received signal vector r and an extended weight vector W are defined as below.

$$r = \begin{bmatrix} -r_1 \\ r_2 \end{bmatrix} \quad \text{(Equation 92)}$$

$$W = \begin{bmatrix} W_1 \\ W_2 \end{bmatrix}$$

Here, $r_1$ and $r_2$ show received signal vectors inputted to taps of branches 1 and 2. And, $W_1$ and $W_2$ show tap coefficients (weight vectors) of branches 1 and 2.

Thus, tap output will be as below. It should be noted that an element of the extended received signal vector r is equipped of a "− (minus)" and is controlled so that there is no difference between tap outputs.

$$\begin{cases} y(n) = y_I(n) + jy_Q(n) = r^T(n) \cdot W(n) \\ y_1(n) = y_{1I}(n) + jy_{1Q}(n) = \left(\begin{bmatrix} -I \\ 0 \end{bmatrix} \cdot r\right)^T \cdot W(n) \\ y_2(n) = y_{2I}(n) + jy_{2Q}(n) = \left(\begin{bmatrix} 0 \\ I \end{bmatrix} \cdot r\right)^T \cdot W(n) \end{cases} \quad \text{(Equation 93)}$$

Here, suffixes "1" and "2" show the number of branches.

Since the processing is on a basis of NULLING, a signal on one branch is reversed; this is equivalent to so-called "null steering" in adaptive antennas. On a basis of an extended vector based on this NULLING, an equalization processing of branches 1 and 2 and an adaptive combination are linked and tap coefficients are updated.

$$W(n+1) = \quad \text{(Equation 94)}$$
$$W(n) - 4 \cdot \mu \cdot \{y_I(n) \cdot (y_I^2(n)) + j \cdot y_Q(n) \cdot (y_Q^2(n))\} \cdot r^*(n) -$$
$$4 \cdot \mu \cdot \{y_{1I}(n) \cdot (y_{1I}^2(n) - R) + j \cdot y_{1Q}(n) \cdot (y_{1Q}^2(n) - R)\} \cdot$$
$$\left(\begin{bmatrix} -I \\ 0 \end{bmatrix} \cdot r^*(n)\right) -$$
$$4 \cdot \mu \cdot \{y_{2I}(n) \cdot (y_{2I}^2(n) - R) + j \cdot y_{2Q}(n) \cdot (y_{2Q}^2(n) - R)\} \cdot$$
$$\left(\begin{bmatrix} 0 \\ I \end{bmatrix} \cdot r^*(n)\right)$$

An evaluation conditional equation corresponding to the above equation (Equation 94) is as below.

$$J_{NullSpace\_BUSS}(n) = J_I(n) + J_Q(n) \quad \text{(Equation 95)}$$
$$= E[(y_I^2(n))^2] + E[(y_Q^2(n))^2] +$$
$$E[(y_{1I}^2(n) - R)^2] +$$
$$E[(y_{1Q}^2(n) - R)^2] +$$
$$E[(y_{2I}^2(n) - R)^2] +$$
$$E[(y_{2Q}^2(n) - R)^2]$$

Here, suffixes 1 and 2 show the branches 1 and 2, respectively; absence of those suffixes show extended signal; and $y_I$ and $y_Q$ are an in-phase component and an quadrature-phase component of a tap output combined signal composed of a tap coefficient (weight wm), respectively. R is a constant.

As an approximation of a gradient vector related to this evaluation conditional equation, an equation can be obtained as below.

$$\hat{\nabla} J_{NullSpace\_BUSS}(n) = \qquad (\text{Equation 96})$$

$$2\frac{\partial \left\{ \begin{array}{l} (y_I^2(n))^2 + (y_Q^2(n))^2 + (y_{1I}^2(n) - R)^2 + \\ (y_{1Q}^2(n) - R)^2 + (y_{2I}^2(n) - R)^2 + (y_{2Q}^2(n) - R)^2 \end{array} \right\}}{\partial W^*}$$

When an extended received signal vector to be inputted to a tap is shown as r and an in-phase component of the tap coefficient is shown as $y_I(n)$, an equation can be obtained as below.

$$y_I(n) = \frac{y(n) + y^*(n)}{2} \qquad (\text{Equation 97})$$

$$= \frac{r^T(n) \cdot W(n) + (r^T(n) \cdot W(n))^*}{2}$$

$$= \frac{r^T(n) \cdot W(n) + W^H(n) \cdot r^*(n)}{2}$$

Thus, a derived equation can be obtained as below.

$$\therefore \frac{\partial y_I(n)}{\partial W^*} = \frac{r^*(n)}{2} \qquad (\text{Equation 98})$$

Similarly, the quadrature-phase component of a tap coefficient is shown as $y_Q(n)$ and an equation can be obtained as below.

$$y_Q(n) = \frac{y(n) - y^*(n)}{2j} \qquad (\text{Equation 99})$$

$$= \frac{r^T(n) \cdot W(n) - (r^T(n) \cdot W(n))^*}{2j}$$

$$= \frac{r^T(n) \cdot W(n) - W^H(n) \cdot r^*(n)}{2j}$$

Thus, a derived equation can be obtained as below.

$$\therefore \frac{\partial y_Q(n)}{\partial W^*} = \frac{-r^*(n)}{2j} = j\frac{r^*(n)}{2} \qquad (\text{Equation 100})$$

Similarly also for the branch 1, with the in-phase component shown as $y_{1I}(n)$, an equation can be obtained as below.

$$y_{1I}(n) = \frac{y_1(n) + y_1^*(n)}{2} \qquad (\text{Equation 101})$$

$$= \frac{\left(\begin{bmatrix} -I \\ 0 \end{bmatrix} r\right)^T W(n) + \left(\left(\begin{bmatrix} -I \\ 0 \end{bmatrix} r\right)^T W(n)\right)^*}{2}$$

$$= \frac{\left(\begin{bmatrix} -I \\ 0 \end{bmatrix} r\right)^T W(n) + W^H(n)\left(\begin{bmatrix} -I \\ 0 \end{bmatrix} r\right)^*}{2}$$

Thus, an equation can be obtained as below.

$$\therefore \frac{\partial y_{1I}(n)}{\partial W^*} = \frac{\left(\begin{bmatrix} -I \\ 0 \end{bmatrix} \cdot r\right)^*}{2} \qquad (\text{Equation 102})$$

Furthermore, with the quadrature-phase component of the branch 1 shown as $y_{1Q}(n)$, an equation can be obtained as below.

$$y_{1Q}(n) = \frac{y_1(n) - y_1^*(n)}{j2} \qquad (\text{Equation 103})$$

$$= \frac{\left(\begin{bmatrix} -I \\ 0 \end{bmatrix} r\right)^T W(n) - \left(\left(\begin{bmatrix} -I \\ 0 \end{bmatrix} r\right)^T W(n)\right)^*}{j2}$$

$$= \frac{\left(\begin{bmatrix} -I \\ 0 \end{bmatrix} r\right)^T W(n) - W^H(n)\left(\begin{bmatrix} -I \\ 0 \end{bmatrix} r\right)^*}{j2}$$

Thus, a derived equation can be obtained as below.

$$\therefore \frac{\partial y_{1Q}(n)}{\partial W^*} = \frac{-\left(\begin{bmatrix} -I \\ 0 \end{bmatrix} \cdot r\right)^*}{2j} = j\frac{\left(\begin{bmatrix} -I \\ 0 \end{bmatrix} \cdot r\right)^*}{2} \qquad (\text{Equation 104})$$

Similarly also for the branch 2, with the in-phase component shown as $y_{2I}(n)$, an equation can be obtained as below.

$$y_{2I}(n) = \frac{y_2(n) + y_2^*(n)}{2} \qquad (\text{Equation 105})$$

$$= \frac{\left(\begin{bmatrix} 0 \\ I \end{bmatrix} r\right)^T W(n) + \left(\left(\begin{bmatrix} 0 \\ I \end{bmatrix} r\right)^T W(n)\right)^*}{2}$$

$$= \frac{\left(\begin{bmatrix} 0 \\ I \end{bmatrix} r\right)^T W(n) + W^H(n)\left(\begin{bmatrix} 0 \\ I \end{bmatrix} r\right)^*}{2}$$

Thus, an equation can be obtained as below.

$$\therefore \frac{\partial y_{2I}(n)}{\partial W^*} = \frac{\left(\begin{bmatrix} 0 \\ I \end{bmatrix} \cdot r\right)^*}{2} \qquad (\text{Equation 106})$$

Furthermore, with the quadrature-phase component of the branch 2 shown as $y_{2Q}(n)$, an equation can be obtained as below.

$$y_{2Q}(n) = \frac{y_2(n) - y_2^*(n)}{j2} \qquad (\text{Equation 107})$$

$$= \frac{\left(\begin{bmatrix} 0 \\ I \end{bmatrix} r\right)^T W(n) - \left(\left(\begin{bmatrix} 0 \\ I \end{bmatrix} r\right)^T W(n)\right)^*}{j2}$$

-continued $$= \frac{\left(\begin{bmatrix} 0 \\ I \end{bmatrix} r\right)^T W(n) - W^H(n) \left(\begin{bmatrix} 0 \\ I \end{bmatrix} r\right)^*}{j2}$$

Thus, a derived equation can be obtained as below.

$$\therefore \frac{\partial y_{2Q}(n)}{\partial W^*} = \frac{-\left(\begin{bmatrix} 0 \\ I \end{bmatrix} \cdot r\right)^*}{2j} = j\frac{\left(\begin{bmatrix} 0 \\ I \end{bmatrix} \cdot r\right)^*}{2} \quad \text{(Equation 108)}$$

As a result, an equation can be obtained as below.

$$\hat{\nabla} J_{NullSpace\_BUSS}(n) = \quad \text{(Equation 109)}$$

$$4 \cdot (y_I^2(n)) \cdot 2 \cdot y_I(n) \cdot \frac{r^*(n)}{2} + 4 \cdot (y_Q^2(n)) \cdot 2 \cdot y_Q(n) \cdot j\frac{r^*(n)}{2} +$$

$$4 \cdot (y_{1I}^2(n) - R) \cdot 2 \cdot y_{1I}(n) \cdot \begin{bmatrix} -I \\ 0 \end{bmatrix} \frac{r^*(n)}{2} +$$

$$4 \cdot (y_{1Q}^2(n) - R) \cdot 2 \cdot y_{1Q}(n) \cdot j\begin{bmatrix} -I \\ 0 \end{bmatrix} \frac{r^*(n)}{2} +$$

$$4 \cdot (y_{2I}^2(n) - R) \cdot 2 \cdot y_{2I}(n) \cdot \begin{bmatrix} 0 \\ I \end{bmatrix} \frac{r^*(n)}{2} +$$

$$4 \cdot (y_{2Q}^2(n) - R) \cdot 2 \cdot y_{2Q}(n) \cdot j\begin{bmatrix} 0 \\ I \end{bmatrix} \frac{r^*(n)}{2} =$$

$$4 \cdot \{y_I(n) \cdot (y_I^2(n) - R) + j \cdot y_Q(n) \cdot (y_Q^2(n) - R)\} \cdot r^*(n) +$$

$$4 \cdot \{y_{1I}(n) \cdot (y_{1I}^2(n) - R) + j \cdot y_{1Q}(n) \cdot (y_{1Q}^2(n) - R)\} \cdot$$

$$\begin{bmatrix} -I \\ 0 \end{bmatrix} r^*(n) + 4 \cdot \{y_{2I}(n) \cdot (y_{2I}^2(n) - R) + j \cdot$$

$$y_{2Q}(n) \cdot (y_{2Q}^2(n) - R)\} \cdot \begin{bmatrix} 0 \\ I \end{bmatrix} r^*(n)$$

Tap coefficient update equation will be as below.

$$W(n+1) = W(n) - \mu \cdot \hat{\nabla} J(n) \quad \text{(Equation 110)}$$

This is equivalent to the tap coefficient update equation described above (Equation 94).

The optimal point of the tap coefficient of this updating process is non-linear and thus can not be positively shown in a closed form. Therefore, an analysis is performed with the evaluation conditional equation. The evaluation conditional equation is as below.

$$J_{NullSpace\_BUSS}(n) = \quad \text{(Equation 111)}$$

$$J_I(n) + J_Q(n) = E[(y_I^2(n))^2] + E[(y_Q^2(n))^2] +$$

$$E[(y_{1I}^2(n) - R)^2] + E[(y_{1Q}^2(n) - R)^2] +$$

$$E[(y_{2I}^2(n) - R)^2] + E[(y_{2Q}^2(n) - R)^2]$$

Here, $|y|^2 = y_I^2 + y_Q^2$ and $|y|^2 = (|y_1| - y_2|^2)$. Thus, the first term in the most right-hand side of the evaluation conditional equation (Equation 111) can be calculated as below.

$$(y_I^2(n))^2 = (|y_{1I} - y_{2I}|^2)^2 \quad \text{(Equation 112)}$$

$$= ((y_{1I} - y_{2I})^2)^2$$

$$= (y_{1I}^2 + y_{2I}^2 - 2y_{1I}y_{2I})^2$$

$$= y_{1I}^4 + 2 \cdot y_{1I}^2 y_{2I}^2 + y_{2I}^4 + 4 \cdot y_{1I}^2 y_{2I}^2 -$$

$$4 \cdot (y_{1I}^2 + y_{2I}^2)y_{1I}y_{2I}$$

$$= y_{1I}^4 + y_{2I}^4 + 6 \cdot y_{1I}^2 y_{2I}^2 - 4 \cdot (y_{1I}^2 + y_{2I}^2)y_{1I}y_{2I}$$

Similarly, the second term can be calculated as below.

$$(y_Q^2(n))^2 = (|y_{1Q} - y_{2Q}|^2)^2 \quad \text{(Equation 113)}$$

$$= ((y_{1Q} - y_{2Q})^2)^2$$

$$= (y_{1Q}^2 + y_{2Q}^2 - 2y_{1Q}y_{2Q})^2$$

$$= y_{1Q}^4 + 2 \cdot y_{1Q}^2 y_{2Q}^2 + y_{2Q}^4 + 4 \cdot y_{1Q}^2 y_{2Q}^2 -$$

$$4 \cdot (y_{1Q}^2 + y_{2Q}^2)y_{1Q}y_{2Q}$$

$$= y_{1Q}^4 + y_{2Q}^4 + 6 \cdot y_{1Q}^2 y_{2Q}^2 - 4 \cdot$$

$$(y_{1Q}^2 + y_{2Q}^2)y_{1Q}y_{2Q}$$

By adding the above equations of the first and the second terms, an equation can be obtained as below.

$$(y_I^2(n))^2 + (y_Q^2(n))^2 = \quad \text{(Equation 114)}$$

$$(y_{1I}^4 + y_{Q1}^4) + (y_{2I}^4 + y_{2Q}^4) + 6 \cdot (y_{1I}^2 y_{2I}^2 + y_{1Q}^2 y_{2Q}^2) -$$

$$4 \cdot (y_{1I}^3 y_{2I} + y_{1Q}^3 y_{2Q}) - 4 \cdot (y_{1I} \cdot y_{2I}^3 + y_{1Q} \cdot y_{2Q}^3)$$

The first to the fifth terms of the right-hand side of the above equation will be calculated. Here, the first and the second terms can be calculated by using a previous equation (Equation 40). Similarly, the third term can be calculated by using a previous equation (Equation 66). Similarly, the fourth and the fifth equations can be calculated by using a previous equation (Equation 77). Furthermore, by applying an equation related to 64 QAM (Equation 79), an equation can be obtained as below.

$$J_{NSBUSS}(n) = (y_I^2(n))^2 + (y_Q^2(n))^2 \quad \text{(Equation 115)}$$

$$= (y_{1I}^4 + y_{1Q}^4) + (y_{2I}^4 + y_{2Q}^4) + 6 \cdot$$

$$(y_{1I}^2 y_{2I}^2 + y_{1Q}^2 y_{2Q}^2) - 4 \cdot$$

$$(y_{1I}^3 y_{2I} + y_{1Q}^3 y_{2Q}) - 4 \cdot$$

$$(y_{1I} \cdot y_{2I}^3 + y_{1Q} \cdot y_{2Q}^3)$$

$$= \frac{3}{4} \left\{ \begin{array}{c} -(2 - 1.381)\sum_{k=0}^{P-1} |h_{1k}|^4 - \\ \frac{0.61905}{3} Re\left\{\sum_{k=0}^{P-1} h_{1k}^4\right\} + \\ 2 \cdot \|h_1\|_2^4 + 2\sigma_n^4 \cdot \|W_1\|_2^4 + \\ 4\sigma_n^2 \cdot \|h_1\|_2^2 \|W_1\|_2^2 \end{array} \right\} +$$

-continued $$\frac{3}{4}\left\{\begin{array}{l}-(2-1.381)\sum_{k=0}^{P-1}|h_{2k}|^4-\\\frac{0.61905}{3}Re\left\{\sum_{k=0}^{P-1}h_{2k}^4\right\}+\\2\cdot\|h_2\|_2^4+2\sigma_n^4\cdot\|W_2\|_2^4+\\4\sigma_n^2\cdot\|h_2\|_2^2\|W_2\|_2^2\end{array}\right\}+$$

$$3\cdot\left[\begin{array}{l}\frac{-0.61905}{2}\cdot Re\left\{\sum_{k=0}^{P-1}h_{1k}^2h_{2k}^2\right\}+\frac{1}{2}\cdot\\Re\left\{\begin{array}{l}-(2-1.381)\cdot\sum_{k=0}^{P-1}h_{1k}^2h_{2k}^{*2}+\\2\cdot\left(\sum_{k=0}^{P-1}h_{1k}h_{2k}^*\right)^2\end{array}\right\}-\\(2-1.381)\cdot\sum_{k=0}^{P-1}|h_{1k}|^2|h_{2k}|^2+\\1\cdot\left(\sum_{k=0}^{P-1}|h_{1k}|^2\right)\left(\sum_{k=0}^{P-1}|h_{2k}|^2\right)+\\\left|\sum_{k=0}^{P-1}h_{1k}h_{2k}^*\right|^2+\sigma_n^2\cdot\|h_1\|_2^2\cdot\|W_2\|_2^2+\\\sigma_n^2\cdot\|h_2\|_2^2\cdot\|W_1\|_2^2+\sigma_n^4\cdot\|W_1\|_2^2\cdot\|W_2\|_2^2\end{array}\right]-$$

$$\left[\begin{array}{l}-0.61905\cdot Re\left\{\sum_{k=0}^{P-1}h_{2k}h_{1k}^3\right\}+3\cdot\\Re\left\{\begin{array}{l}-(2-1.381)\cdot\sum_{k=0}^{P-1}h_{2k}h_{1k}^*|h_{1k}|^2+\\2\cdot\left(\sum_{k=0}^{P-1}h_{2k}h_{1k}^*\right)\left(\sum_{k=0}^{P-1}|h_{1k}|^2\right)\end{array}\right\}\end{array}\right]-$$

$$6\cdot\sigma_n^2\cdot\|W_1\|_2^2\cdot Re\left\{\sum_{k=0}^{P-1}h_{1k}h_{2k}^*\right\}-$$

$$\left[\begin{array}{l}-0.61905\cdot Re\left\{\sum_{k=0}^{P-1}h_{1k}h_{2k}^3\right\}+3\cdot\\Re\left\{\begin{array}{l}-(2-1.381)\cdot\sum_{k=0}^{P-1}h_{1k}h_{2k}^*|h_{2k}|^2+\\2\cdot\left(\sum_{k=0}^{P-1}h_{1k}h_{2k}^*\right)\left(\sum_{k=0}^{P-1}|h_{2k}|^2\right)\end{array}\right\}\end{array}\right]-$$

$$6\cdot\sigma_n^2\cdot\|W_2\|_2^2\cdot Re\left\{\sum_{k=0}^{P-1}h_{2k}h_{1k}^*\right\}$$

Next, it can be considered about the third to the sixth terms of the evaluation conditional equation (Equation 111) that those terms can be calculated by using a previous equation (Equation 41). As a result, an equation can be calculated as below.

$$J_{Jcmi}(n) = E\{(y_{iI}^2(n)-R)^2\} + E\{(y_{iQ}^2(n)-R)^2\} \quad \text{(Equation 116)}$$

$$= E\{|y_{iI}(n)|^4 + |y_{iQ}(n)|^4\} - 2\cdot R\cdot$$

$$E\{|y_{iI}(n)|^2 + |y_{iQ}(n)|^2\} + 2\cdot R^2$$

-continued $$=\frac{3}{4}\cdot\left\{\begin{array}{l}\kappa_s\sigma_k^4\sum_{k=0}^{P-1}|h_{ik}|^4+\frac{1}{3}Re\left\{E[s^4]\sum_{k=0}^{P-1}h_{ik}^4\right\}+\\2\cdot\sigma_s^4\sum_{k=0}^{P-1}\sum_{m=0m\neq k}^{P-1}|h_{ik}|^2|h_{im}|^2+\\\kappa_n\sigma_n^4\sum_{k=0}^{2N-1}|W_{ik}|^4+2\cdot\\\sigma_n^4\sum_{k=0}^{2N-1}\sum_{m=0m\neq k}^{2N-1}|W_{ik}|^2|W_{im}|^2+\\4\cdot\sigma_s^2\cdot\|h_i\|_2^2\cdot\sigma_n^2\cdot\|W_i\|_2^2\end{array}\right\}-$$

$$2\cdot R\cdot\{\sigma_s^2\cdot\|h_i\|_2^2+\sigma_n^2\cdot\|W_i\|_2^2\}+2\cdot R^2$$

With above calculations, an equation (Equation 111) including an element for performing a tap control to minimize a difference between tap output from each branch, which is an evaluation condition by BUSSBANG applied to tap output combined signals using NULL space, can be obtained as below.

$$J_{NullSpace\_BUSS} = J_I + J_Q \quad \text{(Equation 117)}$$

$$= E[(y_I^2(n))^2] + E[(y_Q^2(n))^2] +$$

$$E[(y_{1I}^2(n)-R)^2] + E[(y_{1Q}^2(n)-R)^2] +$$

$$E[(y_{2I}^2(n)-R)^2] + E[(y_{2Q}^2(n)-R)^2]$$

$$= J_{NSBUSS} + J_{Jcm1} + J_{Jcm2}$$

Here, five equations below will be used.

$$\begin{cases} r=\begin{bmatrix}-r_1\\r_2\end{bmatrix},\ W=\begin{bmatrix}W_1\\W_2\end{bmatrix} \\ y(n) = y_I(n)+jy_Q(n) = r^T(n)\cdot W(n) \\ y_1(n) = y_{1I}(n)+jy_{1Q}(n) = \left(\begin{bmatrix}-I\\0\end{bmatrix}\cdot r\right)^T\cdot W(n) \\ y_2(n) = y_{2I}(n)+jy_{2Q}(n) = \left(\begin{bmatrix}0\\I\end{bmatrix}\cdot r\right)^T\cdot W(n) \end{cases} \quad \text{(Equation 118)}$$

Thus, it can be understood that there are two relationships below.

$$\begin{cases} y_I(n) = y_{2I}(n) - y_{1I}(n) \\ y_Q(n) = y_{2Q}(n) - y_{1Q}(n) \end{cases} \quad \text{(Equation 119)}$$

Figure 13A:
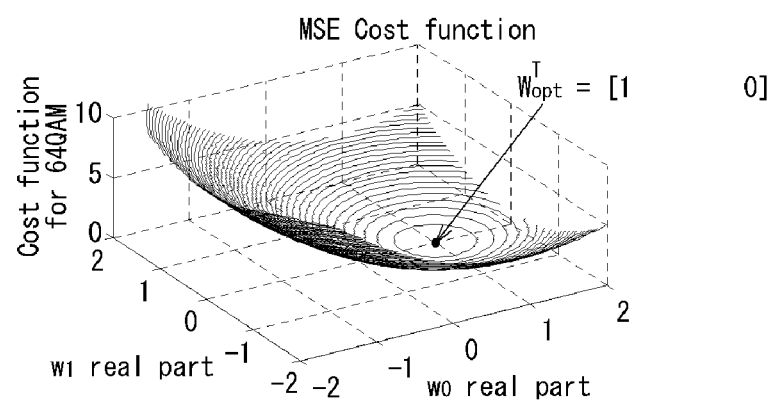
FIG. 13A is an overhead view of a 3-dimensional graph obtained by calculating a conditional expression for evaluation on a basis of MMSE criterion.
Figure 13B:
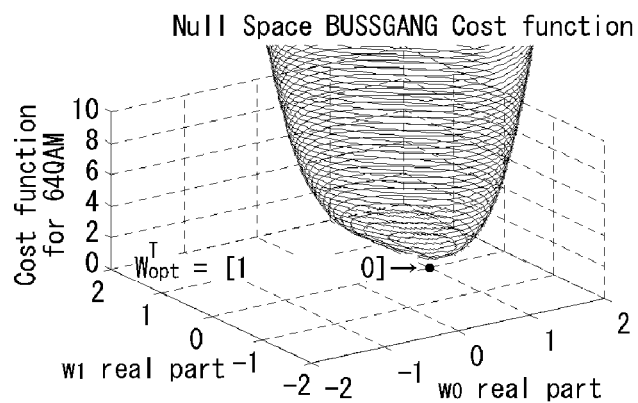
FIG. 13B is an overhead view of a 3-dimensional graph obtained by calculating a conditional expression for evaluation on a basis of BUSSGANG applied to a tap output combination signal using NULL space.
Figure 14A:
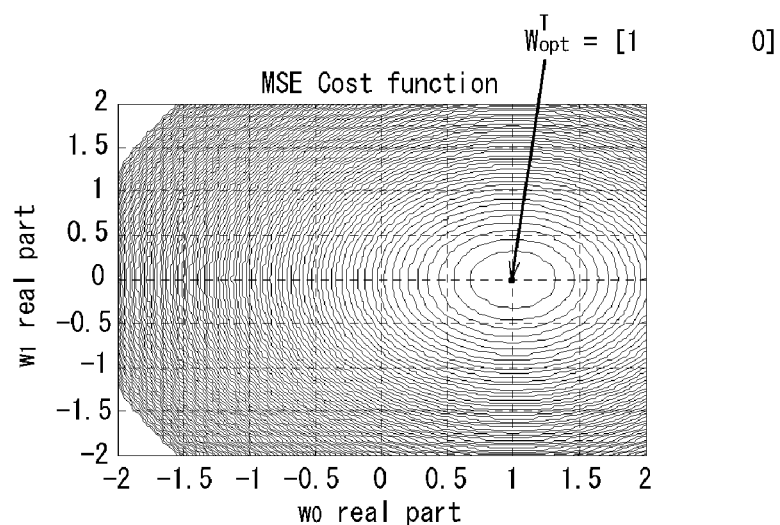
FIG. 14A is a top view of a 3-dimensional graph obtained by calculating a conditional expression for evaluation on a basis of MMSE criterion.
Figure 14B:
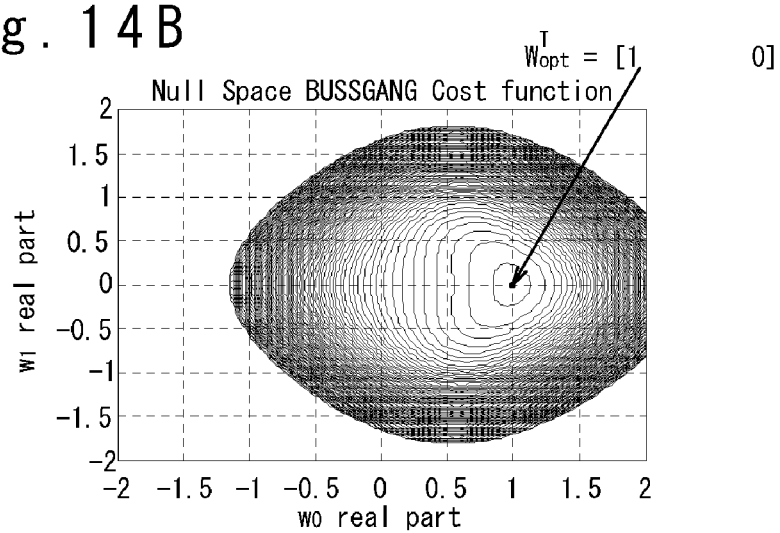
FIG. 14B is a top view of a 3-dimensional graph obtained by calculating a conditional expression for evaluation on a basis of BUSSGANG applied to a tap output combination signal using NULL space.

By calculating the evaluation conditional equation related to the tap coefficient on a basis of the above result, a 3-dimensional graph can be obtained. FIG. 13A is an overhead view of a 3-dimensional graph obtained by calculating a conditional expression for evaluation on a basis of MMSE criterion. FIG. 13B is an overhead view of a 3-dimensional graph obtained by calculating a conditional expression for evaluation on a basis of BUSSGANG applied to a tap output combination signal using NULL space. FIG. 14A is a top view of a 3-dimensional graph obtained by calculating a conditional expression for evaluation on a basis of MMSE criterion. FIG. 14B is a top view of a 3-dimensional graph obtained by calculating a conditional expression for evaluation on a basis of BUSSGANG applied to a tap output combination signal using NULL space. It should be noted that FIG. 13A, FIG. 13B, FIG. 14A and FIG. 14B are results obtained under a same condition of propagation environment etc.

From FIG. 13A and FIG. 14B, it can be understood that, in a case where an adaptive control of tap is performed by using a stochastic gradient method on a basis of an evaluation condition of MMSE criterion using a reference signal, there is a convergence into an optimal point. Also, from FIG. 13B and FIG. 14B, it can be understood that, in a case of using an evaluation conditional equation (Equation 111) including an element of performing a tap control so that a difference between tap output of each branch be minimal, there is a convergence into a unique optimal point, too.

As the example described above, since there exists only one local minimum value, it can be understood that, in a case of treating an adaptive blind equalization processing to which an evaluation condition including an element of performing a tap control to the branches so that a difference between tap outputs of those branches be minimal is applied, a stable adaptive control is performed.

Figure 15A:
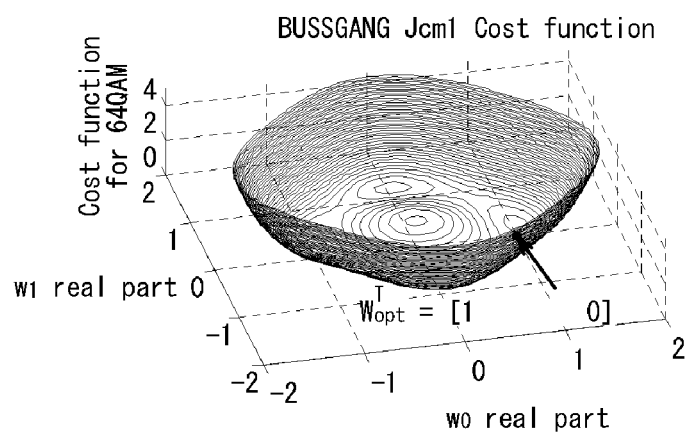
FIG. 15A is an overhead view of a 3-dimensional graph obtained by calculating conditional expression for evaluation on a basis of BUSSGANG algorithm.
Figure 15B:
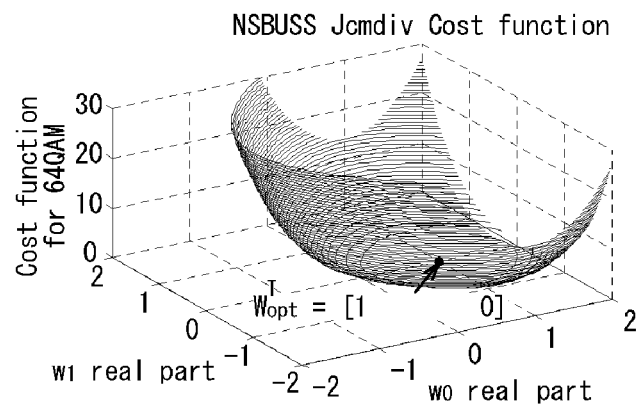
FIG. 15B is an overhead view of a 3-dimensional graph obtained by calculating conditional expression for evaluation including element performing tap control to minimize a difference between tap output of each branch.
Figure 16A:
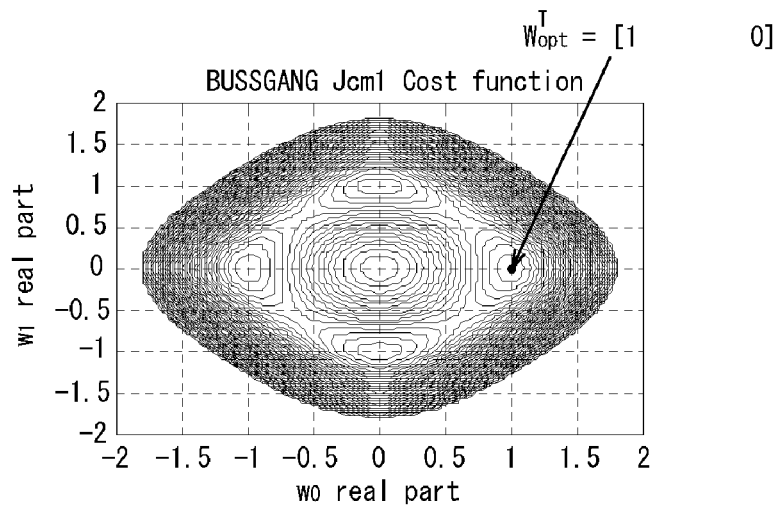
FIG. 16A is a top view of a 3-dimensional graph obtained by calculating conditional expression for evaluation on a basis of BUSSGANG algorithm.
Figure 16B:
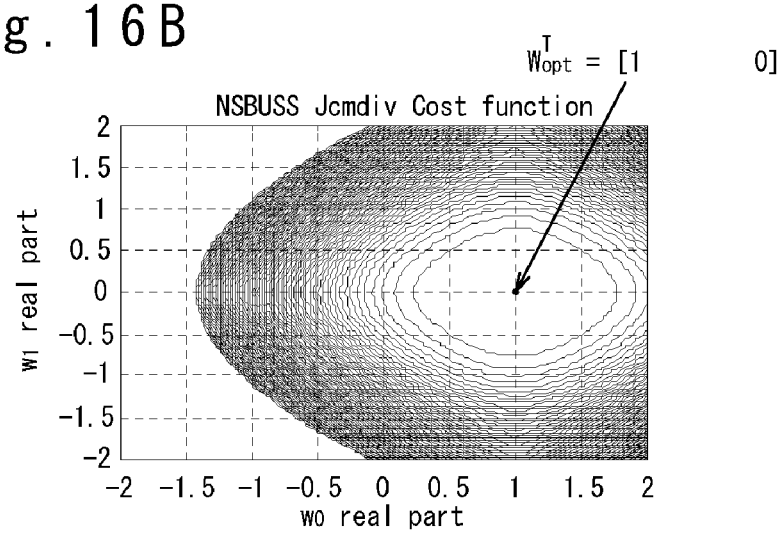
FIG. 16B is a top view of a 3-dimensional graph obtained by calculating conditional expression for evaluation including element performing tap control to minimize a difference between tap output of each branch.

As shown above, by analyzing a cause for which an adaptive control is stably performed to a unique optimal point, another 3-dimensional graph can be obtained. FIG. 15A is an overhead view of a 3-dimensional graph obtained by calculating conditional expression for evaluation on a basis of BUSSGANG algorithm. FIG. 15B is an overhead view of a 3-dimensional graph obtained by calculating conditional expression for evaluation including element performing tap control to minimize a difference between tap output of each branch. FIG. 16A is a top view of a 3-dimensional graph obtained by calculating conditional expression for evaluation on a basis of BUSSGANG algorithm. FIG. 16B is a top view of a 3-dimensional graph obtained by calculating conditional expression for evaluation including element performing tap control to minimize a difference between tap output of each branch.

From FIG. 15A and FIG. 16A, it can be understood that the evaluation condition based on the BUSSGANG algorithm includes four local minimum points and thus a stable diversity effect can not be obtained. However, from FIG. 15B and FIG. 16B, it can be understood that, performing a tap control so that a difference between tap output of each branch be minimal operates to choose one optimal point among four local minimum values to obtain a good effect of diversity.

An Exemplary Embodiment

Figure 17:
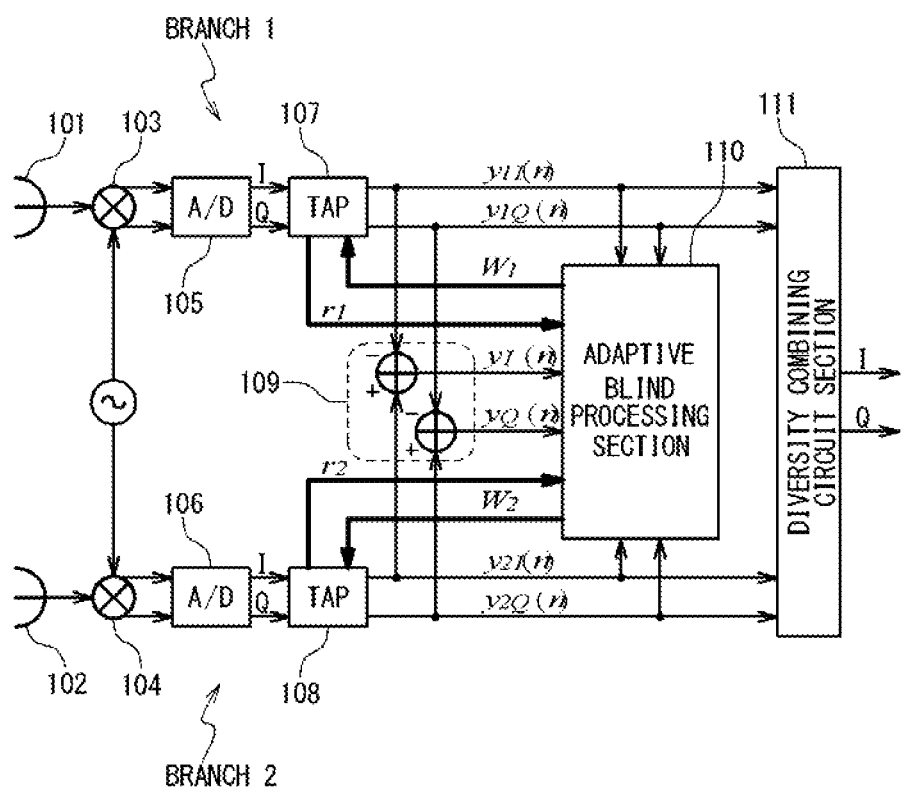
FIG. 17 is a circuit diagram schematically showing a configuration of a wireless communication apparatus of an exemplary embodiment of the present invention.

FIG. 17 is a circuit diagram schematically showing a configuration of a wireless communication apparatus of an exemplary embodiment of the present invention. Components of the wireless communication apparatus shown in FIG. 17 will be described. The wireless communication apparatus shown in FIG. 17 includes a first antenna 101, a second antenna 102, a first mixer 103, a second mixer 104, a predetermined local oscillator, a first A/D converter 105, a second A/D converter 106, a first tap processing section 107, a second tap processing section 108, a tap output combining section 109, an adaptive blind processing section 110 and a diversity combining section 111.

Here, a group of the first antenna 101, the first mixer 103, a first A/D converter 105 and the first tap processing section 107 is called a first branch. Also, a group of the second antenna 102, the second mixer 104, the second A/D converter 106 and the second tap processing section 108 is called a second branch.

Connection relationship between the components of the wireless communication apparatus shown in FIG. 17 will be described. An output section of the first antenna 101 is connected to a first input section of the first mixer 103. An output section of the second antenna 102 is connected to a first input section of the second mixer 104. A second input section of the first mixer 103 is connected to the predetermined local oscillator. A second input section of the second mixer 104 is connected to the predetermined local oscillator. It should be noted that the predetermined local oscillator connected to the first mixer 103 and the second mixer 104 can be a same one as shown in FIG. 17 or different ones.

A first output section and a second output section of the first mixer 103 are connected to a first input section and a second input section of the first A/D converter 105, respectively. A first output section and a second output section of the second mixer 104 are connected to a first input section and a second input section of the second A/D converter, respectively. A first output section and a second output section of the first A/D converter 105 are connected to a first input section and a second input section of the first tap processing section 107, respectively. A first output section and a second output section of the second A/D converter 106 are connected to a first input section and a second input section of the second tap processing section 108, respectively.

A first output section of the first tap processing section 107 is connected to a first input section of the tap output combining section 109, a first input section of the adaptive blind processing section 110 and a first input section of the diversity combining section 111. A second output section of the first tap processing section 107 is connected to a second input section of the tap output combining section 109, a second input section of the adaptive blind processing section 110 and a second input section of the diversity combining section 111. A first output section of the second tap processing section 108 is connected to a third input section of the tap output combining section 109, a third input section of the adaptive blind processing section 110 and a third input section of the diversity combining section 111. A second output section of the second tap processing section 108 is connected to a fourth input section of the tap output combining section 109, a fourth input section of the adaptive blind processing section 110 and a fourth input section of the diversity combining section 111.

A third output section of the first tap processing section 107 is connected to a fifth input section of the adaptive blind processing section 110. A third output section of the second tap processing section 108 is connected to a sixth input section of the adaptive blind processing section 110. A first output section and a second output section of the tap output combining section 109 are connected to a seventh input section and a eighth input section of the adaptive blind processing section, respectively. A first output section of the adaptive blind processing section 110 is connected to a third input section of the first tap processing section 107. A second output section of the adaptive blind processing section 110 is connected to a third input section of the second tap processing section 108.

An operation of the wireless communication apparatus shown in FIG. 17, that is, a wireless communication method of the present exemplary embodiment will be described. Each of the first antenna 101 and the second antenna 102 inputs a radio signal and outputs a received signal. The first mixer 103 and the second mixer 104 down-convert a frequency of output signals from the first antenna 101 and the second antenna 102, respectively, before outputting. The first A/D converter 105 and the second A/D converter 106 convert output signals from the first mixer 103 and the second mixer 104, respectively, before outputting.

The first tap processing section 107 inputs an output signal from the first A/D converter 105 and a first tap coefficient (weight vector) $W_1$ from the adaptive blind processing section 110. The first tap processing section 107 multiplies the first tap coefficient (weight vector) $W_1$ to the output signal from the first A/D converter 105 to generate an in-phase component $y_{1I}(n)$ and an quadrature-phase component $y_{1Q}(n)$ of a first tap output signal. The first tap processing section 107 outputs the in-phase component $y_{1I}(n)$ and the quadrature-phase component $y_{1Q}(n)$ of the first tap output signal to the tap output combining section 109, the adaptive blind processing section 110 and the diversity combining section 111. Also, the first tap processing section 107 output the output signal from the first A/D converter 105 to the adaptive blind processing section 110 as a first received signal vector $r_1$.

Similarly, the second tap processing section 108 inputs an output signal from the second A/D converter 106 and a second tap coefficient (weight vector) $W_2$ from the adaptive blind processing section 110. The second tap processing section 108 multiplies the second tap coefficient (weight vector) $W_2$ to the output signal from the second A/D converter 106 to generate an in-phase component $y_{2I}(n)$ and an quadrature-phase component $y_{2Q}(n)$ of a second tap output signal. The second tap processing section 108 outputs the in-phase component $y_{2I}(n)$ and the quadrature-phase component $y_{2Q}(n)$ of the second tap output signal to the tap output combining section 109, the adaptive blind processing section 110 and the diversity combining section 111. Also, the second tap processing section 108 output the output signal from the second A/D converter 106 to the adaptive blind processing section 110 as a second received signal vector $r_2$.

The tap output combining section 109 generates a difference $y_I(n)$ between the in-phase components $y_{1I}(n)$ and $y_{2I}(n)$ of the first tap output signal and the second tap output signal, respectively, to output to the adaptive blind processing section 110, on one hand. The tap output combining section 109, on the other hand, generates a difference yQ(n) between the quadrature-phase components y1Q(n) and y2Q(n) of the first tap output signal and the second tap output signal, respectively, to output to the adaptive blind processing section 110.

The adaptive blind processing section 110 performs a tap update on a basis of the evaluation conditional equation (Equation 117) including the element of performing a tap control so that the difference between tap outputs be minimal. That is, the adaptive blind processing section 110 inputs the first received signal vector $r_1$, the second received signal vector $r_2$, the in-phase component $y_{1I}(n)$ and the quadrature-phase component $y_{1Q}(n)$ of the first tap output signal, the difference $y_I(n)$ between the in-phase components $y_{1I}(n)$ and $y_{2I}(n)$ of the first tap output signal and the second tap output signal, respectively, and the difference $y_Q(n)$ between the quadrature-phase components $y_{1Q}(n)$ and $y_{2Q}(n)$ of the first tap output signal and the second tap output signal, respectively, to generate the first tap coefficient (weight vector) $W_1$ and the second tap coefficient (weight vector) $W_2$ and output to the first tap processing section 107 and the second tap processing section 108, respectively.

The adaptive blind processing section will be described about its more detailed configuration and its operation, that is, an adaptive blind processing method of the wireless communication method of the present exemplary embodiment. The adaptive blind processing section may include a general-purpose computer which has an inputting section, an outputting section, a processing section, a memory section and a bus connecting those sections and execute a predetermined program, for example. In such case, it is preferable that the predetermined program is stored in the memory section, executed when required by the processing section and assembled to numerically calculate an evaluation conditional equation (Equation 117) including an element of performing a tap control so that a difference between tap output of each branch be minimal.

It should be noted that, in the above example, to clarify the characteristics of the present invention, the tap output difference generating section 109 is disposed outside the adaptive blind processing section 110. However, a tap output difference generating function can be performed included in the adaptive blind processing section 110, of course.

The diversity combining section 111 inputs the first tap output signal and the second tap output signal from the first branch and the second branch, respectively. The diversity combining section 111 performs a diversity combination of the first tap output signal and the second tap output signal to output; then the diversity process of the exemplary embodiment of the present invention is completed.

Another Exemplary Embodiment

Figure 18:
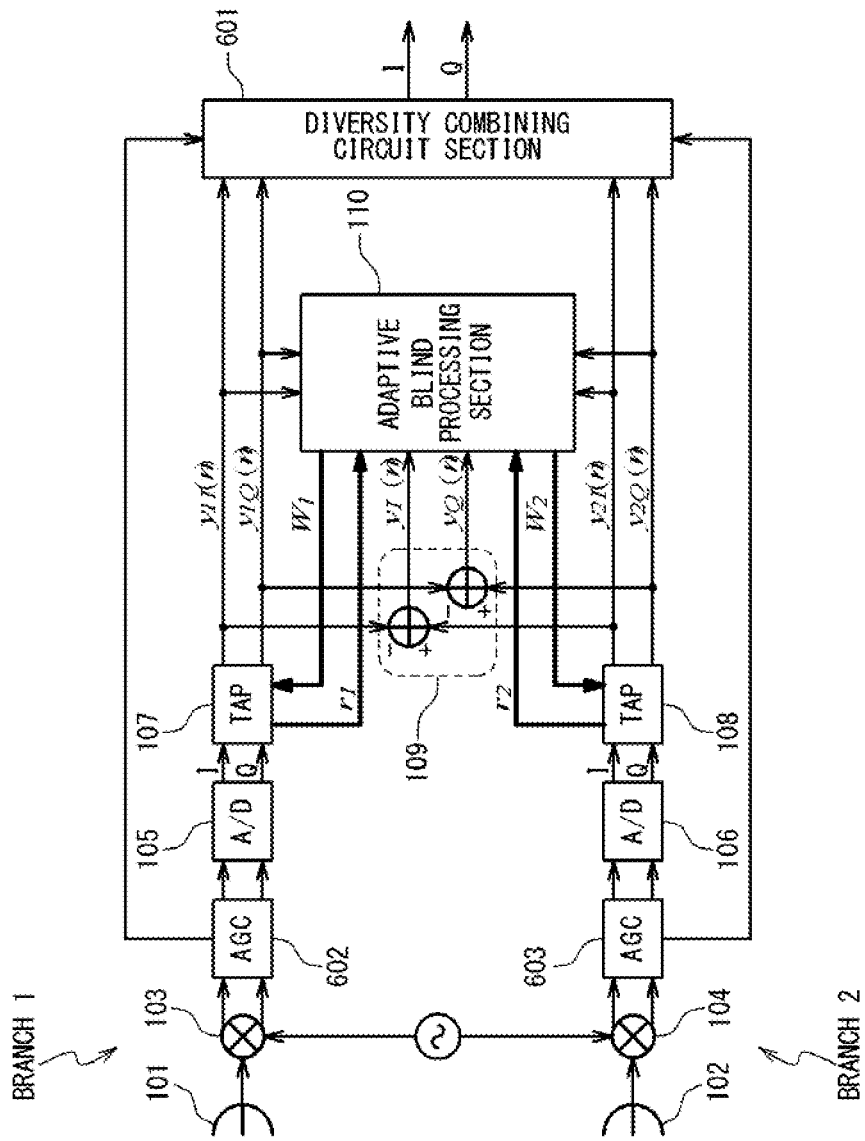
FIG. 18 is a circuit diagram schematically showing a configuration of a wireless communication apparatus of another exemplary embodiment of the present invention.

FIG. 18 is a circuit diagram schematically showing a configuration of a wireless communication apparatus of another exemplary embodiment of the present invention. The wireless communication apparatus is configured with a first AGC (Automatic Gain Controller) 602 arranged between the first mixer 103 and the first A/D converter 105, a second AGC 603 arranged between the second mixer 104 and the second A/D converter 106 and another diversity combining section 601 taking place of the diversity combining section 111, on a basis of the wireless communication apparatus shown in FIG. 17.

Here, the first output section and the second output section of the first mixer 103 are connected to a first input section and a second input section of the first AGC 602, respectively. The first output section and the second output section of the second mixer 104 are connected to a first input section and a second input section of the second AGC 603, respectively. A first output section and a second output section of the first AGC 602 are connected to the first input section and the second input section of the first A/D converter 105, respectively. A first output section and a second output section of the second AGC 603 are connected to the first input section and the second input section of the second A/D converter 106, respectively. The first output section and the second output section of the first tap processing section 107 are connected to a first input section and a second input section of the diversity combining section 601, respectively. The first output section and the second output section of the second tap processing section 108 are connected to a third input section and a fourth input section of the diversity combining section 601, respectively. A third output section of the first AGC 602 is connected to a fifth input section of the diversity combining section 601. A third output section of the second AGC 603 is connected to a sixth input section of the diversity combining section 601.

It should be noted that other configuration of the wireless communication apparatus of the present exemplary embodiment is similar to the above described case of the exemplary embodiment of the present invention and therefore more detailed description is omitted.

An operation of the wireless communication apparatus of the present exemplary embodiment, that is, a wireless communication method of the present exemplary embodiment will be described. The operation of the wireless communication apparatus of the present exemplary embodiment is equivalent to the case of the above described exemplary embodiment to which is added an automatic gain controlling function by the first AGC 602 and the second AGC 603. That is, even if a receiving electric field level at each of antennas 101 and 102 varies, a signal level in each branch is kept constant. In this case, there is an advantage of ability in maintaining a same operational precision.

The first AGC 602 and the second AGC 603 detect the output level, smooth it, perform a comparison with a reference level, generates an automatic gain control signal and multiply the automatic gain control signal to the input signal. By performing such operations, the first AGC 602 and the second AGC maintain the output level constant.

That is, in the first AGC 602 and the second AGC 603, the input electric field level and the automatic gain control signal are mutually related to each other. This means that the input electric field level can be estimated by the automatic gain control signal.

The diversity combining section 601 shown in FIG. 18 has, not only same functions as the diversity combining section 111 of the above described exemplary embodiment shown in FIG. 17, but also a function of estimating the input electric field level on a basis of the automatic gain control signal provided by the first AGC 602 and the second AGC 603. The diversity combining section 601 performs a weighting on each branch on a basis of the above estimation result and then performs a diversity combination. With such operations, an almost ideal characteristic of diversity can be obtained.

It should be noted that other operations of the wireless communication apparatus of the present exemplary embodiment is same as in the case of the above described exemplary embodiment of the present invention and therefore more detailed description is omitted.

Further Another Exemplary Embodiment

Figure 19:
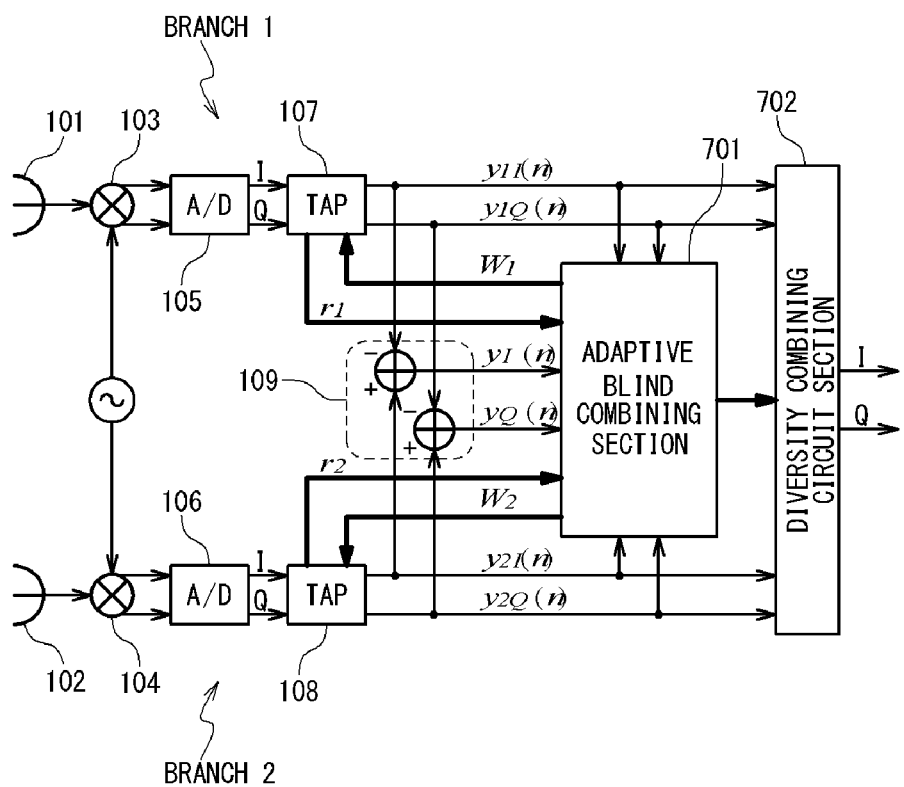
FIG. 19 is a circuit diagram schematically showing a configuration of a wireless communication apparatus of further another exemplary embodiment of the present invention.

FIG. 19 is a circuit diagram schematically showing a configuration of a wireless communication apparatus of further another exemplary embodiment of the present invention. The wireless communication apparatus shown in FIG. 19 is configured similarly to the wireless communication apparatus of the above described exemplary embodiment with below changes to be made. That is, the adaptive blind processing section 110 and the diversity combining section 111 are replaced by another adaptive blind combining section 701 and another diversity combining section 702, respectively.

Here, the adaptive blind combining section 701 of the present exemplary embodiment is equivalent to the adaptive blind combining section 110 of the above described exemplary embodiment to which are added following configuration and functions. That is, functions of estimating a quality of each branch and outputting a result of this estimation as an estimated quality signal and a third output section which outputs this estimated quality signal are added.

Also, the diversity combining section 702 is equivalent to the diversity combining section 111 of the above described exemplary embodiment to which are added following configuration and function. That is, a fifth input section connected to the third output section to input the estimated quality signal and a function of performing a weight combination of each branch signal on a basis of the estimated quality signal are added.

The quality estimation in each branch will be described. For example, an estimated quality of the branch 1 is defined as below.

$$J_{Jcm1} = E[y_{1I}^2(n)-R)^2] + E[(y_{1Q}^2(n)-R)^2]$$ (Equation 120)

Similarly, an estimated quality of the branch 2 is defined as below.

$$J_{Jcm2} = E[y_{2I}^2(n)-R)^2] + E[y_{2Q}^2(n)-R)^2]$$ (Equation 121)

Here, if values of JJcm1 and JJcm2 are bigger, the quality of the branches 1 and 2 are determined to be worse, and if those values are smaller, the quality is determined to be better. Furthermore, it is possible to perform the weight combination by use of the diversity combining section 702 with a table in which a relationship between those values and the branch quality is recorded in advance.

Other configurations and operations of the wireless communication apparatus of the present exemplary embodiment are similar to the case of the wireless communication apparatus of the above described exemplary embodiment of the present invention shown in FIG. 17 to which a following change is made. That is, an adaptive equalization processing section 801 is added.

Further Another Exemplary Embodiment

Figure 20:
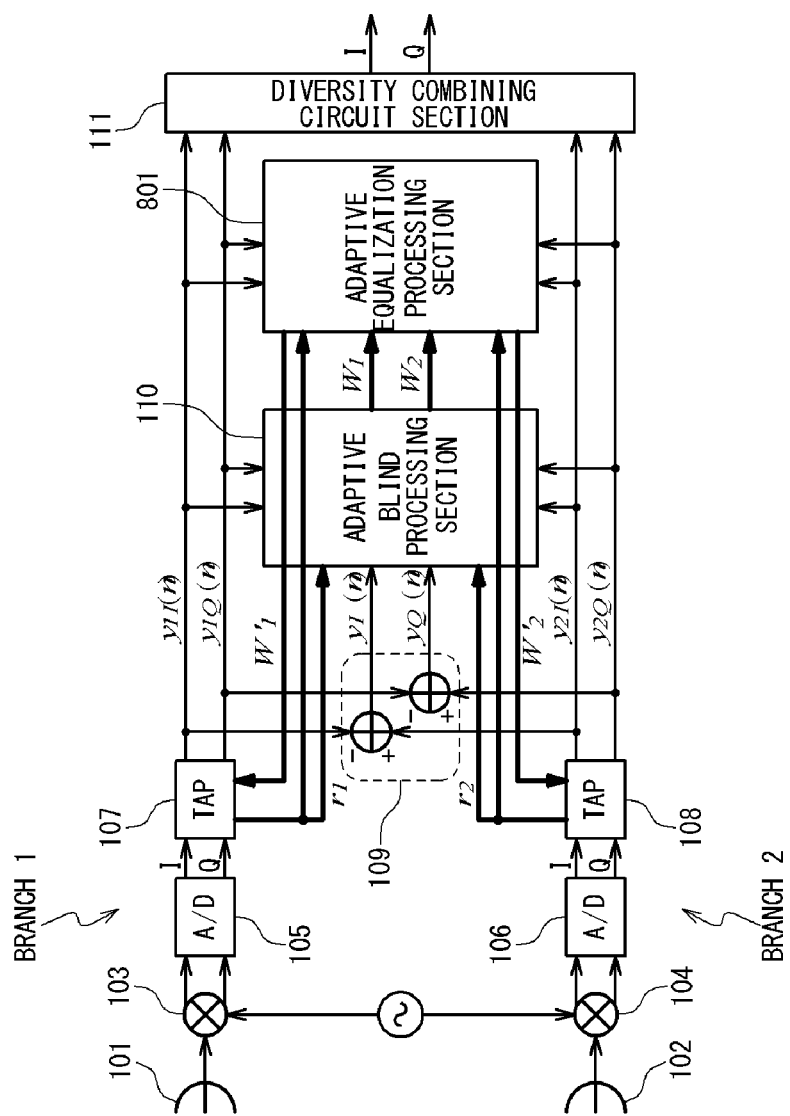
FIG. 20 is a circuit diagram schematically showing a configuration of a wireless communication apparatus of further another exemplary embodiment of the present invention.

FIG. 20 is a circuit diagram schematically showing a configuration of a wireless communication apparatus of further another exemplary embodiment of the present invention. The configuration of the wireless communication apparatus shown in FIG. 20 is equivalent to the wireless communication apparatus of above described exemplary embodiment of the present invention shown in FIG. 17 to which a following change is made. That is, an adaptive equalization processing section 801 is added.

Here, the adaptive equalization processing section 801 includes a first to a eighth input sections and a first and a second output sections. The first input section is connected to the first output section of the first tap processing section 107 and inputs the in-phase component $y_{1I}(n)$ of the first tap output signal. The second input section is connected to the second output section of the first tap processing section 107 and inputs the quadrature-phase component $y_{1Q}(n)$ of the first tap output signal. The third input section is connected to the first output section of the second tap processing section 108 and inputs the in-phase component $y_{2I}(n)$ of the second tap output signal. The fourth input section is connected to the second output section of the second tap processing section 108 and inputs the quadrature-phase component $y_{2Q}(n)$ of the second tap output signal. The fifth input section is connected to the third output section of the first tap processing section 107 and inputs the first received signal vector $r_1$. The sixth input section is connected to the third output section of the second tap processing section 108 and inputs the second received signal vector $r_2$. The seventh input section is connected to the first output section of the adaptive blind processing section 110 and inputs the first tap coefficient (weight vector) $W_1$. The eighth input section is connected to the second output section of the adaptive blind processing section 110 and inputs the second tap coefficient (weight vector) $W_2$. The first output section is connected to the third input section of the first tap processing section 107 and outputs a first adaptive equalization tap coefficient (weight vector) $W'_1$. The second output section is connected to the third input section of the second tap processing section 108 and outputs a second adaptive equalization tap coefficient (weight vector) $W'_2$.

It should be noted that, in the present exemplary embodiment, contrary to the above described exemplary embodiment of the present invention, the first output section and the second output section of the adaptive blind processing section 110 are not connected to the third input section of the first tap processing section 107 and the second tap processing section 108, respectively. Other configuration of the wireless communication apparatus of the present exemplary embodiment is similarly to the case of the above described exemplary embodiment and therefore more detailed descriptions are omitted.

Operations of the adaptive equalization processing section 801 of the present exemplary embodiment, that is, an adaptive equalization processing step of a wireless communication method of the present exemplary embodiment will be described.

The tap coefficients (weight vectors) $W_1$ and $W_2$, which are calculated by the blind processing section 110 by use of the equation (Equation 117), are provided to the adaptive equalization processing section 801, temporarily. While an initial operation period before convergences of the tap coefficients (weight vectors) $W_1$ and $W_2$, the adaptive equalization processing section 801 sends inputted tap coefficients (weight vectors) $W_1$ and $W_2$ as they are to the first tap processing section 107 and the second tap processing section 108, respectively.

After convergence of the tap coefficients (weight vectors) $W_1$ and $W_2$, the adaptive equalization processing section 801 performs a regular adaptive control by using the determination value as the reference signal and calculates the adaptive equalization tap coefficients (weight vectors) $W'_1$ and $W'_2$. The adaptive equalization processing section 801 sends the calculated adaptive equalization tap coefficients (weight vectors) $W'_1$ and $W'_2$ to the first tap processing section 107 and the second tap processing section 108 instead of the tap coefficients (weight vectors) $W_1$ and $W_2$ calculated by the blind processing section 110 by use of the equation (Equation 117), respectively. By doing so, the wireless communication apparatus of the present exemplary embodiment can obtain a stable characteristic.

Also, the determination about convergence of the tap coefficients can be realized by preparing a timer inside the adaptive equalization processing section, for example. That is, by detecting a passage of a predetermined length of time with this timer and switching an internal circuit of the adaptive equalization processing section 801, such determination can be realized with a simple configuration without a special circuit or special processing.

It should be noted that other operations of the wireless communication apparatus of the present exemplary embodiment are similar to the case of the above described exemplary embodiment and therefore more detailed descriptions are omitted.

(Case of Evaluation Condition by BUSSGANG Applied to a Tap Output Combination Signal Using a Combination Space Next, an evaluation condition by BUSSGANG applied to a tap output combination signal using a combination space will be analyzed.

Similarly to above descriptions, an extended received signal vector r and an extended weight vector W are defined as below.

$$r = \begin{bmatrix} r_1 \\ r_2 \end{bmatrix} \quad W = \begin{bmatrix} W_1 \\ W_2 \end{bmatrix} \quad \text{(Equation 122)}$$

Here, $r_1$ and $r_2$ show received signal vectors inputted to the tap processing sections 107 and 108 of the first and the second branches, respectively. Also, $W_1$ and $W_2$ show the tap coefficients (weight vectors) of the first branch and the second branch, respectively. Here, each component of the extended received signal vector is positive; thus, tap is to be updated by an adaptive blind processing linked to the tap. That is, tap control is performed on a basis of a value obtained by a combined signal of tap output of each branch and a signal of each branch, as the evaluation condition of the adaptive equalization. Therefore, the combined signal of tap outputs and the signal of each branch will be as below.

$$\begin{cases} y(n) = y_I(n) + jy_Q(n) = r^T(n) \cdot W(n) \\ y_1(n) = y_{1I}(n) + jy_{1Q}(n) = \left(\begin{bmatrix} I \\ 0 \end{bmatrix} \cdot r\right)^T \cdot W(n) \\ y_2(n) = y_{2I}(n) + jy_{2Q}(n) = \left(\begin{bmatrix} 0 \\ I \end{bmatrix} \cdot r\right)^T \cdot W(n) \end{cases} \quad \text{(Equation 123)}$$

Here, suffixes 1 and 2 correspond to the first branch and the second branch, respectively.

On a basis of the extended vectors, the tap coefficients are updated by linking the equalization processing of the first branch and the second branch and the adaptive combination.

$$W(n+1) = W(n) - \quad \text{(Equation 124)}$$

$$4 \cdot \mu \cdot \{y_I(n) \cdot (y_I^2(n) - AR) + j \cdot y_Q(n) \cdot (y_Q^2(n) - AR)\} \cdot$$

$$r^*(n) -$$

$$4 \cdot \mu \cdot \{y_{1I}(n) \cdot (y_{1I}^2(n) - R) + j \cdot y_{1Q}(n) \cdot (y_{1Q}^2(n) - R)\} \cdot$$

$$\left(\begin{bmatrix} I \\ 0 \end{bmatrix} \cdot r^*(n)\right) -$$

$$4 \cdot \mu \cdot \{y_{2I}(n) \cdot (y_{2I}^2(n) - R) + j \cdot y_{2Q}(n) \cdot (y_{2Q}^2(n) - R)\} \cdot$$

$$\left(\begin{bmatrix} 0 \\ I \end{bmatrix} \cdot r^*(n)\right)$$

The evaluation conditional equation corresponding to the above equation (Equation 124) will be as below.

$$J_{AggreSpace\_BUSS}(n) = J_I(n) + J_Q(n) \quad \text{(Equation 125)}$$

$$= E\left[(y_I^2(n) - AR)^2\right] + E\left[(y_Q^2(n) - AR)^2\right] +$$

$$E\left[(y_{1I}^2(n) - R)^2\right] + E\left[(y_{1Q}^2(n) - R)^2\right] +$$

$$E\left[(y_{2I}^2(n) - R)^2\right] + E\left[(y_{2Q}^2(n) - R)^2\right]$$

Here, suffixes 1 and 2 show the first branch and the second branch, respectively. Absence of suffixes 1 or 2 shows an extended signal. $y_I$ is an in-phase component of a tap output combination signal composed of tap coefficient (weight $w_m$) and $y_Q$ is an quadrature-phase component, similarly. AR and R are predetermined constants.

This evaluation conditional equation is non-linear and thus can not be shown positive in a closed form. Therefore, the analysis is performed with the equation of the evaluation condition. $|y|^2 = y_I^2 + y_Q^2$ and $|y|^2 = (|y_1 + y_2|^2)$; therefore the first term and the second term of the most right-hand side of the evaluation conditional equation (Equation 125) can be transformed as below.

$$J_{ASBUSS} = E\{(y_I^2 - AR)^2\} + E\{(y_Q^2 - AR)^2\} \quad \text{(Equation 126)}$$

$$= E\{|y_I|^4 + |y_Q|^4\} - 2 \cdot AR \cdot E\{|y_I|^2 + |y_Q|^2\} + 2 \cdot AR^2$$

Here, the previous equation (Equation 115) will be used with reversed sign and furthermore, the relational expression below will be used.

$$\begin{cases} (y_I^2(n))^2 = (|y_{1I} + y_{2I}|^2)^2 = y_{1I}^4 + y_{2I}^4 + 6 \cdot y_{1I}^2 y_{2I}^2 + 4 \cdot (y_{1I}^2 + y_{2I}^2) y_{1I} y_{2I} \\ (y_Q^2(n))^2 = (|y_{1Q} + y_{2Q}|^2)^2 = y_{1Q}^4 + y_{2Q}^4 + 6 \cdot y_{1Q}^2 y_{2Q}^2 + 4 \cdot (y_{1Q}^2 + y_{2Q}^2) y_{1Q} y_{2Q} \end{cases}$$
(Equation 127)

Then, an equation can be obtained as below.

$$J_{ASBUSS} = E\{(y_I^2 - AR)^2\} + E\{(y_Q^2 - AR)^2\} \quad \text{(Equation 128)}$$

$$= E\{|y_{1I}|^4 + |y_Q|^4\} - 2 \cdot AR \cdot E\{|y_I|^2 + |y_Q|^2\} + 2 \cdot AR^2$$

$$= (y_{1I}^4 + y_{1Q}^4) + (y_{2I}^4 + y_{2Q}^4) +$$

$$6 \cdot (y_{1I}^2 y_{2I}^2 + y_{1Q}^2 y_{2Q}^2) +$$

$$4 \cdot (y_{1I}^3 y_{2I} + y_{1Q}^3 y_{2Q}) +$$

$$4 \cdot (y_{1I} \cdot y_{2I}^3 + y_{1Q} \cdot y_{2Q}^3) - 2 \cdot AR \cdot E\{|y_I|^2 + |y_Q|^2\} + 2 \cdot AR^2$$

$$= \frac{3}{4} \left\{ \begin{array}{l} -(2 - 1.381) \sum_{k=0}^{P-1} |h_{1k}|^4 - \\ \frac{0.61905}{3} Re\left\{\sum_{k=0}^{P-1} h_{1k}^4\right\} + \\ 2 \cdot \|h_1\|_2^4 + 2\sigma_n^4 \cdot \|W_1\|_2^4 + \\ 4\sigma_n^2 \cdot \|h_1\|_2^2 \|W_1\|_2^2 \end{array} \right\} +$$

$$\frac{3}{4} \left\{ \begin{array}{l} -(2 - 1.381) \sum_{k=0}^{P-1} |h_{2k}|^4 - \\ \frac{0.61905}{3} Re\left\{\sum_{k=0}^{P-1} h_{2k}^4\right\} + \\ 2 \cdot \|h_2\|_2^4 + 2\sigma_n^4 \cdot \|W_2\|_2^4 + \\ 4\sigma_n^2 \cdot \|h_2\|_2^2 \|W_2\|_2^2 \end{array} \right\} +$$

-continued $$3 \cdot \left[ \begin{array}{l} \frac{-0.61905}{2} \cdot Re\left\{\sum_{k=0}^{P-1} h_{1k}^2 h_{2k}^2\right\} + \frac{1}{2} \cdot \\ Re\left\{ \begin{array}{l} -(2 - 1.381) \cdot \sum_{k=0}^{P-1} h_{1k}^2 h_{2k}^{*2} + \\ 2 \cdot \left(\sum_{k=0}^{P-1} h_{1k} h_{2k}^*\right)^2 \end{array} \right\} - \\ -(2 - 1.381) \cdot \sum_{k=0}^{P-1} |h_{1k}|^2 |h_{2k}|^2 + \\ 1 \cdot \left(\sum_{k=0}^{P-1} |h_{1k}|^2\right)\left(\sum_{k=0}^{P-1} |h_{2k}|^2\right) + \\ \left|\sum_{k=0}^{P-1} h_{1k} h_{2k}^*\right|^2 + \sigma_n^2 \cdot \|h_1\|_2^2 \cdot \|W_2\|_2^2 + \\ \sigma_n^2 \cdot \|h_2\|_2^2 \cdot \|W_1\|_2^2 + \sigma_n^4 \cdot \|W_1\|_2^2 \cdot \|W_2\|_2^2 \end{array} \right] +$$

$$Re\left\{ \begin{array}{l} -0.61905 \cdot Re\left\{\sum_{k=0}^{P-1} h_{2k} h_{1k}^3\right\} + 3 \cdot \\ -(2 - 1.381) \cdot \sum_{k=0}^{P-1} h_{2k} h_{1k}^* |h_{1k}|^2 + \\ 2 \cdot \left(\sum_{k=0}^{P-1} h_{2k} h_{1k}^*\right)\left(\sum_{k=0}^{P-1} |h_{1k}|^2\right) \end{array} \right\} +$$

$$6 \cdot \sigma_n^2 \cdot \|W_1\|_2^2 \cdot Re\left\{\sum_{k=0}^{P-1} h_{1k} h_{2k}^*\right\} +$$

$$Re\left\{ \begin{array}{l} -0.61905 \cdot Re\left\{\sum_{k=0}^{P-1} h_{1k} h_{2k}^3\right\} + 3 \cdot \\ -(2 - 1.381) \cdot \sum_{k=0}^{P-1} h_{1k} h_{2k}^* |h_{2k}|^2 + \\ 2 \cdot \left(\sum_{k=0}^{P-1} h_{1k} h_{2k}^*\right)\left(\sum_{k=0}^{P-1} |h_{2k}|^2\right) \end{array} \right\} +$$

$$6 \cdot \sigma_n^2 \cdot \|W_2\|_2^2 \cdot Re\left\{\sum_{k=0}^{P-1} h_{2k} h_{1k}^*\right\} - 2 \cdot AR \cdot$$

$$\left\{ \begin{array}{l} \sigma_s^2 \cdot (\|h_1\|_2^2 + \|h_2\|_2^2) + 2 \cdot \sigma_s^2 \cdot \\ Re\left\{ E\left[\sum_{k=0}^{P-1} h_{1k} \cdot h_{2k}^*\right]\right\} + \\ \sigma_n^2 \cdot (\|W_1\|_2^2 + \|W_2\|_2^2) \end{array} \right\} + 2 \cdot AR^2$$

Here, the below equation will be used.

$$E[|y_I|^2 + |y_Q|^2] = E[y_{1I}^2 + y_{1Q}^2] + E[y_{2I}^2 + y_{2Q}^2] + 2 \cdot E[y_{1I} y_{2I} + y_{1Q} y_{2Q}]$$
(Equation 129)

To obtain the above equation (Equation 129), the previous equation (Equation 36) and the relational expression below are to be used.

$$\begin{cases} E[y_{1I}y_{2I}] = E[a_1a_2]\frac{1}{4}(E[A_1A_2^*]+E[A_1^*A_2]) = \frac{1}{2}\cdot\sigma_s^2\cdot Re\left\{E\left[\sum_{k=0}^{P-1}h_{1k}\cdot h_{2k}^*\right]\right\} \\ E[y_{1Q}y_{2Q}] = E[c_1c_2] - \frac{1}{4}(E[A_1A_2]-E[A_1A_2^*]-E[A_1^*A_2]+E[A_1^*A_2^*]) = \frac{1}{2}\cdot\sigma_s^2\cdot Re\left\{E\left[\sum_{k=0}^{P-1}h_{1k}\cdot h_{2k}^*\right]\right\} \end{cases}$$

(Equation 130)

The remaining third to sixth terms of the most right-hand side of the above evaluation conditional equation (Equation 125) can be calculated by use of the previous equation (Equation 116). This is similar to the equation (Equation 35) in the case of the evaluation condition with BUSSGANG algorithm, previously described. Thus, the evaluation conditional equation will be as below.

$$\begin{aligned}J_{AggreSpace\_BUSS}(n) &= J_I(n) + J_Q(n) \\ &= E\left[(y_I^2(n)-AR)^2\right]+E\left[(y_Q^2(n)-AR)^2\right]+ \\ &\quad E\left[(y_{1I}^2(n)-R)^2\right]+E\left[(y_{1Q}^2(n)-R)^2\right]+ \\ &\quad E\left[(y_{2I}^2(n)-R)^2\right]+E\left[(y_{2Q}^2(n)-R)^2\right] \\ &= J_{ASBUSS} + J_{Jcm1} + J_{Jcm2}\end{aligned}$$

(Equation 131)

Figure 21A:
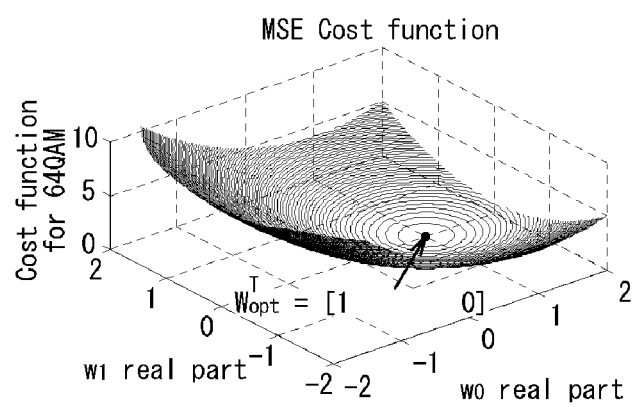
FIG. 21A is an overhead view of a 3-dimensional graph (root-mean-square error surface) obtained by calculating a conditional expression for evaluation (Equation 131) on a basis of MMSE criterion.
Figure 21B:
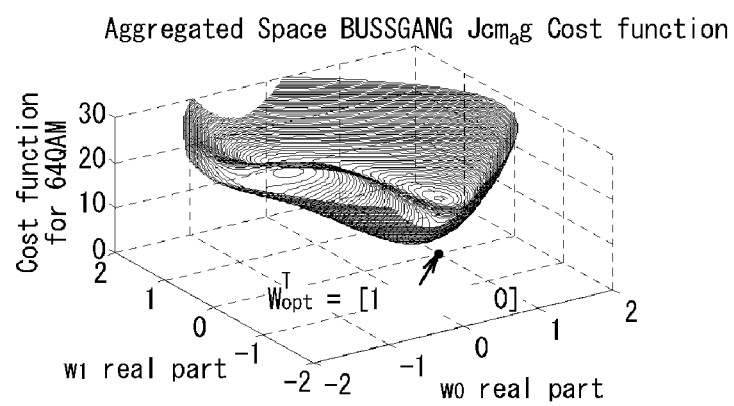
FIG. 21B is an overhead view of a 3-dimensional graph obtained by calculating a conditional expression for evaluation (Equation 131) on a basis of BUSSGANG applied to tap output combination signal using combination space.
Figure 22A:
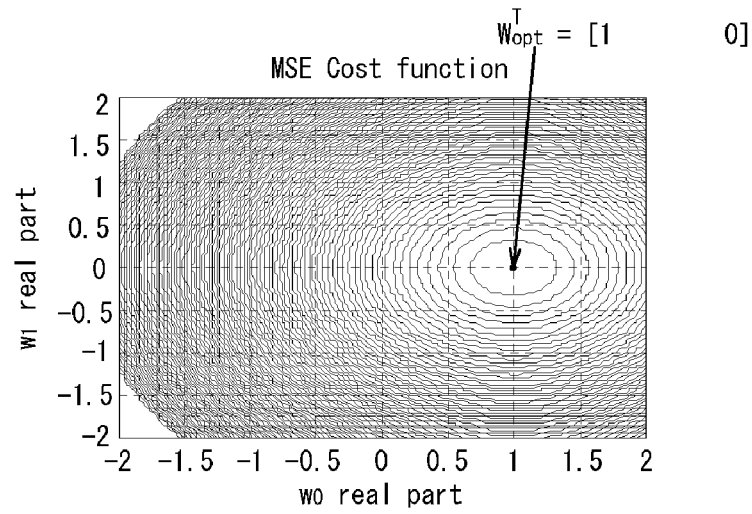
FIG. 22A is a top view of a 3-dimensional graph (root-mean-square error surface) obtained by calculating a conditional expression for evaluation (Equation 131) on a basis of MMSE criterion.
Figure 22B:
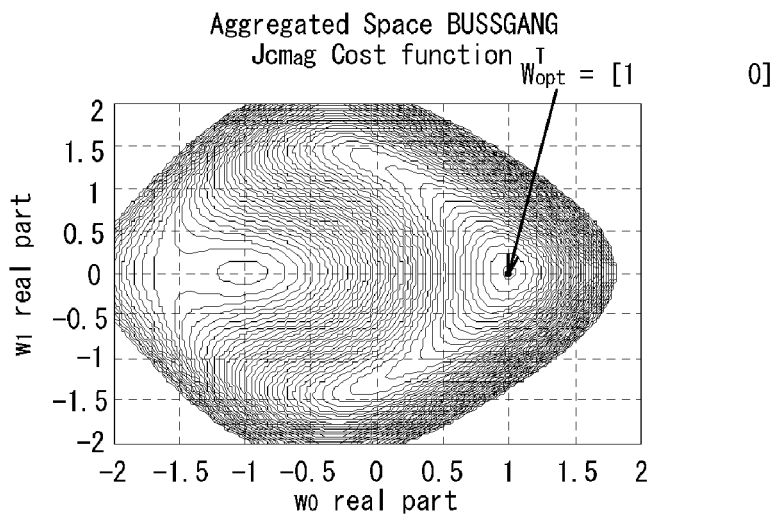
FIG. 22B is a top view of a 3-dimensional graph obtained by calculating a conditional expression for evaluation (Equation 131) on a basis of BUSSGANG applied to tap output combination signal using combination space.

By numerically calculating a value of the evaluation conditional equation corresponding to the tap coefficients on a basis of the above results, a 3-dimensional graph can be obtained. FIG. 21A is an overhead view of a 3-dimensional graph (root-mean-square error surface) obtained by calculating a conditional expression for evaluation (Equation 131) on a basis of MMSE criterion. FIG. 21B is an overhead view of a 3-dimensional graph obtained by calculating a conditional expression for evaluation (Equation 131) on a basis of BUSSGANG applied to tap output combination signal using combination space. FIG. 22A is a top view of a 3-dimensional graph (root-mean-square error surface) obtained by calculating a conditional expression for evaluation (Equation 131) on a basis of MMSE criterion. FIG. 22B is a top view of a 3-dimensional graph obtained by calculating a conditional expression for evaluation (Equation 131) on a basis of BUSSGANG applied to tap output combination signal using combination space. It should be noted that FIG. 21A, FIG. 21B, FIG. 22A and FIG. 22B are all results under a same condition of propagation environment etc.

From FIG. 21A and FIG. 22A, it can be understood that, in a case of performing a tap adaptive processing by using a stochastic gradient method on a basis of evaluation condition of MMSE criterion using a reference signal, there is a convergence into an optimal point. Also, from FIG. 21B and FIG. 22B, it can be understood that, in a case of the evaluation conditional equation (Equation 131) for performing a tap control on a basis of a value obtained with a combined signal of tap output of each branch and a signal of each branch, there is a convergence into a unique optimal point, too. In this case, it can be understood that a blind and stable adaptive control can be performed by adjusting parameters, though a complex form is obtained as described below.

Figure 23A:
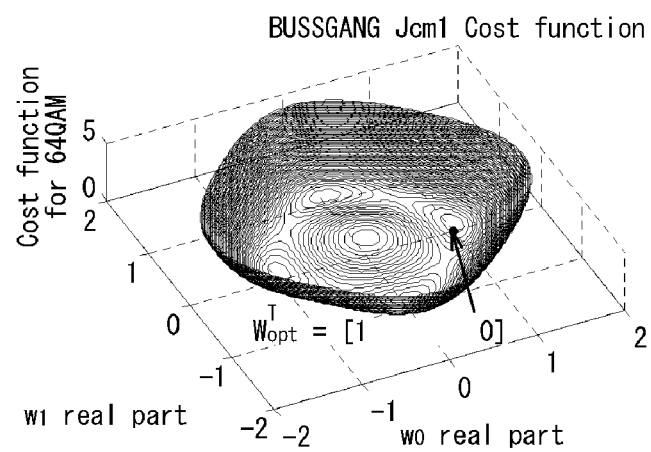
FIG. 23A is an overhead view of a 3-dimensional graph showing $J_{Jcm1}$ and $J_{Jcm2}$ in a conditional expression for evaluation (Equation 131) on a basis of BUSSGANG applied to tap output combination signal using combination space.
Figure 23B:
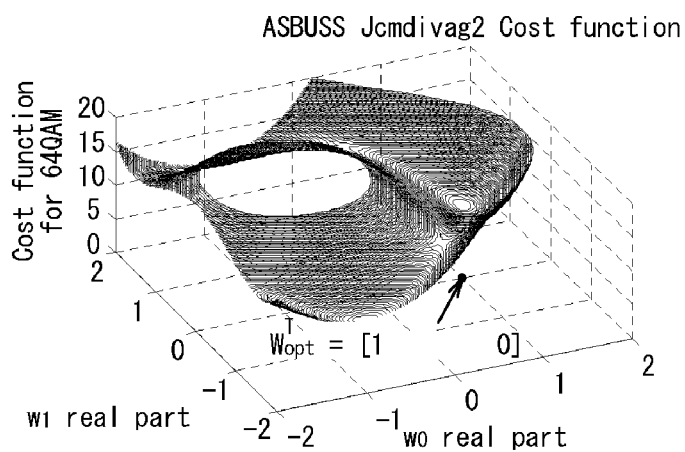
FIG. 23B is an overhead view of a 3-dimensional graph showing $J_{ASBUSS}$ in a conditional expression for evaluation (Equation 131) on a basis of BUSSGANG applied to tap output combination signal using combination space.
Figure 24A:
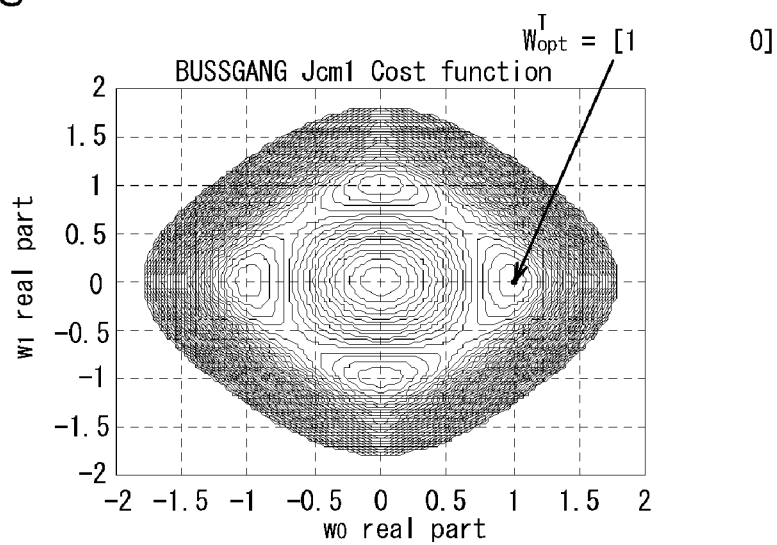
FIG. 24A is a top view of a 3-dimensional graph showing $J_{Jcm1}$ and $J_{Jcm2}$ in a conditional expression for evaluation (Equation 131) on a basis of BUSSGANG applied to tap output combination signal using combination space.
Figure 24B:
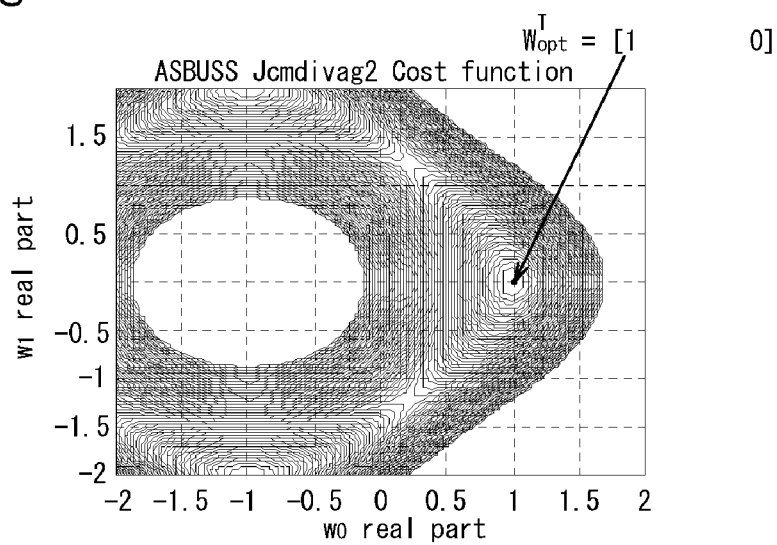
FIG. 24B is a top view of a 3-dimensional graph showing $J_{ASBUSS}$ in a conditional expression for evaluation (Equation 131) on a basis of BUSSGANG applied to tap output combination signal using combination space.

By analyzing causes of this adaptive control performed, a 3-dimensional graph can be obtained as below. FIG. 23A is an overhead view of a 3-dimensional graph showing $J_{Jcm1}$ and $J_{Jcm2}$ in a conditional expression for evaluation (Equation 131) on a basis of BUSSGANG applied to tap output combination signal using combination space. FIG. 23B is an overhead view of a 3-dimensional graph showing $J_{ASBUSS}$ in a conditional expression for evaluation (Equation 131) on a basis of BUSSGANG applied to tap output combination signal using combination space. FIG. 24A is a top view of a 3-dimensional graph showing $J_{Jcm1}$ and $J_{Jcm2}$ in a conditional expression for evaluation (Equation 131) on a basis of BUSSGANG applied to tap output combination signal using combination space. FIG. 24B is a top view of a 3-dimensional graph showing $J_{ASBUSS}$ in a conditional expression for evaluation (Equation 131) on a basis of BUSSGANG applied to tap output combination signal using combination space.

The evaluation conditional equation related to FIGS. 23A and 24A is the previous evaluation conditional equation (Equation 41) of BUSSGANG algorithm and includes four local minimum points; it can be understood that, therefore, a stable diversity effect can not be obtained.

On the other hand, the evaluation conditional equation related to FIGS. 23B and 24B is same as the previous equation of $J_{comb\_BUSS}$ (Equation 78). Therefore, as previously described in a case of evaluation condition with BUSSGANG applied to tap output combination signal of each branch, a stable diversity effect can not be obtained because of four local minimum points included. However, each local minimum point can be shifted by adjusting parameters to obtain a unique optimal point, though the form is complex as shown in FIG. 21B and FIG. 22B.

Further Another Exemplary Embodiment

Figure 25:
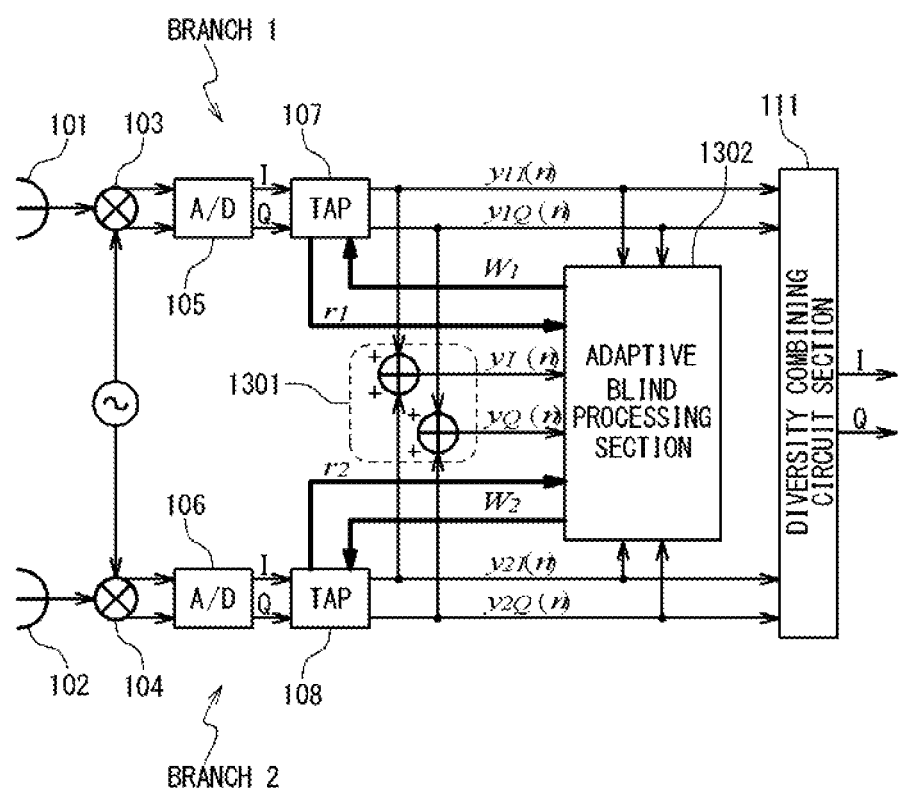
FIG. 25 is a circuit diagram showing a configuration of a wireless communication apparatus of a further another exemplary embodiment of the present invention.

The wireless communication apparatus of this further exemplary embodiment of the present invention performs the above operations. FIG. 25 is a circuit diagram showing a configuration of a wireless communication apparatus of a further another exemplary embodiment of the present invention. The wireless communication apparatus shown in FIG. 25 is equivalent to the wireless communication apparatus of the above described exemplary embodiment shown in FIG. 17 to which following changes are made. That is, the tap output difference generating section 109 shown in FIG. 17 is replaced by a tap output difference generating section 1301 shown in FIG. 25 and the adaptive blind processing section 110 is replaced by an adaptive blind processing section 1302.

The tap output difference generating section 1301 of the present exemplary embodiment will be described. The tap output difference generating section 1301 of the present exemplary embodiment inputs the in-phase components $y_{1I}(n)$ and $y_{2I}(n)$ of the first and the second tap output signals outputted from the first and the second tap processing sections 107 and 108, respectively, and outputs the in-phase component $y_I(n)$ of the tap output combination signal which is a sum of inputted signals. Similarly, the tap output difference generating section 1301 of the present exemplary embodiment inputs the quadrature-phase components $y_{1Q}(n)$ and $y_{2Q}(n)$ of the first and the second tap output signals outputted from the first and the second tap processing sections 107 and 108, respectively, and outputs the quadrature-phase component $y_Q(n)$ of the tap output combination signal, which is a sum of inputted signals, to the adaptive blind processing section 1302.

The adaptive blind processing section 1302 will be described. The adaptive blind processing section 1302 inputs the in-phase component $y_I(n)$ and the quadrature-phase component $y_Q(n)$ of the tap output combination signal and generates the first and the second tap coefficients (weight vectors) $W_1$ and $W_2$ according to the previously described equation (Equation 131). The adaptive blind processing section 1302 outputs the first and the second tap coefficients (weight vectors) $W_1$ and $W_2$ to the first and the second tap processing section 107 and 108, respectively.

Other configurations of the wireless communication apparatus of the present exemplary embodiment are similar to the case of the wireless communication apparatus of the above described exemplary embodiment and therefore more detailed descriptions are omitted.

The operations of the wireless communication apparatus of the present exemplary embodiment, that is, the wireless communication method of the present exemplary embodiment, will be described. It should be noted that this description is mainly focused on differences between the cases of the equation (Equation 117) including an element of performing a tap control so that the difference between tap output of each branch be minimal in FIG. 26 and FIG. 17.

In a case of performing a tap control on a basis of a value obtained by a combined signal of tap output of each branch and a signal of each branch, the combination is performed in a form of adding by using the tap output combination section 1301 in the same figure. On the other hand, in a case of FIG. 17 with the equation (Equation 117) including an element of tap controlling so that the difference between tap output of each branch be minimal, a nulling is performed by use of a tap output difference generating section 109. The adaptive blind processing section 1302, which inputs those signals, performs a calculation of tap coefficients on a basis of in-phase components and quadrature-phase component of the combined tap output signal according to the equation (Equation 124); the signal output on a basis of those tap coefficients is inputted to the diversity combining section 111; and the processing is completed.

Other operations of the wireless communication apparatus of the present exemplary embodiment are similar to the case of the wireless communication apparatus of the previously described exemplary embodiment; therefore more detailed descriptions are omitted.

It should be noted that, by defining the extended vectors as below, it is possible to execute similar calculation and increase the number of the branches up to any number m.

$$r = \begin{bmatrix} r_1 \\ r_2 \\ \vdots \\ r_m \end{bmatrix} \quad W = \begin{bmatrix} W_1 \\ W_2 \\ \vdots \\ W_m \end{bmatrix} \quad \text{(Equation 132)}$$

Figure 26:
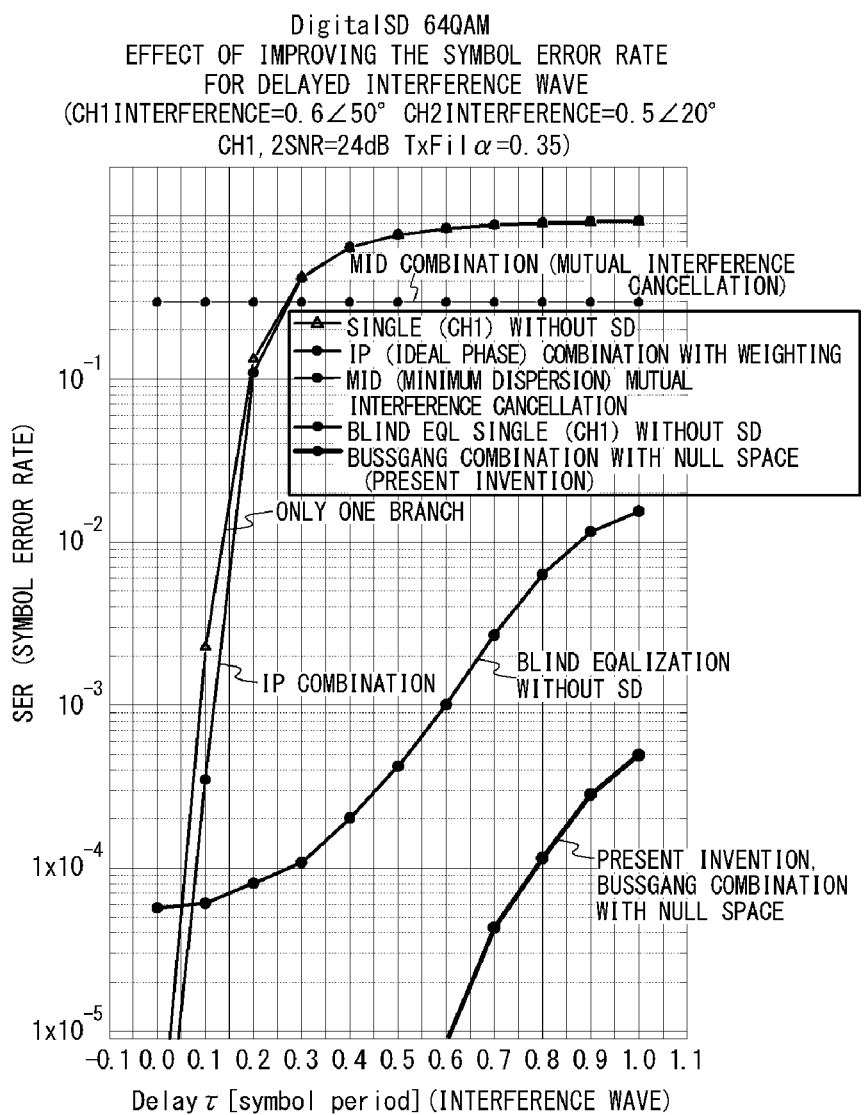
FIG. 26 is a graph showing a space diversity effect of a blind process in the wireless communication apparatus of the present invention.

The effect of the space diversity in the blind processing of the present invention described above will be verified by a simulation. FIG. 26 is a graph showing a space diversity effect of a blind process in the wireless communication apparatus of the present invention.

The method used to perform the simulation in FIG. 26 is as below. That is, the evaluation condition according to BUSSGANG applied to the tap output combination signal using a NULL space is used. Here, tap coefficients are updated with the adaptive blind processing by linking taps arranged at each branch input. In this case, the equation (Equation 94), including an element of performing the tap control so that the difference between tap output of each branch be minimal, is used as the evaluation condition of the adaptive processing.

In the graphs shown in FIG. 26, the vertical axis shows the symbol error rate and the horizontal axis shows the delay time of the delayed interference wave. It can be read from FIG. 26 that, longer the delay time is, more severe the influence of interference wave is. It can be also understood from FIG. 26 that, in a case of IP combination described as a conventional art, a little increase of the interference wave delay results in extreme degradation of the characteristics. Also in a case of MID combination (mutual interference cancellation), since an ideal cancellation is performed, there is no influence of the interference wave. However, diversity gain contrary decrease and the characteristic is bad because the state of the propagation path in each branch is close to a state where direct waves are directed in an opposite direction in each branch.

On the other hand, in the case of BUSSGANG combination using a NULL space of the present invention, a good characteristic is shown and better diversity effect is obtained in comparison with a blind equalization without SD (Space Diversity).

By the above, the effectiveness is shown for the power saving effect of the present invention.

In the above, the present invention has been described referring to the above exemplary embodiments; however, the present invention is not limited to any of the above-described exemplary embodiments. Various modifications that one having ordinary skill in the art can appreciate can be made to constitution and detail of the present invention within the scope of the present invention.

It should be noted that this application is based upon Japanese Patent Application JP-2010-270899 and the disclosure of Japanese Patent Application JP-2010-270899 is incorporated herein in its entirety by reference.

The invention claimed is:

1. A wireless communication apparatus comprising:
    an interface that receives a plurality of signals and a plurality of tap coefficients;
    a processor communicatively coupled to the interface, wherein the processor is configured to:
        generate a plurality of tap output signals and a plurality of received signal vectors based on the plurality of signals and the plurality of tap coefficients in a space diversity scheme; and
        generate a plurality of minimal combined tap output signals by performing a diversity combination of the plurality of tap output signals and an adaptive blind processing comprising a minimizing evaluation condition,
    wherein said processor includes a plurality of branches which are configured to generate the plurality of tap output signals, respectively; and
    wherein the minimizing evaluation condition comprises a condition to minimize a difference between the plurality of tap output signals generated by the plurality of branches.

2. The wireless communication apparatus according to claim 1, wherein the processor, configured to perform the diversity combination, is further configured to:
    generate an automatic gain control signal; and
    perform the diversity combination using the automatic gain control signal.

3. The wireless communication apparatus according to claim 1, further comprising:
an antenna configured to receive the plurality of signals wirelessly,
wherein the processor is further configured to:
generate an estimated quality signal; and
perform the diversity combination using the estimated quality signal.

4. The wireless communication apparatus according to claim 1, wherein the processor is further configured to:
output the plurality of tap coefficients unchanged before a predetermined time for a convergence of the plurality of tap coefficients or a plurality of generated signals generated by an adaptive equalization process after the predetermine time.

5. The wireless communication apparatus according to claim 1, wherein the processor is further configured to determine a difference between at least two tap output signals of the plurality of tap output signals.

6. The wireless communication apparatus according to claim 1, wherein the processor signal is further configured to determine a sum of at least two tap output signals of the plurality of tap output signals.

7. A wireless communication method comprising:
generating a plurality of tap output signals and a plurality of received signal vectors based on a plurality of received signals and a plurality of tap coefficients in a space diversity scheme; and
generating a plurality of minimal combined tap output signals by performing a diversity combination of the plurality of tap output signals and an adaptive blind processing comprising a minimizing evaluation condition,
wherein a plurality of branches generate the plurality of tap output signals, respectively; and
wherein the minimizing evaluation condition comprises a condition to minimize a difference between the plurality of tap output signals generated by the plurality of branches.

8. The wireless communication method according to claim 7, further comprising:
generating an automatic gain control signal,
wherein performing the diversity combination comprises using the automatic gain control signal.

9. The wireless communication method according to claim 7, further comprising:
generating an estimated quality signal for: performing the diversity combination.

10. The wireless communication method according to claim 7, further comprising:
outputting the plurality of tap coefficients unchanged before a predetermined time for a convergence of the plurality of tap coefficients or a plurality of generated signals generated by an adaptive equalization process after the predetermine time.

11. The wireless communication method according to claim 7, further comprising determining a difference between at least two tap output signals of the plurality of tap output signals for generating the plurality of tap output combination signals.

12. The wireless communication method according to claim 7, further comprising determining a sum of at least two tap output signals of the plurality of tap output signals for generating the plurality of tap output combination signals.

13. A article of manufacture comprising:
a non-transitory processor readable storage medium; and
instructions stored on the non-transitory processor readable storage medium, wherein the instructions are configured to cause a processor to operate so as to:
generate a plurality of tap output signals and a plurality of received signal vectors based on a plurality of signals and a plurality of tap coefficients in a space diversity scheme; and
generate a plurality of minimal combined tap output signals by performing a diversity combination of the plurality of tap output signals and an adaptive blind processing comprising a minimizing evaluation condition.

14. The article of manufacture of claim 13, wherein the instructions are further configured to cause the processor to operate so as to generate an automatic gain control signal for performing the diversity combination.

15. The article of manufacture of claim 13, wherein the instructions are further configured to cause the processor to operate so as to generate an estimated quality signal for performing the diversity combination.

16. The article of manufacture of claim 13, wherein the instructions are further configured to cause the processor to operate so as to output the plurality of tap coefficients unchanged before a predetermined time for a convergence of the plurality of tap coefficients or a plurality of generated signals by an adaptive equalization process after the predetermined time.

17. The article of manufacture of claim 13, wherein the instructions are further configured to cause the processor to operate so as to determine a difference of at least two tap output signals of the plurality of tap output signals for generating the plurality of tap output combination signals.

18. The article of manufacture of claim 13, wherein the instructions are further configured to cause the processor to operate so as to determine a sum of at least two tap output signals of the plurality of tap output signals for generating the plurality of tap output combination signals.

* * * * *